(12) United States Patent
Van Engelhoven et al.

(10) Patent No.: US 9,889,554 B2
(45) Date of Patent: Feb. 13, 2018

(54) APPARATUS FOR HUMAN ARM SUPPORTING EXOSKELETON

(71) Applicant: THE REGENTS OF THE UNIVERSITY OF CALIFORNIA, Oakland, CA (US)

(72) Inventors: Logan Van Engelhoven, Berkeley, CA (US); Homayoon Kazerooni, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/158,113

(22) Filed: May 18, 2016

(65) Prior Publication Data

US 2016/0339583 A1 Nov. 24, 2016

Related U.S. Application Data

(60) Provisional application No. 62/162,871, filed on May 18, 2015.

(51) Int. Cl.
  *B25J 9/06* (2006.01)
  *B25J 9/00* (2006.01)
  *B65H 1/10* (2006.01)

(52) U.S. Cl.
  CPC ............ *B25J 9/0006* (2013.01); *B65H 1/10* (2013.01)

(58) Field of Classification Search
  CPC ......... B25J 9/0006; B25H 1/10; F16M 13/04; A61B 90/60; A61F 5/013;

(Continued)

(56) References Cited

U.S. PATENT DOCUMENTS

| 4,298,149 A | * | 11/1981 | Gottschalk | ............... A45F 3/10 224/201 |
| RE32,213 E | * | 7/1986 | Brown | ................... F16M 13/04 248/123.11 |

(Continued)

FOREIGN PATENT DOCUMENTS

WO      2013186705 A2      12/2013

OTHER PUBLICATIONS

International Search Report and Written Opinion issued in the corresponding application PCT/US16/33035 dated Aug. 25, 2016.

(Continued)

*Primary Examiner* — Anita M King
(74) *Attorney, Agent, or Firm* — Kwan & Olynick LLP

(57) ABSTRACT

An arm supporting exoskeleton comprises a shoulder base coupled to an arm link mechanism. The arm link mechanism comprises a proximal link and a distal link configured to rotate relative to each other about a rotating joint; at least one arm-coupler adapted to couple a user's arm to the distal link; a tensile force generator coupled to the proximal link and the distal link, and providing a torque to flex the distal link relative to the proximal link; and a protrusion located substantially at the rotating joint. When the distal link extends past a toggle angle, the protrusion constrains the tensile force generator, and the torque provided by the tensile force generator remains substantially small. When the protrusion does not constrain the tensile force generator, the torque tends to flex the distal link relative to the proximal link, thereby reducing human shoulder forces and torques required to raise the user's arm.

30 Claims, 66 Drawing Sheets

(58) Field of Classification Search
CPC ...... A61F 2005/0134; A61F 2005/0155; A61F 2005/0179
USPC .......................................... 248/118; 623/58
See application file for complete search history.

(56) References Cited

U.S. PATENT DOCUMENTS

| | | | |
|---|---|---|---|
| 6,301,526 B1* | 10/2001 | Kim ...................... | B25J 9/0006 600/1 |
| 6,764,231 B1* | 7/2004 | Shubert .................. | F16M 13/04 396/419 |
| 6,821,259 B2 | 11/2004 | Rahman et al. | |
| 7,325,777 B2 | 2/2008 | Thiessen | |
| 7,618,016 B2 | 11/2009 | Brown | |
| 8,641,782 B2* | 2/2014 | Kim ...................... | B25J 9/0006 414/5 |
| 8,968,222 B2 | 3/2015 | Kazerooni et al. | |
| 9,204,730 B2* | 12/2015 | Brown .................... | A47C 1/03 |
| 9,205,017 B2 | 12/2015 | Doyle | |
| 9,333,644 B2* | 5/2016 | Angold .................. | B25J 9/0006 |
| 9,404,618 B2* | 8/2016 | Brown .............. | F16M 11/2014 |
| 2014/0158839 A1 | 6/2014 | Doyle | |
| 2015/0001269 A1 | 1/2015 | Sacksteder | |

OTHER PUBLICATIONS

Tariq Rahman et al., "A simple Technique to Passively Gravity-Balance Articulated Mechanisms", Transaction of the ASEM, Journal of Mechanical Design, vol. 117, 1995, pp. 655-658.
T. Morita et al., "A novel mechanism design for gravity compensation in three dimensional space", Proc. 2003 IEEE/ASME Int. Conf. Adv. Intell. Mechatronica (AIM 2003), vol. 1, pp. 163-168.

\* cited by examiner

APPARATUS FOR HUMAN ARM SUPPORTING EXOSKELETON

FIELD OF THE INVENTION

The present invention pertains to the art of support devices for the human arm and, more particularly, to an arm support device configured to reduce the moment on a person shoulder during arm elevation.

BACKGROUND ART

Examples of passive lift devices mounted to the torso of a person configured to support the weight of the arm can be found in U.S. Pat. No. 9,205,017 B2 and U.S. Patent Application Publication No. 2014/0158839 A1. Such devices are seen to be limited because they are not able to automatically cut or substantially reduce their assistance when the user intends to rest his/her upper arm at his/her sides, or pick a tool from his/her tool belt. Such devices do not provide a sustained range of position where support torque automatically reduces to zero. Except for a few points of position, these devices will always be applying lifting forces to a user's upper arm, potentially inhibiting motion and creating discomfort during non-working postures when assist is not desired.

In general, passive support devices that are configured to assist a person supporting the weight of a tool are known in the art. Typical passive devices are configured to compensate for gravity under a range of positions using a combination of structural elements, springs, cables and pulleys. The configuration of these devices provides for gravity compensation within a limited range of motion. Additionally, these devices do not allow for a substantially zero torque to be provided. Examples of passive lift assist devices can be found in U.S. Pat. Nos. 6,821,259 B2 and 7,325,777. Such devices are seen to be fairly limited in terms of functionality, as their base must be repositioned every time a user moves to a new location. Examples of a passive lift assist device mounted to the torso of a person to support the weight of a tool include U.S. Pat. No. 7,618,016 B2 and U.S. Patent Application Publication No. US 2015/001269 A1. Such devices are seen to be fairly limited because of a bulky frame that does not accurately follow the motions of the user.

SUMMARY OF INVENTION

The invention described here provides the user a supporting torque to raise his/her upper arm thereby reducing the human shoulder forces and torques required to raise the upper arm. However when the user intends to rest his/her upper arm at his/her sides or pick a tool from his/her tool belt, the device of the invention here automatically reduces the lifting force to zero (or substantially small value) allowing the wearer to move her/his upper arm freely. During non-working postures, zero (or substantially small) torque is desired to allow free motion of person's upper arm or to allow person's upper arm to rest without the impedance of an applied torque from the assist device. This creates a greater overall comfort for user during non-working postures.

In embodiments, an arm supporting exoskeleton configured to be coupled to a person comprises: a shoulder base configured to be coupled to a trunk of the person; and an arm link mechanism configured to be coupled to said shoulder base. The arm link mechanism comprises: a proximal link and a distal link configured to rotate relative to each other about a rotating joint and along a first rotational axis substantially orthogonal to a gravity line when said person is standing upright; at least one arm-coupler adapted to couple an upper arm of the person to said distal link; a tensile force generator coupled to said proximal link at a first end of the tensile force generator and coupled to said distal link at a second end of the tensile force generator, the tensile force generator providing a torque to flex said distal link relative to said proximal link; and a protrusion located substantially at said rotating joint. When said distal link extends past a toggle angle, said protrusion constrains said tensile force generator, and the torque provided by said tensile force generator remains substantially small, and when said protrusion does not constrain said tensile force generator, said torque has the tendency to flex said distal link relative to said proximal link, thereby reducing human shoulder forces and torques required to raise said upper arm of the person.

In embodiments, an arm supporting exoskeleton configured to be coupled to a person comprising: a shoulder base configured to be coupled to a trunk of the person; and an arm link mechanism configured to be coupled to said shoulder base. The arm link mechanism comprises: a proximal link and a distal link configured to rotate relative to each other about a rotating joint and along a first rotational axis substantially orthogonal to a gravity line when said person is standing upright; at least one arm-coupler adapted to couple an upper arm of the person to said distal link; and a tensile force generator coupled to said proximal link at a first end of the tensile force generator and coupled to said distal link at a second end of the tensile force generator, the tensile force generator providing a torque to flex said distal link relative to said proximal link. When said arm support exoskeleton is coupled to said person and an angle between said proximal link and said distal link is smaller than a toggle angle, said torque has the tendency to flex said distal link relative to said proximal link, thereby reducing human shoulder forces and torques required to raise said upper arm of the person, and imposing reaction forces and torques on said shoulder base. When said angle between said proximal link and said distal link is larger than said toggle angle, said tensile force generator provides a substantially small torque between said proximal link and said distal link, allowing said person to move said upper arm of the person freely.

DESCRIPTION OF EMBODIMENTS

Figure 1:
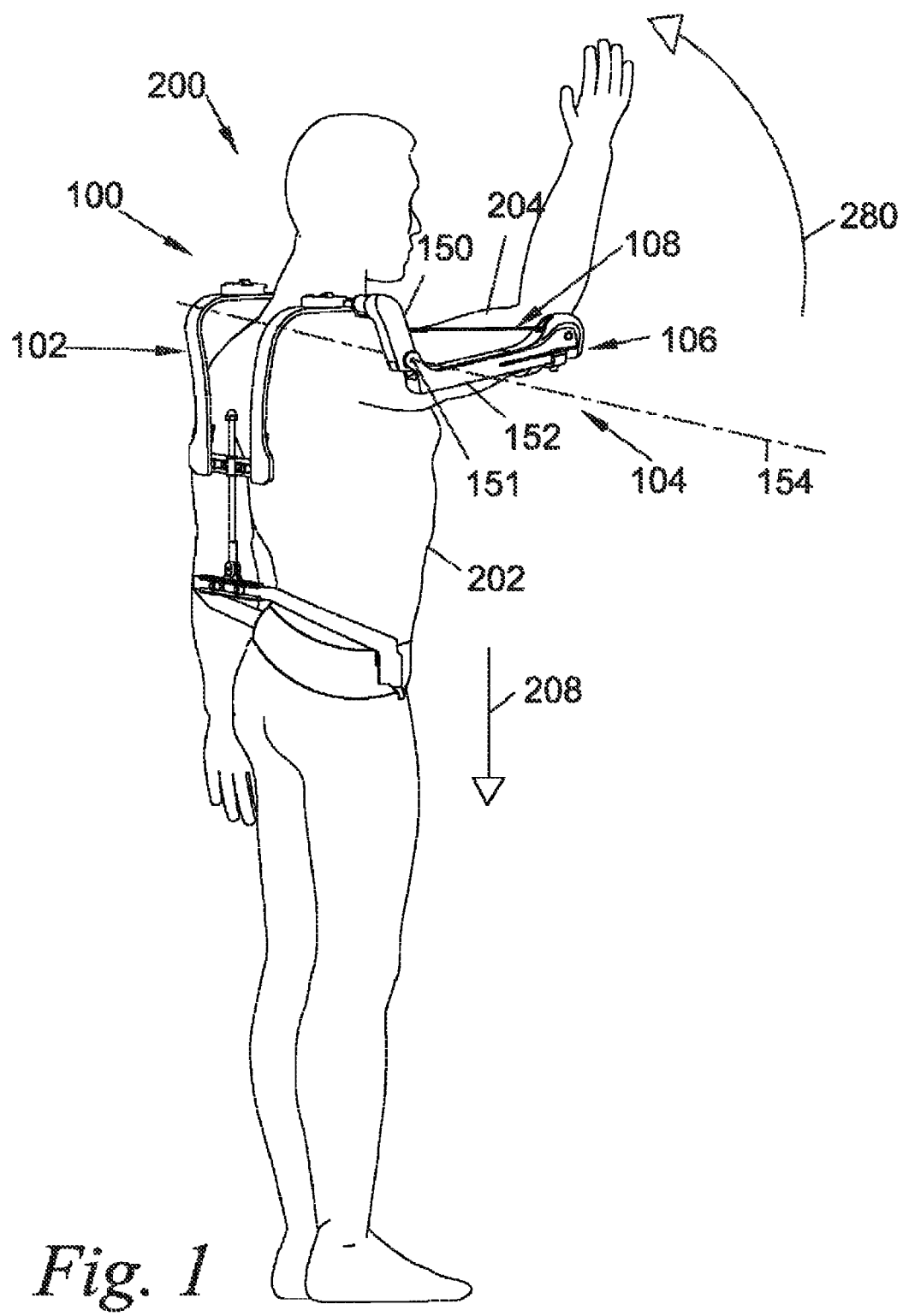
FIG. 1 is a rear perspective view of an assist device of the present invention, with a user's arm outstretched.
Figure 2:
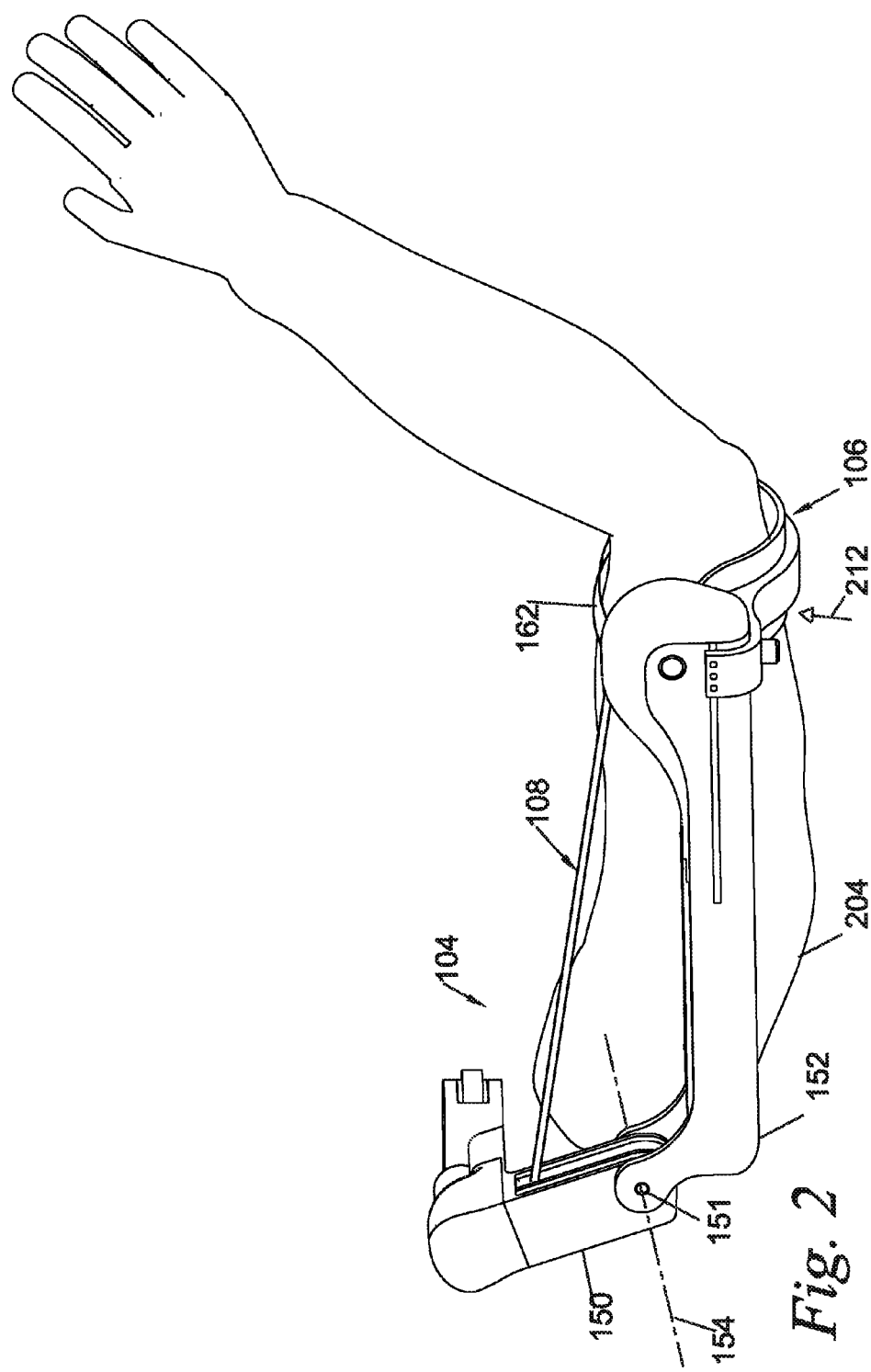
FIG. 2 is a close up view of an arm link mechanism of the present invention.
Figure 3:
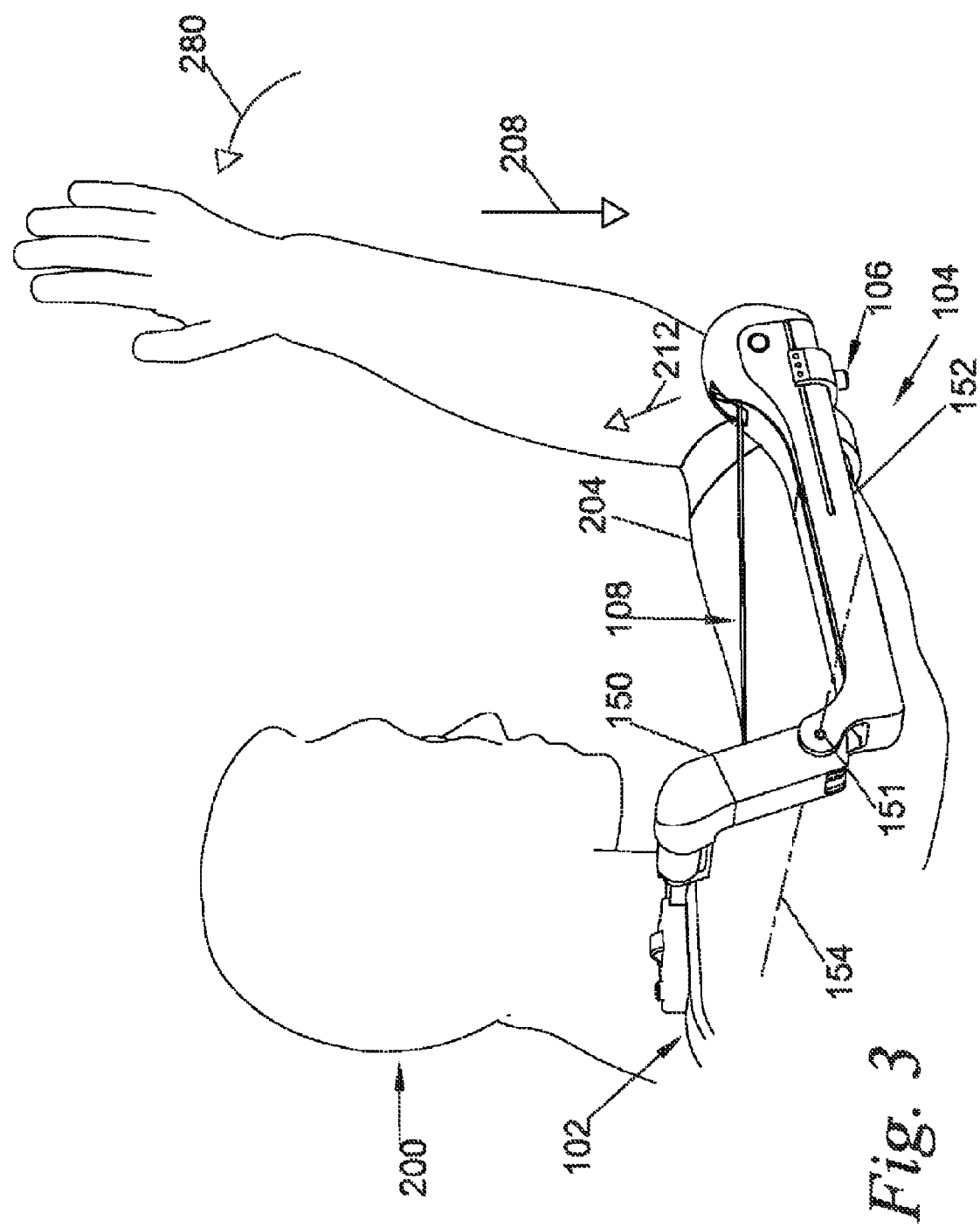
FIG. 3 is a close up rear perspective view of an arm link mechanism of the present invention.
Figure 4:
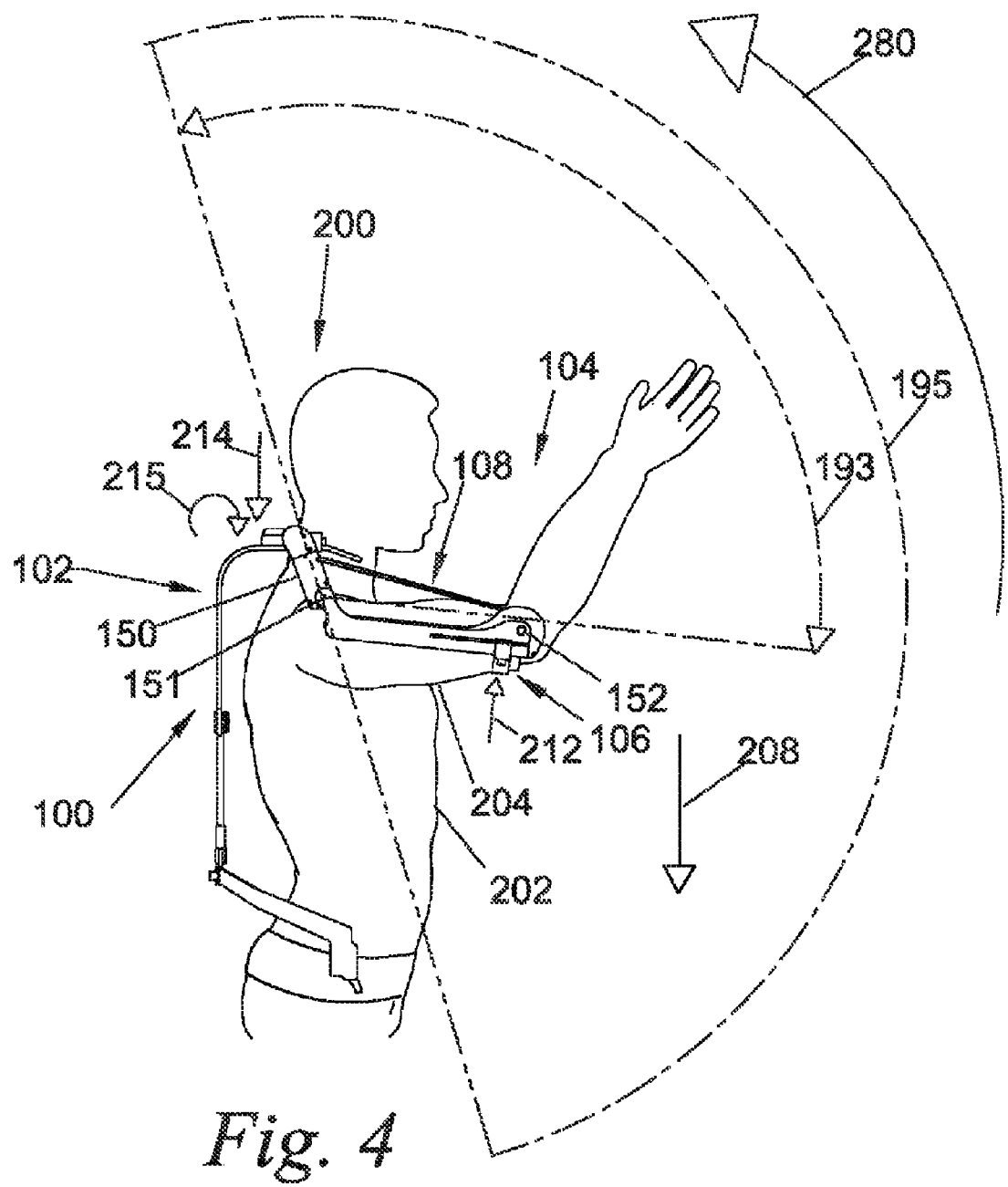
FIG. 4 is a side view of an assist device of the present invention wherein a first angle is less than a toggle angle.

FIG. 1 depicts an embodiment of an arm support exoskeleton (assist device) 100. Arm support exoskeleton 100 comprises a shoulder base 102, which is configured to be coupled to a person's trunk 202. In some embodiments of the invention, shoulder base 102 is substantially located behind a person (user) 200. Arm support exoskeleton 100 additionally comprises at least one arm link mechanism 104 that is coupled to shoulder base 102. Arm link mechanism 104 comprises at least a proximal link 150 and a distal link 152 capable of rotation relative to each other along a first rotational axis 154. In some embodiments of the invention, first rotational axis 154 is orthogonal to the gravity line 208 when person 200 in standing upright. The term "gravity line" should be understood to mean the direction in which gravity acts. A first joint 151 represents a hinge where distal link 152 rotates relative to proximal link 150. Arm support exoskeleton 100 additionally comprises at least one arm coupler 106 that couples a person's upper arm 204 to distal link 152 of arm link mechanism 104. Arm coupler 106 is depicted in FIG. 2. Arm support exoskeleton 100 additionally comprises at least one torque generator 108 configured to create a torque 280 between proximal link 150 and distal link 152. A close up view of arm link mechanism 104 is depicted in FIG. 3. Torque 280 in FIG. 1 and FIG. 3 show the torque imposed on distal link 152 from proximal link 150. As shown in FIG. 4, a first angle 193 represents an angle between proximal link 150 and distal link 152. When first angle 193 is smaller than a toggle angle 195, as depicted in FIG. 4, torque generator 108 generates a torque 280 that has the tendency to flex distal link 152 relative to proximal link 150. The term "toggle angle" should be understood to mean the angle between a first position (e.g., arm is raised) in which proximal link 150 and distal link 152 are collinear, and a second position (e.g., arm is lowered) in which the proximal link 150 and distal link 152 become collinear. The term "flex" should be understood to mean a movement of distal link 152 resulting in the decrease of first angle 193, while the term "extend" as used herein should be understood to mean a movement of distal link 152 resulting in the increase of first angle 193. The torque 280 produces a supporting force 212 (shown in FIG. 2 and FIG. 4) onto upper arm 204 by arm coupler 106. This reduces the human shoulder forces and torques required to raise person's upper arm 204, and imposes a set reaction force 214 and reaction torque 215 on shoulder base 102.

Figure 5:
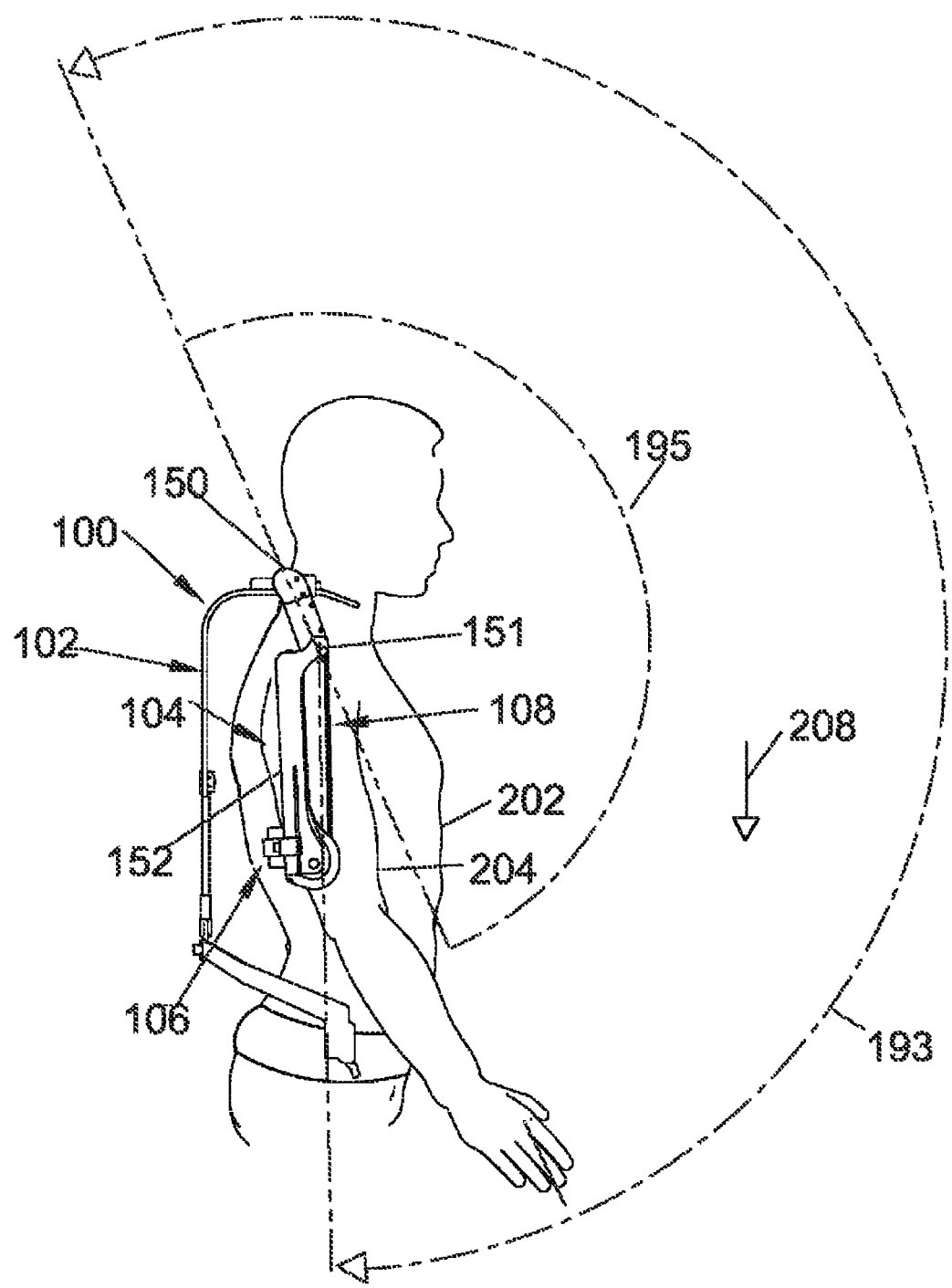
FIG. 5 is a side view of an assist device of the present invention wherein a first angle is greater than a toggle angle.

When angle 193 is larger than toggle angle 195 as depicted in FIG. 5, torque generator 108 provides a substantially small torque between proximal link 150 and distal link 152. The term "substantially small torque" should be understood to mean a torque value which does not cause substantial inhibition or discomfort of person's upper arm 204. This allows person 200 to move her/his upper arm 204 freely. In the Example shown in FIG. 5, when a user's upper arm 204 is lowered, a position of distal link 152 moves past a position of collinear alignment with proximal link 150, and torque generator provides substantially small torque between proximal link 150 and distal link 152 such that the user can easily maneuver their upper arm 204 in this lowered position.

Figure 6:
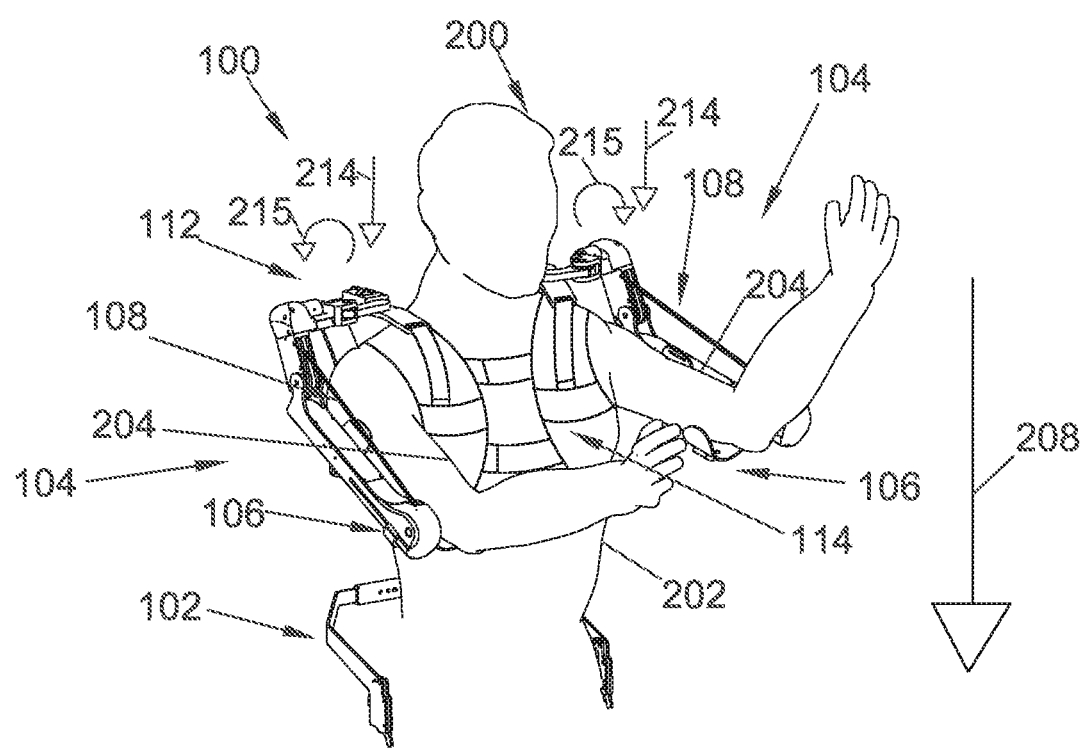
FIG. 6 is a front perspective view of an arm support exoskeleton of the present invention including two arm link mechanisms.

FIG. 6 depicts another embodiment of arm support exoskeleton 100 including of two arm link mechanisms 104 connected to shoulder base 102, each including at least one torque generator 108 and at least one arm coupler 106. In some embodiments of the invention, distal link 152 moves in such a manner that it remains substantially parallel with person's upper arm 204.

Figure 65:
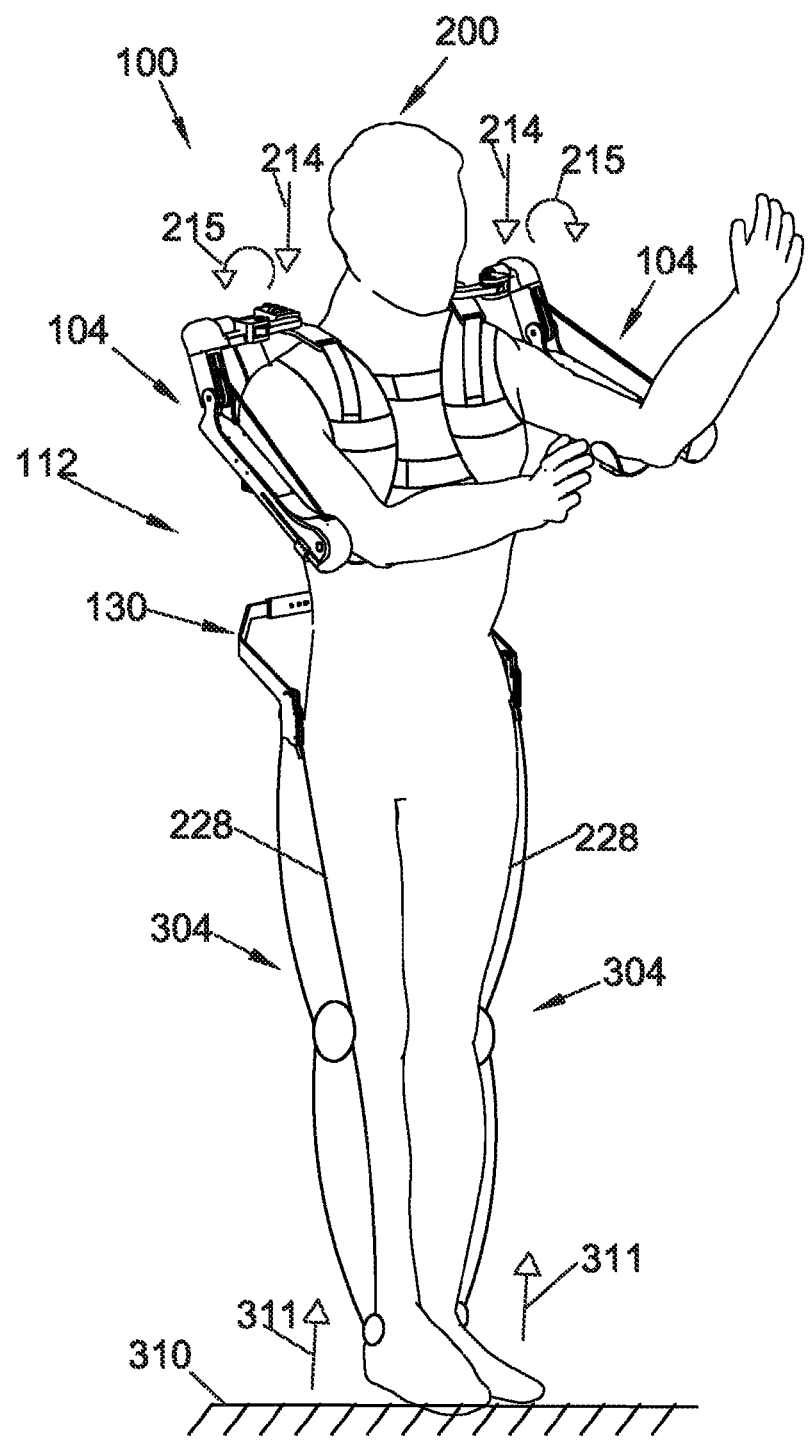
FIG. 65 is a front perspective view of a back frame of the present invention coupled to a lower extremity exoskeleton.

In some embodiments of invention, as depicted in FIG. 6, shoulder base 102 of arm supporting exoskeleton 100 comprises a load bearing structure 112 coupled to arm link mechanism 104 and a coupling mechanism 114 that attaches shoulder base 102 to person's trunk 202. Load bearing structure 112 supports reaction forces 214 and reaction torques 215 from arm link mechanisms 104. In some embodiments of the invention, as depicted in FIG. 10 through FIG. 13, reaction forces 214 and reaction torques 215 transfer to person 200. In some embodiments of invention as depicted in FIG. 65 reaction forces 214 and reaction torques 215 transfer to a support surface (e.g., ground 310). Various embodiments of load bearing structure 112 and coupling mechanism 114 are described below.

Figure 7:
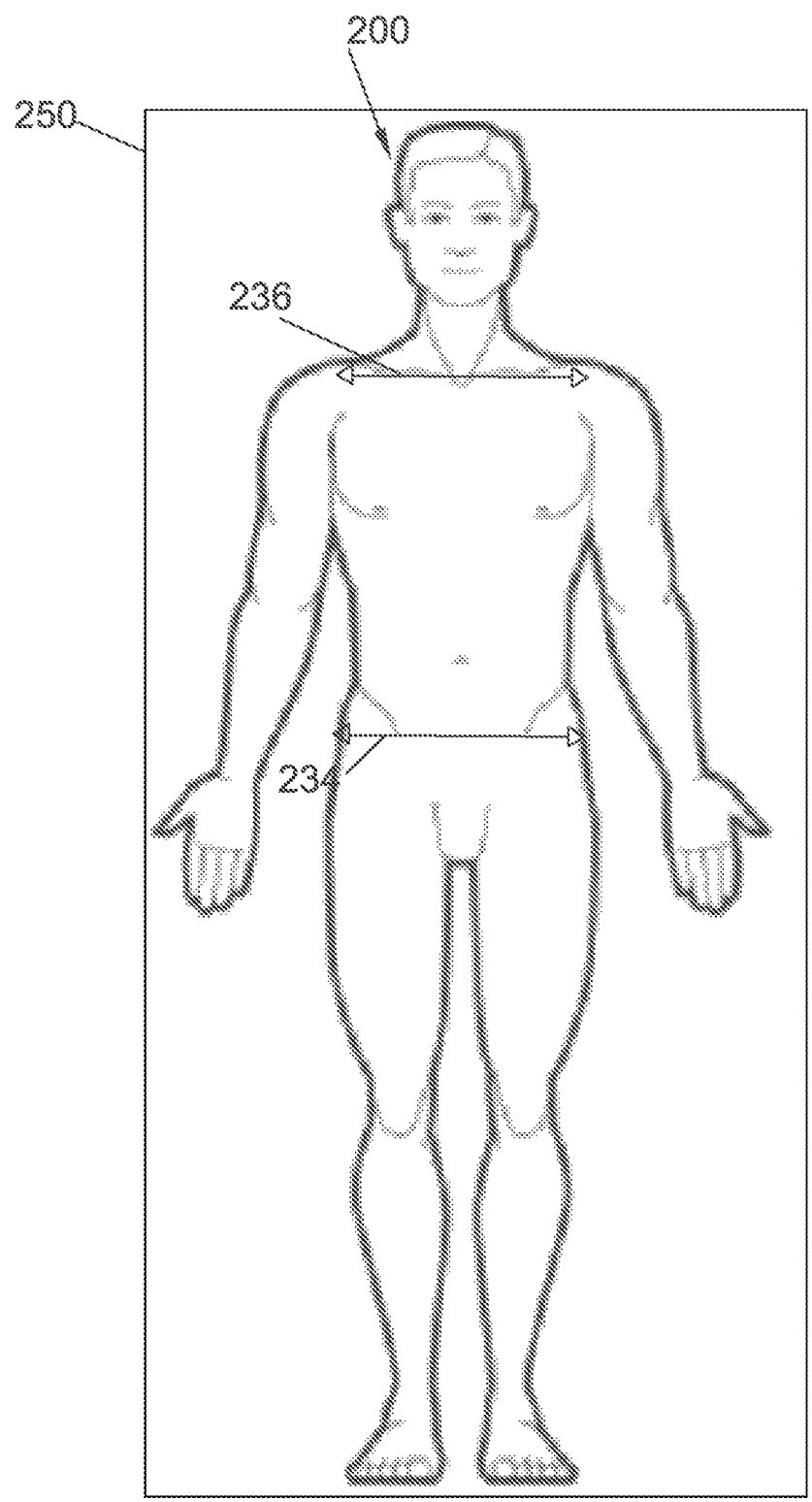
FIG. 7 is a front view of a person showing frontal plane and width dimensions.
Figure 8:
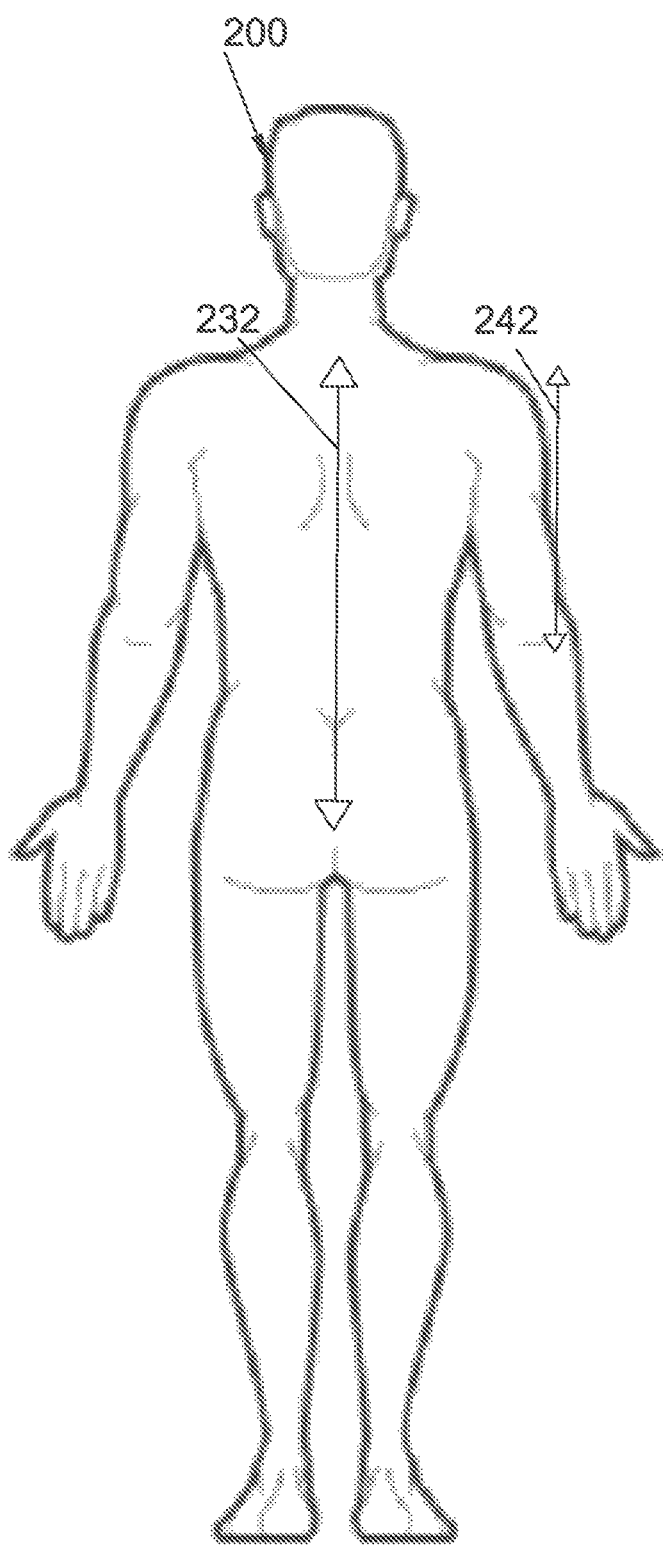
FIG. 8 is a back view of a person showing length dimensions.
Figure 9:
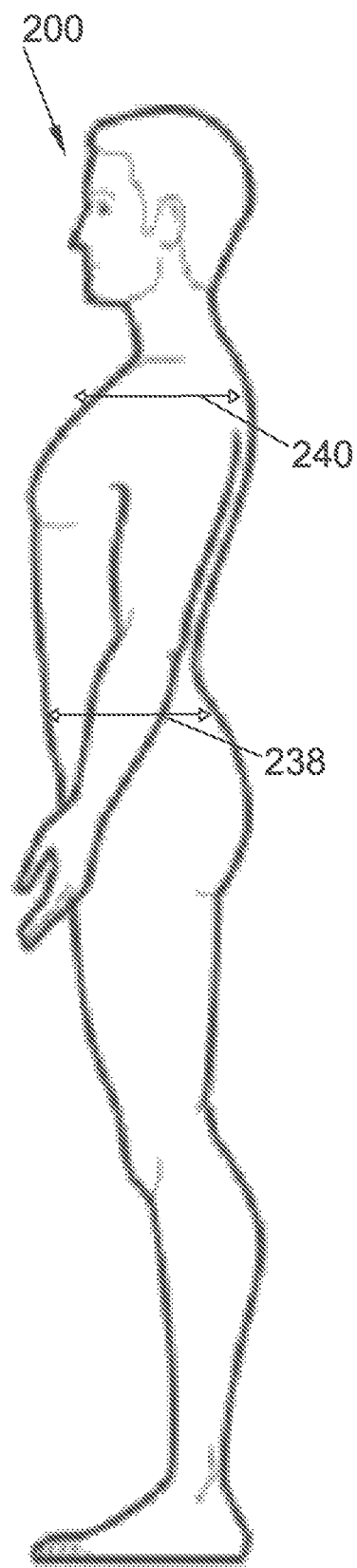
FIG. 9 is a side view of a person showing width dimensions.

FIGS. 7, 8, and 9 are presented here to describe various dimensions used herein in the description of load bearing structure 112. FIG. 7 depicts a front view of person 200 including hip width 234, shoulder width 236, and person's frontal plane 250. FIG. 8 depicts a back view of person 200, including torso height 232 and upper arm length 242. FIG. 9 depicts a side view of person 200 including hip depth 238 and shoulder depth 240.

Figure 10:
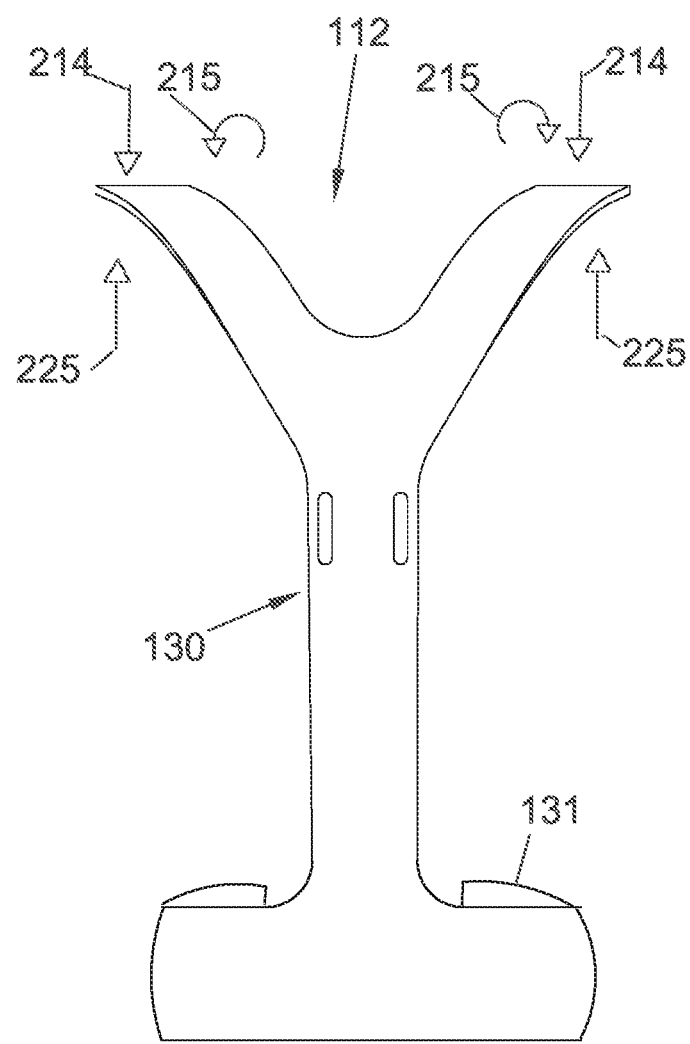
FIG. 10 is a rear view of a load bearing structure of the present invention including a back frame and a hip loading belt.

FIG. 10 through FIG. 13 depict various embodiments of load bearing structures 112. As depicted in FIG. 10, in embodiments, load bearing structure 112 comprises a back frame 130 supporting reaction forces 214 and torques 215 from arm link mechanisms 104 (not shown) and a hip loading belt 131. Hip loading belt 131 transfers at least a portion of the reaction forces 214 and reaction torques 215 to a person's hips 220 (shown in FIG. 14), resulting in a hip reaction force 221. Back frame 130 may also transfer at least a portion of the reaction forces 214 to a person's shoulders 224 (depicted in FIG. 14), as illustrated by shoulder reaction forces 225. Back frame 130 can be custom made, or incrementally sized to accommodate person's torso height 232, hip width 234, shoulder width 236, hip depth 238, shoulder depth 240, or any combination thereof. In some embodiments of the invention, hip loading belt 131 and back frame 130 are constructed as one item.

Figure 11:
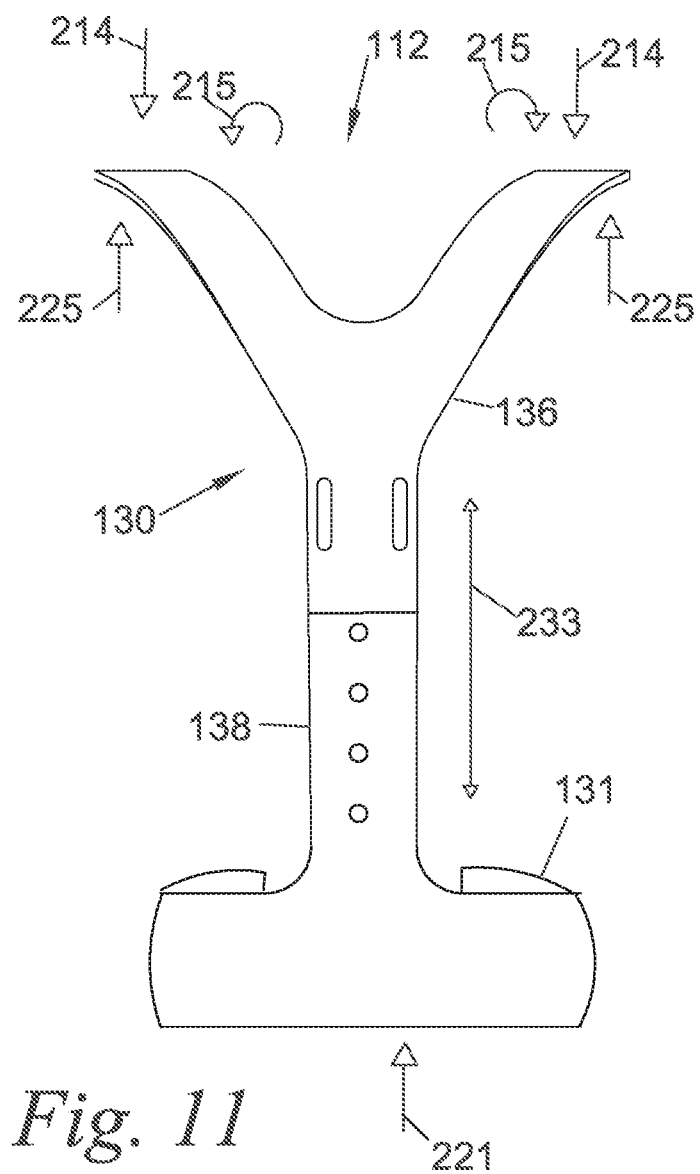
FIG. 11 is a rear view of a back frame of the present invention including an upper frame and a lower frame.

FIG. 11 depicts a further embodiment of loadbearing structure 112 wherein back frame 130 comprises an upper frame 136 coupled to arm link mechanisms 104 (not shown) and a lower frame 138 translationally coupled to upper frame 136 to provide desirable torso height adjustment 233 for person's torso height 232. Lower frame 138 is coupled to, or part of, hip loading belt 131. Reaction forces 214 from arm link mechanisms 104 are supported by upper frame 136, at least a portion of which are transferred to person's hips 220 by hip loading belt 131 via lower frame 138, resulting in hip reaction force 221. Upper Frame 136 may also transfer at least a portion of said reaction forces 214 to person's shoulders 224, as depicted by shoulder reaction forces 225. Upper frame 136 can be custom made, or incrementally sized to accommodate person's shoulder width 236 and shoulder depth 240. Lower frame 138 can be custom made, or incrementally sized to accommodate person's hip width 234 and hip depth 238.

Figure 12:
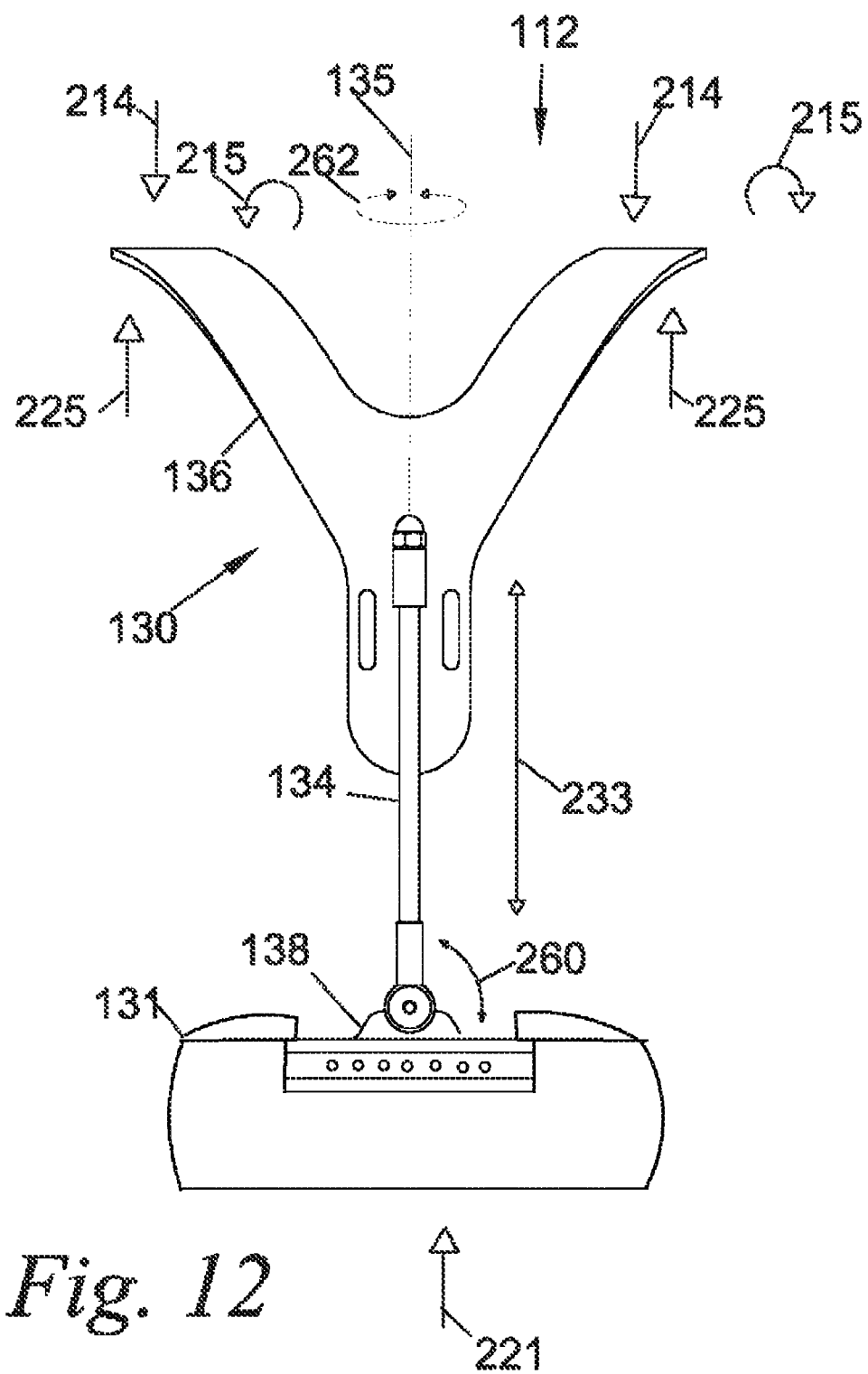
FIG. 12 is a rear view of back frame of the present invention including a spine frame.

FIG. 12 depicts a further embodiment of load bearing structure 112 wherein a back frame 130 further comprises a spine frame 134 connecting an upper frame 136 to a lower frame 138. Spine frame 134 is rotatably coupled to lower frame 138 on its lower end allowing for rotation of spine frame 134 relative to lower frame 138 in person's frontal plane 250. Mediolateral flexion motion 260 shows the direction of movement between spine frame 134 and lower frame 138. Spine frame 134 is rotatably coupled to upper frame 136 along spine frame axis 135. Spinal twisting motion 262 shows the direction of movement between spine frame 134 and upper frame 136. Upper frame 136 may also translate relative to spine frame 134 along spine frame axis 135 to provide torso height adjustment 233 for person's torso height 232. Degrees of freedom of spinal twisting motion 262 between upper frame 136 and spine frame 134 and mediolateral flexion motion 260 between lower frame 138 and spine frame 134 allow upper frame 136 to substantially move in unison with a persons' chest 222 (depicted in FIG. 14), and lower frame 138 to substantially move in unison with person's hips 220.

Figure 13:
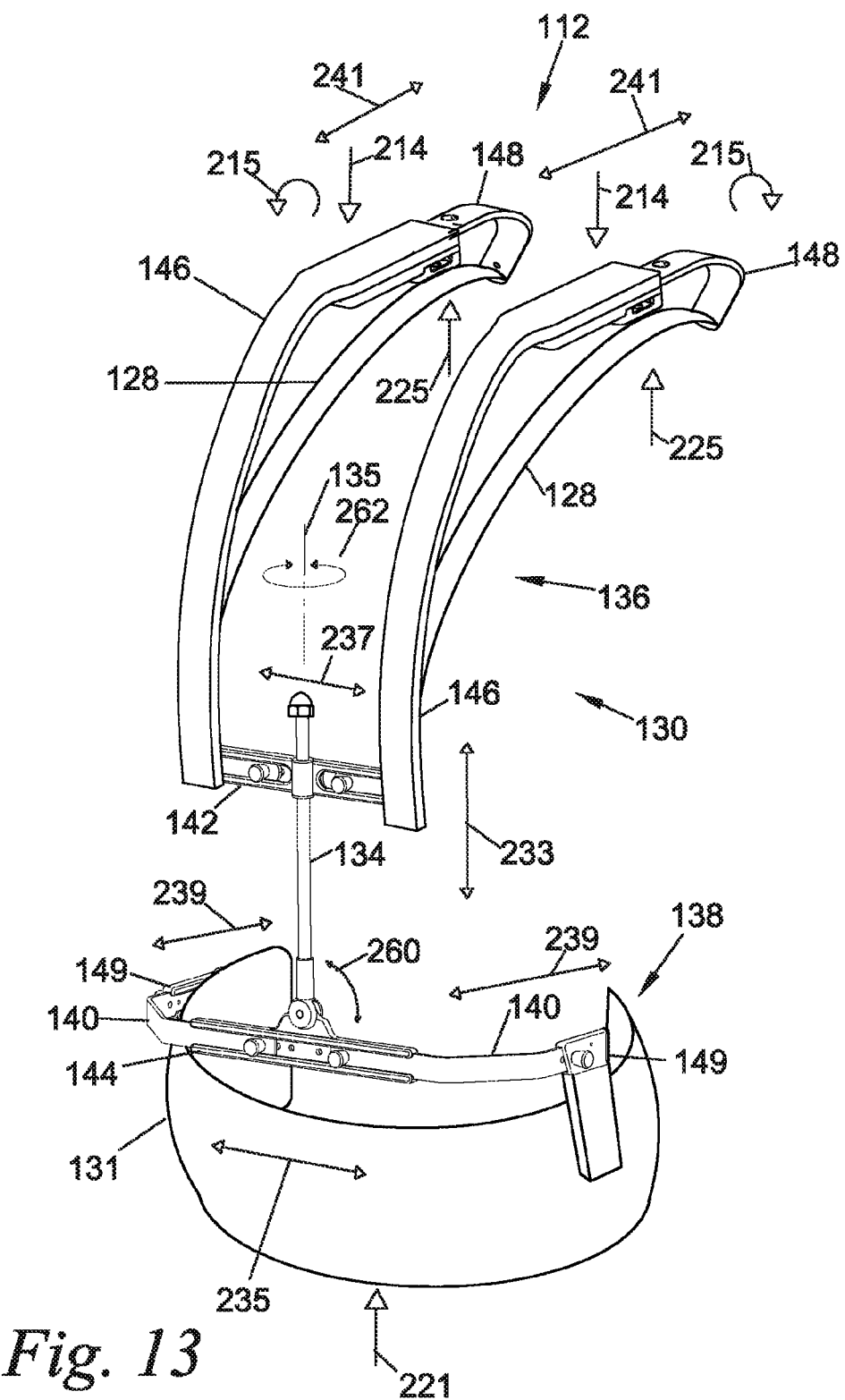
FIG. 13 is a rear view of an upper frame and a lower frame of the present invention including width and depth adjusters.

FIG. 13 depicts another embodiment of load bearing structure 112 wherein a lower frame 138 further comprises a lower middle bar 144 and two lower corner bars 140 wherein each lower corner bar 140 can be coupled to lower middle bar 144 at various locations on said lower middle bar 144 to provide desirable hip width adjustment 235 to accommodate person's hip width 234. Lower frame 138 may further comprise two lower side brackets 149 wherein each lower side bracket 149 can be coupled to lower frame 138 at various locations on lower frame 138 to provide desirable hip depth adjustment 239 to accommodate person's hip depth 238. Upper frame 136 further comprises an upper middle bar 142 and two upper corner bars 146 wherein each upper corner bar 146 can be coupled to upper middle bar 142 at various locations on upper middle bar 142 to provide desirable shoulder width adjustment 237 to accommodate person's shoulder width 236. Upper frame 136 may also comprise two upper side brackets 148 wherein each upper side bracket 148 can be coupled to upper frame 136 at various locations on upper frame 136 to provide desirable shoulder depth adjustment 241 to accommodate person's shoulder depth 240. Upper frame 136 may also comprise hammocks 128 spanning curves in upper frame 136 to more evenly distribute respective shoulder reaction force 225 to person's shoulders 224 (depicted in FIG. 14). Adjustment of upper side brackets, upper corner bars, lower side brackets, and lower corner bars may include the use of plunger pins, screws, clamps, friction locks, rack and pinions, or any combination thereof.

FIG. 14 through FIG. 22 depict various embodiments of the invention where a coupling mechanism 114 includes a belt 116 that attaches to load bearing structure 112 at belt attachment points 115 and at least partially encircles person's hips 220. Belt 116 can move in unison with person's hips 220. In some embodiments belt 116 can change length to allow secure attachment to person's hips 220.

Figure 14:
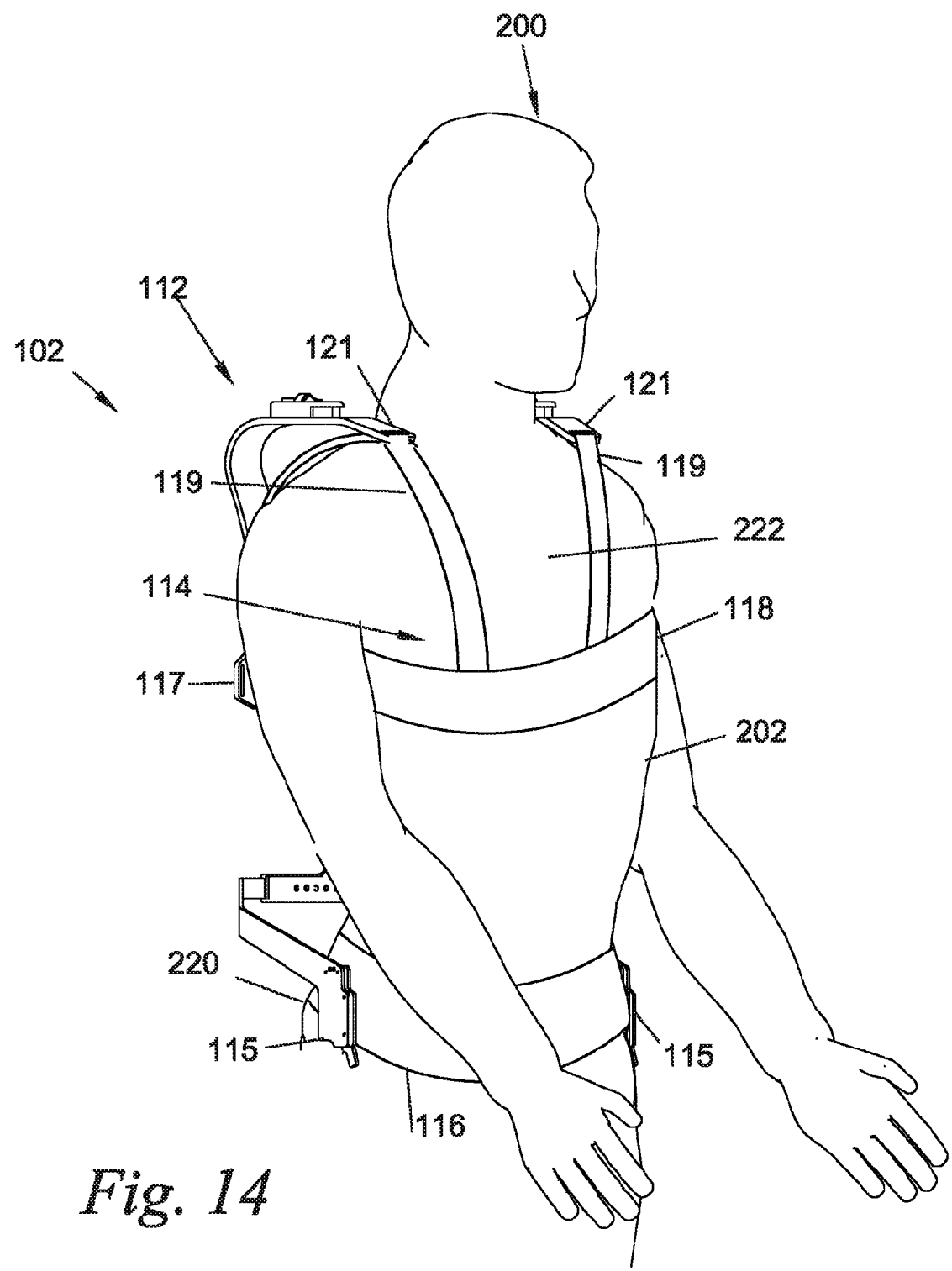
FIG. 14 is a front perspective view of a coupling mechanism of the present invention including a belt, a chest strap, and an anchor strap.
Figure 15:
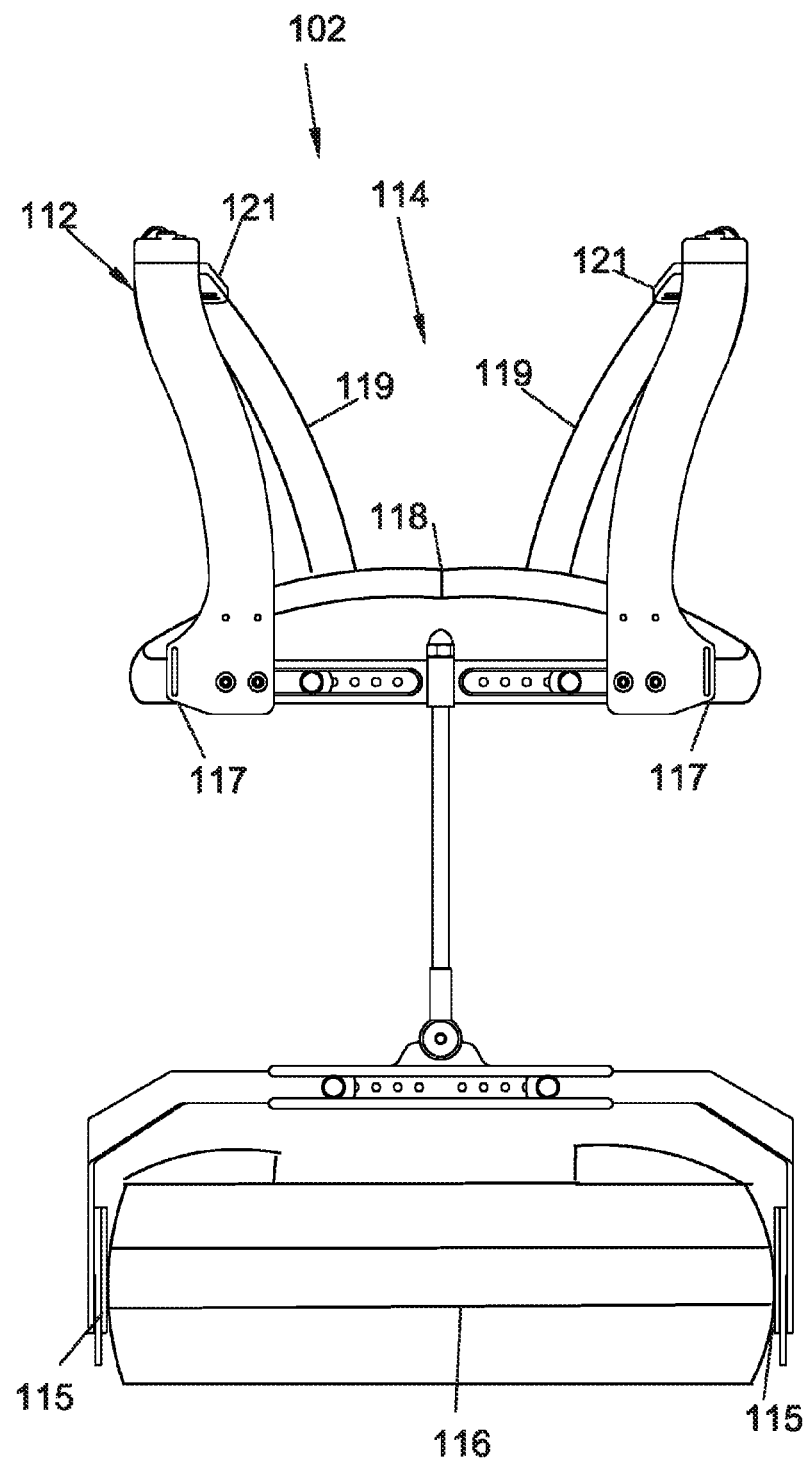
FIG. 15 is rear view of a coupling mechanism of the present invention including a belt, a chest strap, and an anchor strap.
Figure 16:
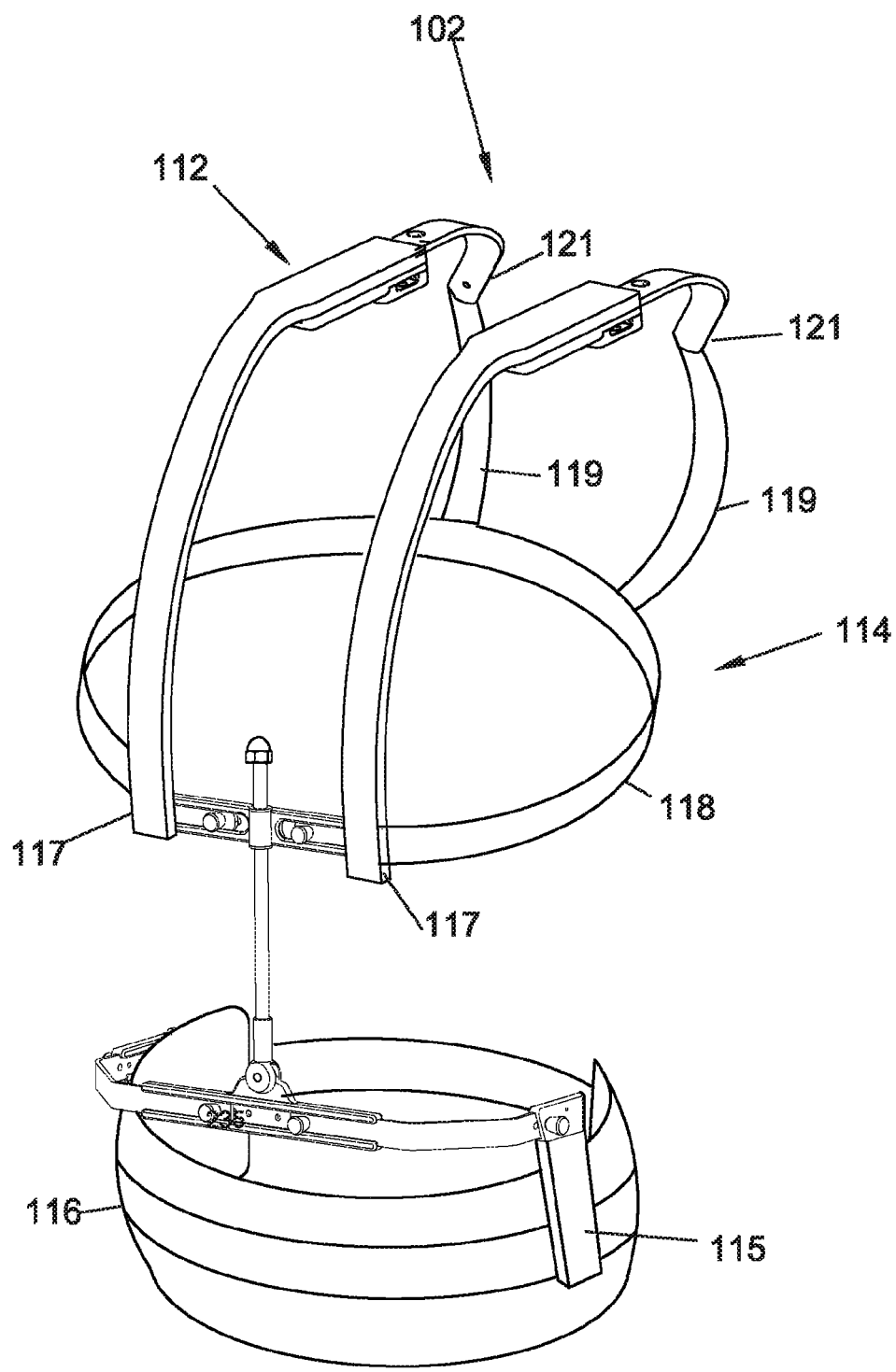
FIG. 16 is a back perspective view of a coupling mechanism of the present invention including a belt, a chest strap, and an anchor strap.

FIGS. 14, 15 and 16 depict various embodiments of the shoulder base 102. FIG. 14 shows a front perspective view of shoulder base 102 with person 200. FIG. 15 shows a rear view of shoulder base 102 without person 200. FIG. 16 shows a rear perspective view of shoulder base 102 without person 200. In this embodiment, a coupling mechanism 114 includes a chest strap 118. Chest strap 118 at least partially encircles person's chest 222. Chest strap 118 is mounted to load bearing structure 112 at mid-dorsal attachment points 117 approximately at the level of person's chest 222. In some embodiments coupling mechanism 114 includes at least one anchor strap 119 mounted to load bearing structure 112 at upper ventral attachment points 121 at its first end, and attaches to chest strap 118 at its second end. Chest strap 118 and anchor strap 119 move in unison with person's chest 222. In some embodiments, chest strap 118 and anchor strap 119 can change length to allow secure attachment to person's chest 222. In some embodiments of the invention chest strap 118 is rigid to prevent deflection due to the tightening of anchor straps 119.

Figure 17:
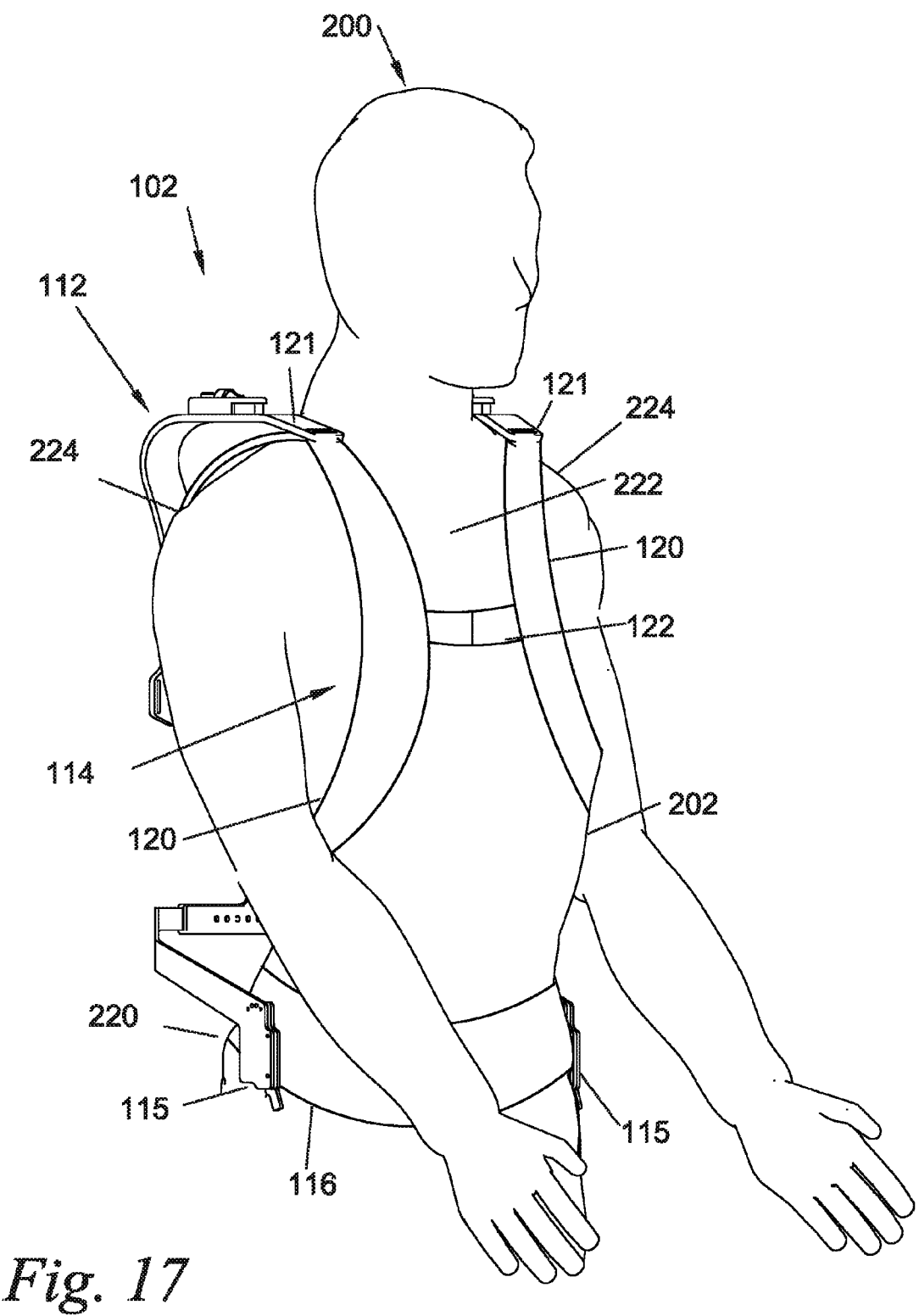
FIG. 17 is a front perspective view of a coupling mechanism of the present invention including a belt, a shoulder strap, and a sternum strap.
Figure 18:
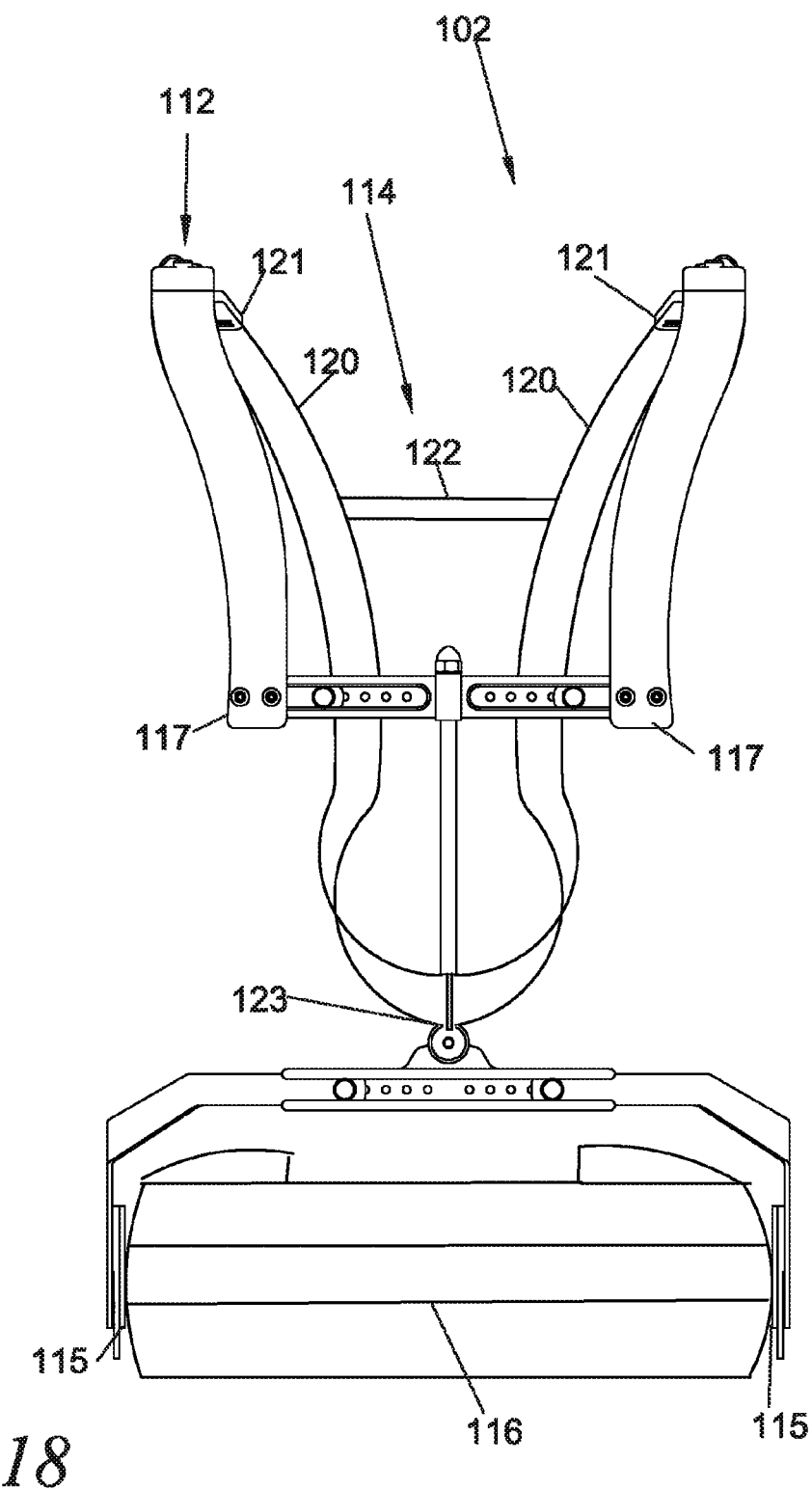
FIG. 18 is a rear view of a coupling mechanism of the present invention including a belt, a shoulder strap, and a sternum strap.
Figure 19:
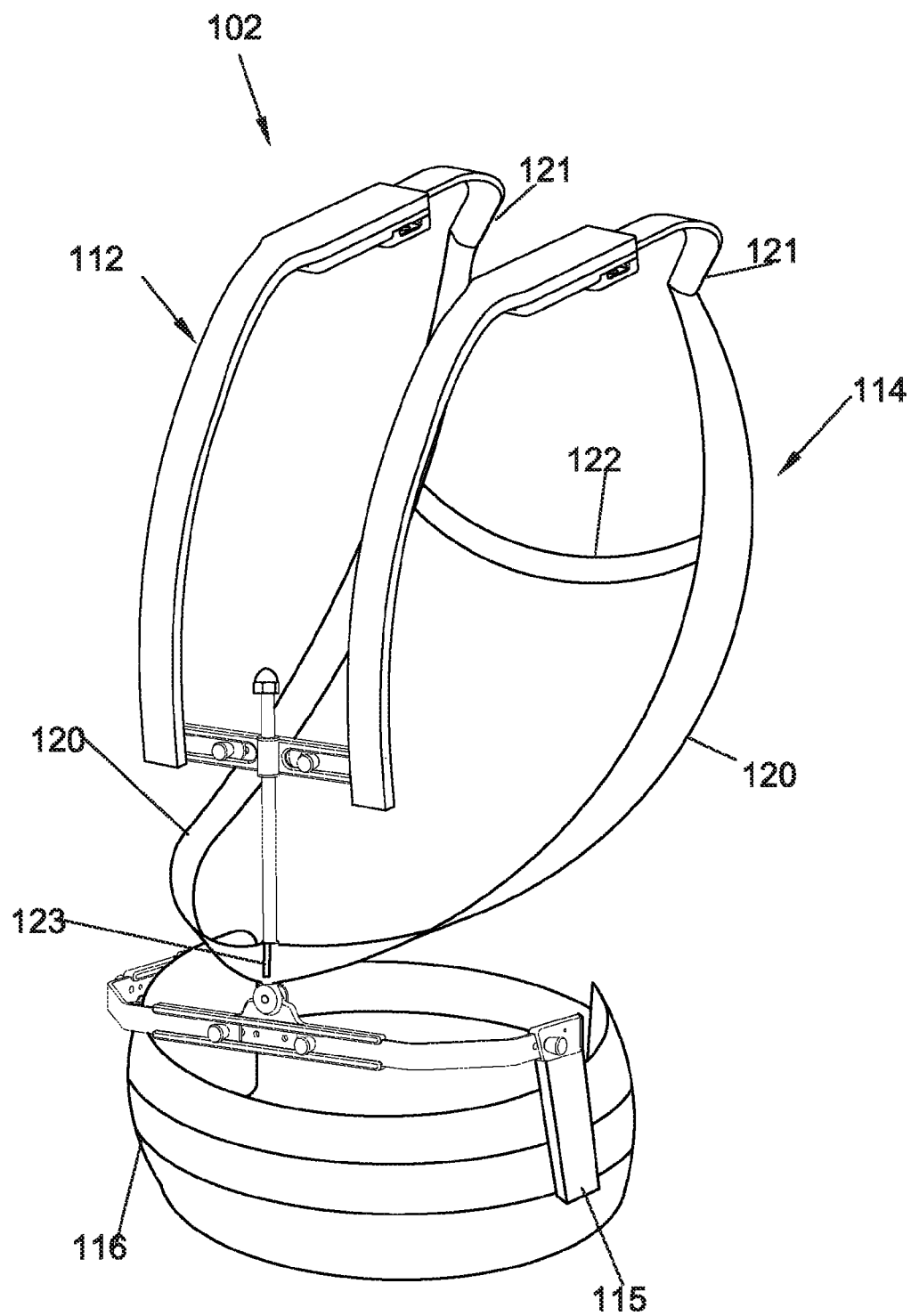
FIG. 19 is a back perspective view of a coupling mechanism of the present invention comprising a belt, a shoulder strap, and a sternum strap.

FIGS. 17, 18 and 19 depict various embodiments of the shoulder base 102. FIG. 17 shows a front perspective view of shoulder base 102 with person 200. FIG. 18 shows a rear view of shoulder base 102 without person 200. FIG. 19 shows a rear perspective view of shoulder base 102 without person 200. In this embodiment, coupling mechanism 114 includes at least two shoulder straps 120. Two shoulder straps 120 at least partially encircle person's shoulders 224. Each shoulder strap 120 is mounted to load bearing structure 112 at respective upper ventral attachment points 121 on a first end and at lower dorsal attachment points 123 on a second end. In some embodiments a sternum strap 122 connects to one shoulder strap 120 at its first end and another shoulder strap 120 at its second end. Shoulder strap 120 and sternum strap 122 move in unison with person's chest 222. In some embodiments shoulder strap 120 and sternum strap 122 can change length to allow secure attachment to person's chest 222. In some embodiments shoulder strap 120 is mounted to load bearing structure 112 at upper ventral attachment point 121 on its first end and middle dorsal attachment points 117 at its second end.

Figure 20:
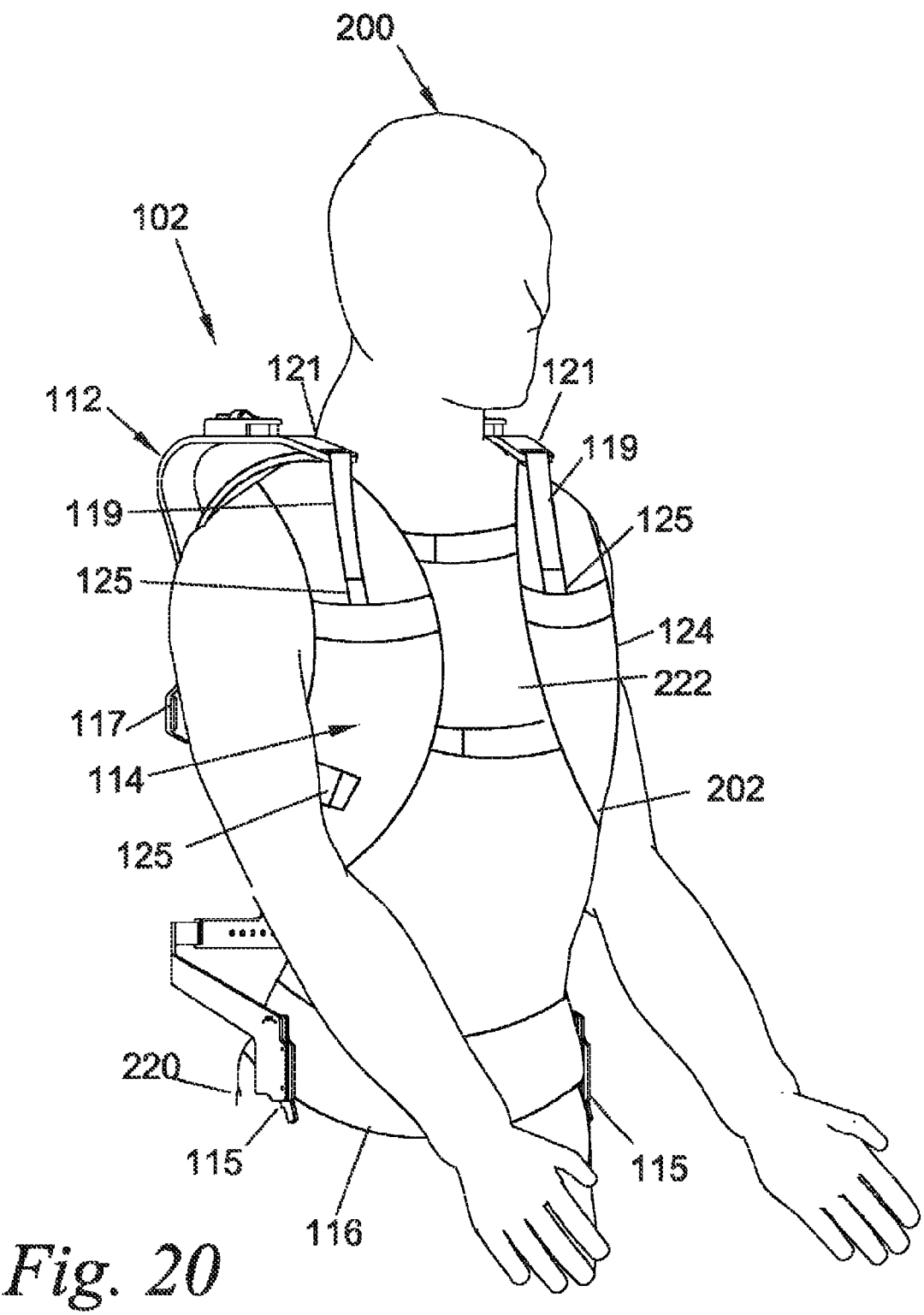
FIG. 20 is a front perspective view of a coupling mechanism of the present invention including a belt and a vest.
Figure 21:
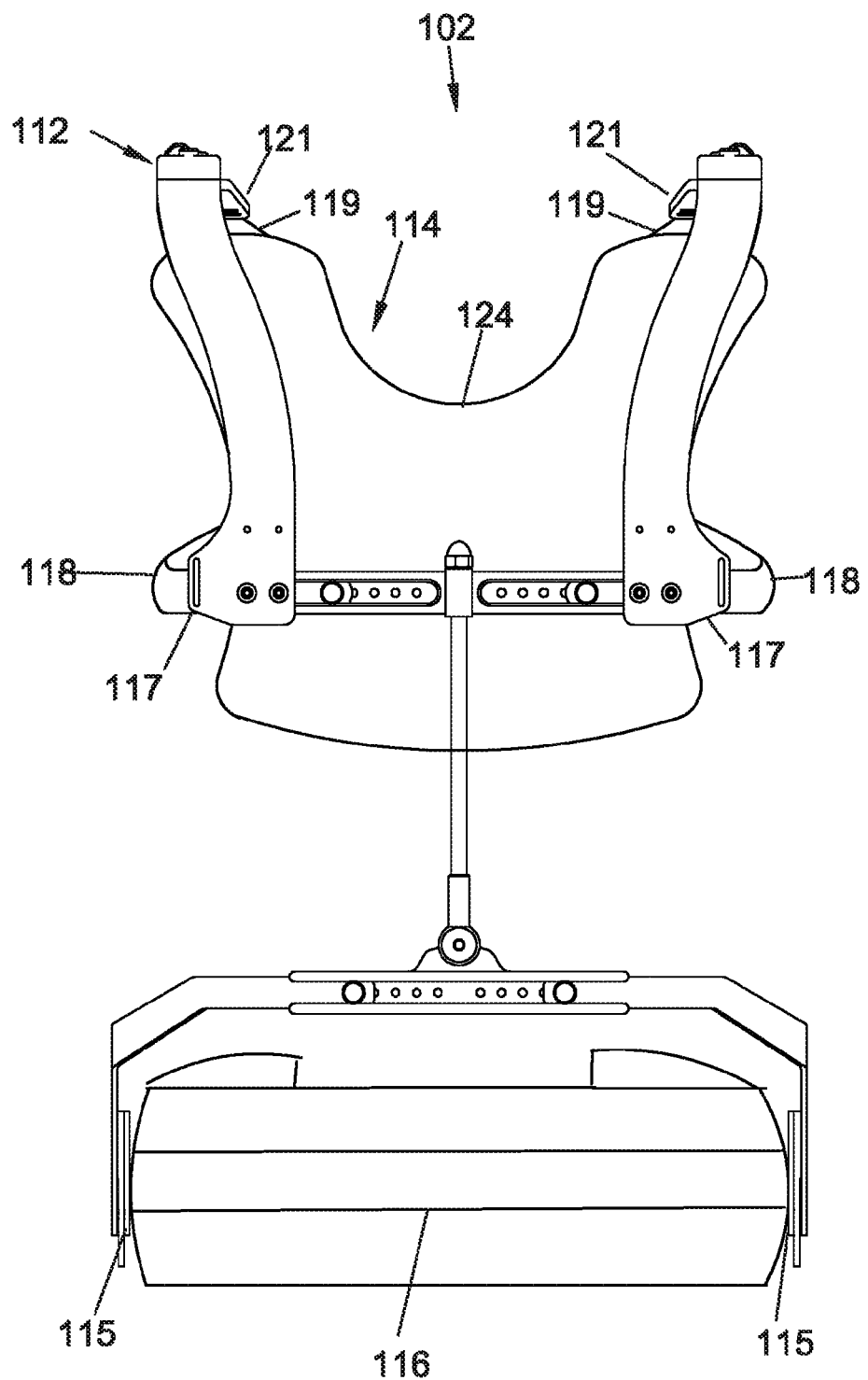
FIG. 21 is a rear view of a coupling mechanism of the present invention including a belt and a vest.
Figure 22:
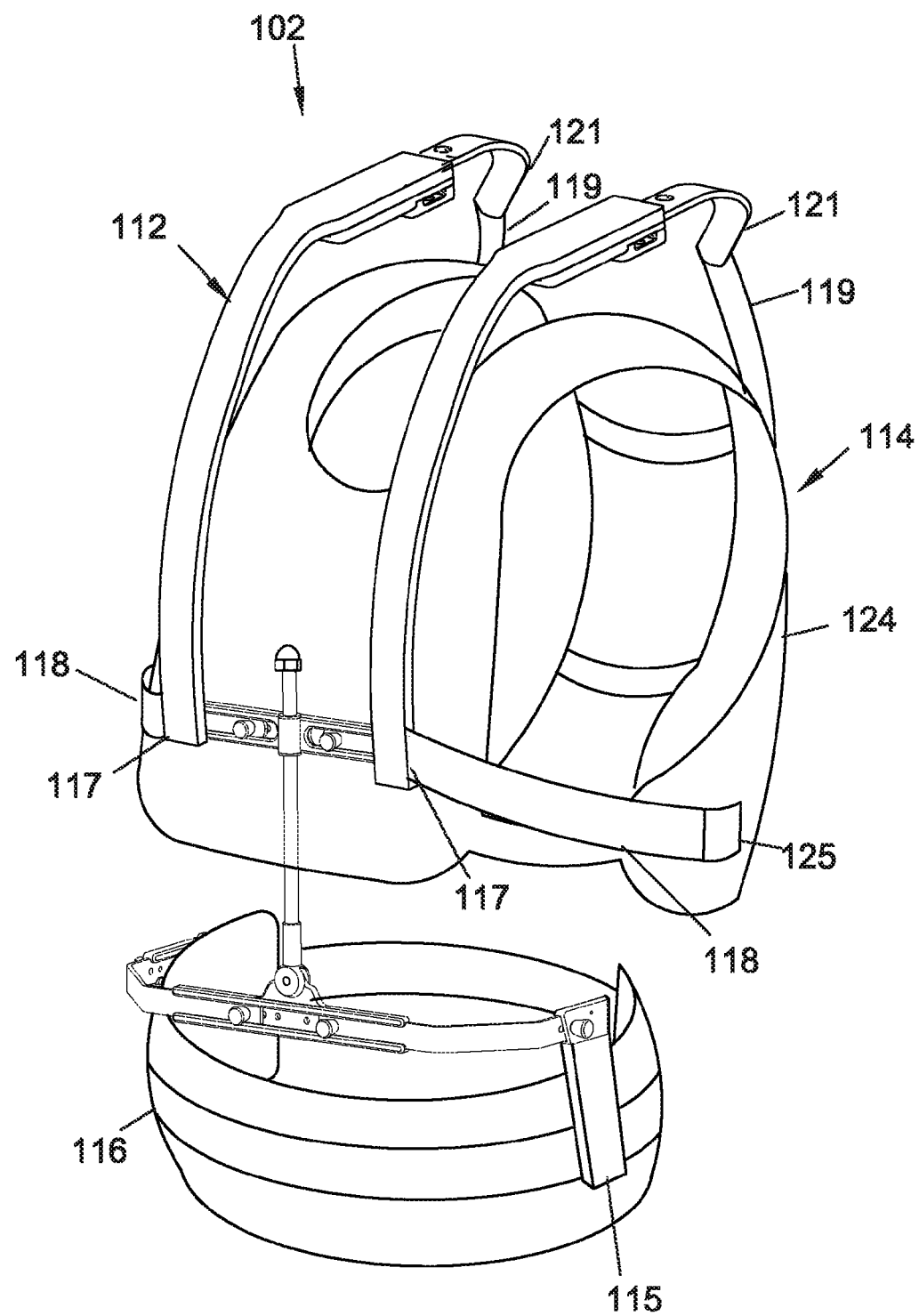
FIG. 22 is a back perspective view of a coupling mechanism of the present invention including a belt and a vest.

FIGS. 20, 21 and 22 depict various embodiments of the shoulder base 102. FIG. 20 shows a front perspective view of shoulder base 102 with person 200. FIG. 21 shows a rear view of shoulder base 102 without person 200. FIG. 22 shows a rear perspective view of shoulder base 102 without person 200. In this embodiment, coupling mechanism 114 includes a vest 124 that securely attaches to person's chest 222. Vest 124 can move in unison with person's chest 222. In some embodiments vest 124 is connected to shoulder base 102 by a plurality of vest attachment points 125. In some embodiments, vest attachment points 125 attach to chest straps 118, anchor straps 119, shoulder straps 120, sternum straps 122, or any combination thereof.

Figure 23:
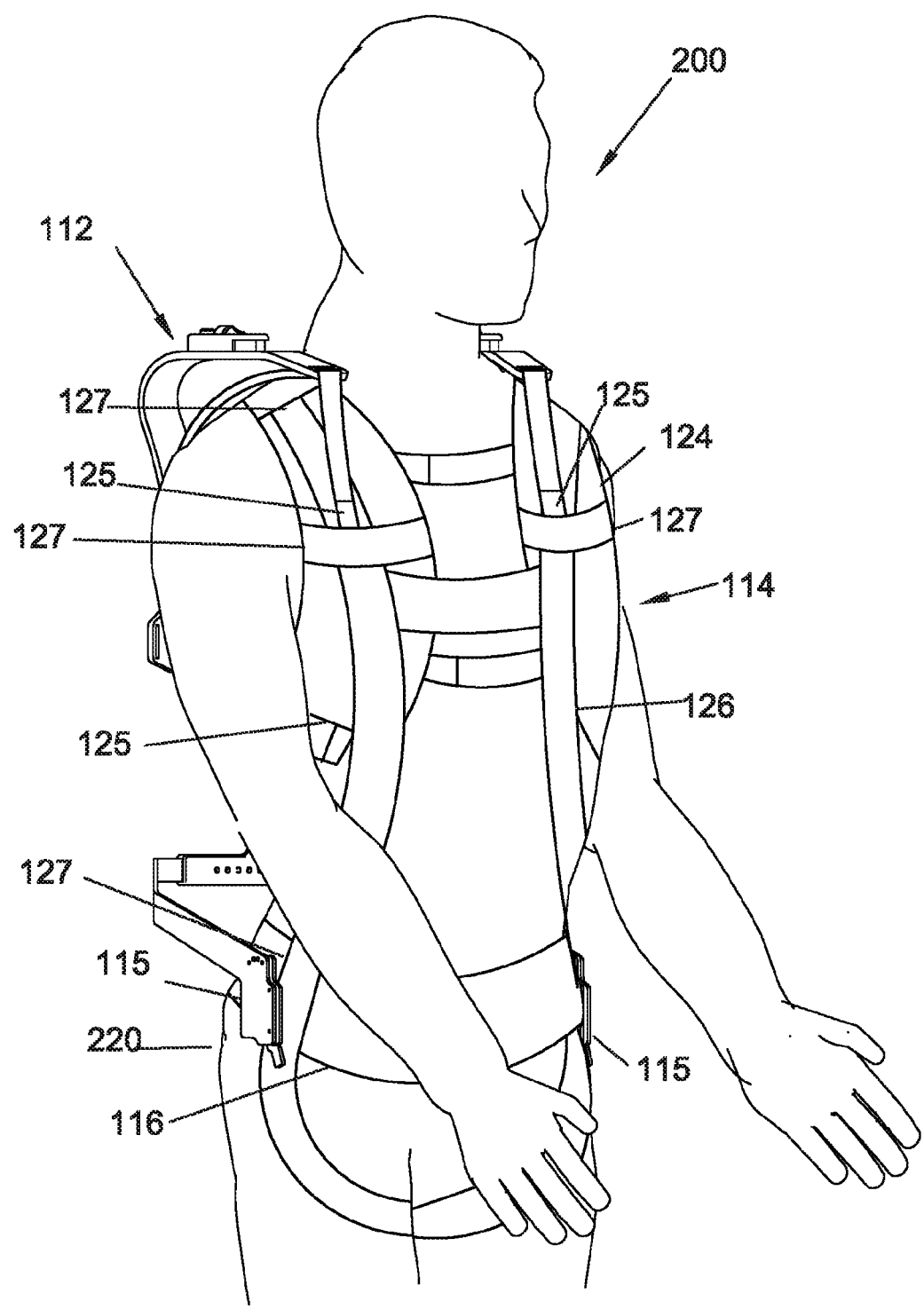
FIG. 23 is a front perspective view of a coupling mechanism of the present invention including a vest connected to a safety harness.
Figure 24:
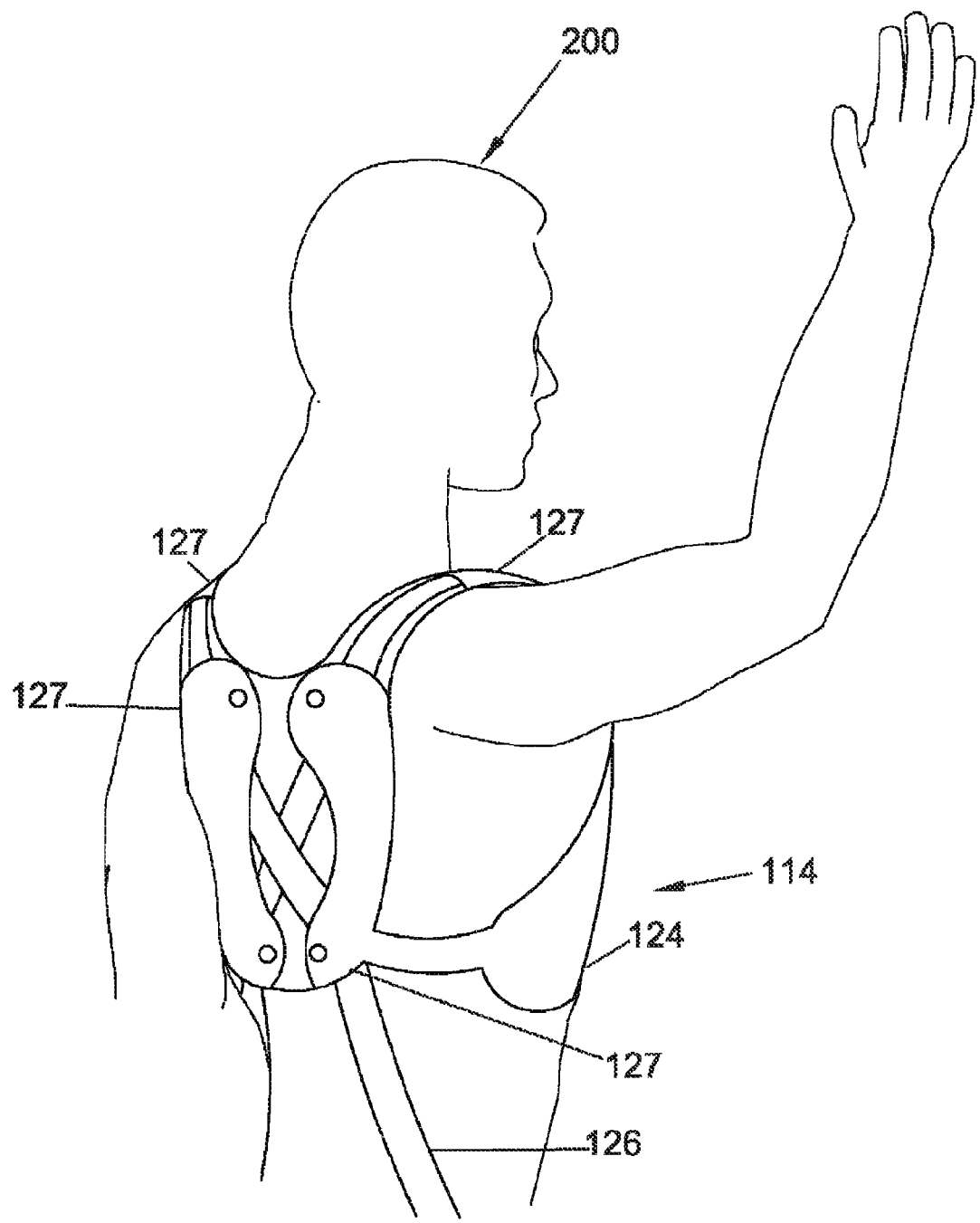
FIG. 24 is a rear perspective view of a coupling mechanism of the present invention including a vest connected to a safety harness.
Figure 25:
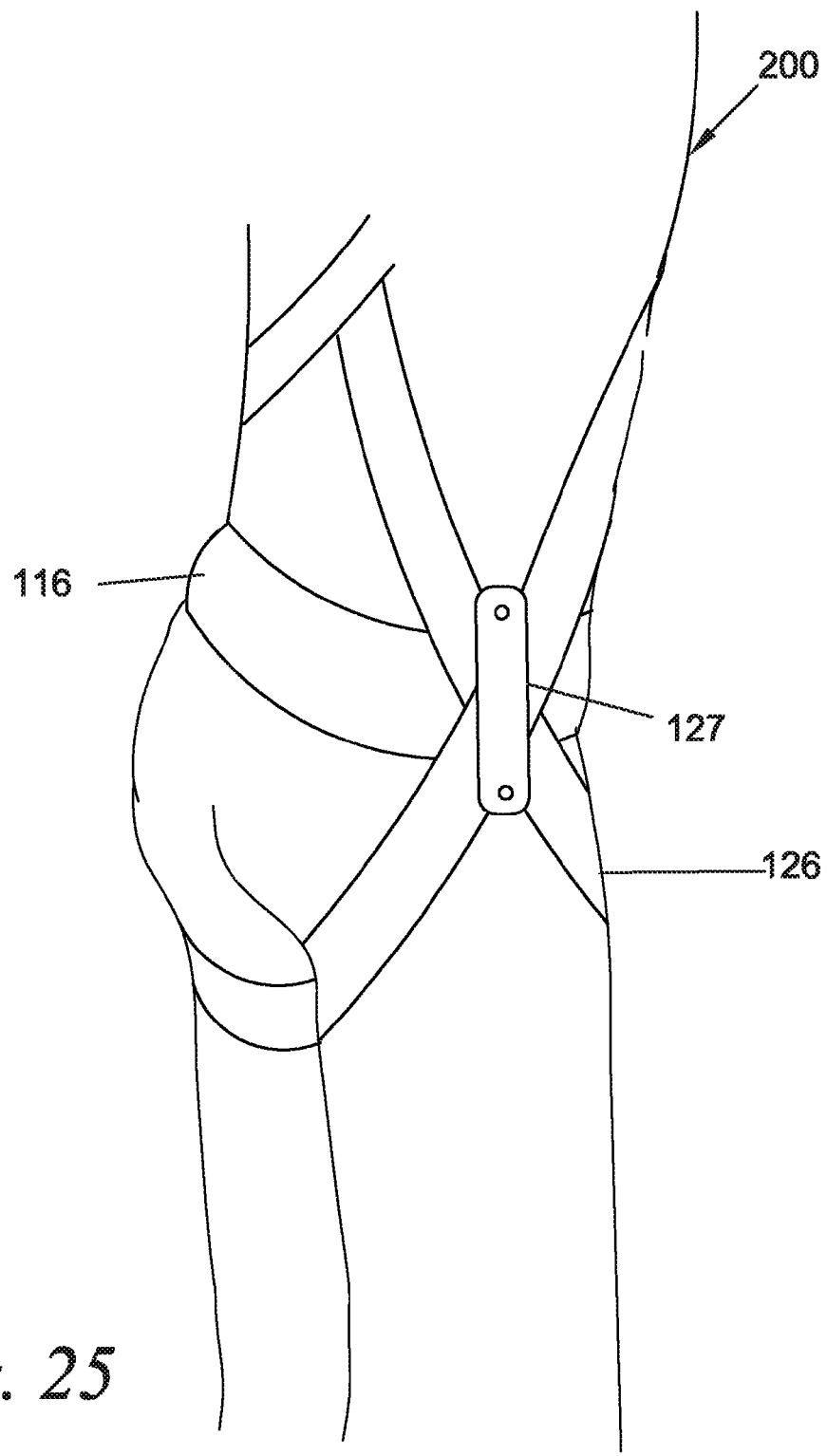
FIG. 25 is a rear perspective view of a coupling mechanism of the present invention including a belt connected to a safety harness.

FIG. 23 through FIG. 25 depict embodiments of shoulder base 102 wherein coupling mechanism 114 can be coupled to a safety harness 126 worn by person 200 by at least one safety harness attachment point 127 without modification of safety harness 126. FIG. 23 and FIG. 24 depict an embodiment of the invention wherein vest 124 contains at least one safety harness attachment point 127. Safety harness attachment points 127 allow vest 124 to attach to safety harness 126 without modification of safety harness 126. Safety harness attachment points 127 may be located on the front, shoulder, or back of vest 124. FIG. 23 shows a front perspective view of safety harness attachment points 127 on the front and shoulders of vest 124. FIG. 24 depicts a close up back perspective view of the embodiment (without load bearing structure 112), including safety harness attachment points 127 on a back and shoulders of vest 124. Safety harness attachment points 127 may be formed by VELCRO loops, buttoned flaps, straps, buckles, clips, clamps, or any combination thereof. FIG. 25 depicts an embodiment of the invention wherein belt 116 contains at least one safety harness attachment point 127. Safety harness attachment point 127 allows safety harness 126 to be attached to belt 116 without modification of safety harness 126. In some embodiments safety harness attachment points 127 are located on the sides of belt 116. Safety harness attachment points 127 may be formed by VELCRO loops, buttoned flaps, straps, buckles, clips, clamps, or any combination thereof.

Figure 26:
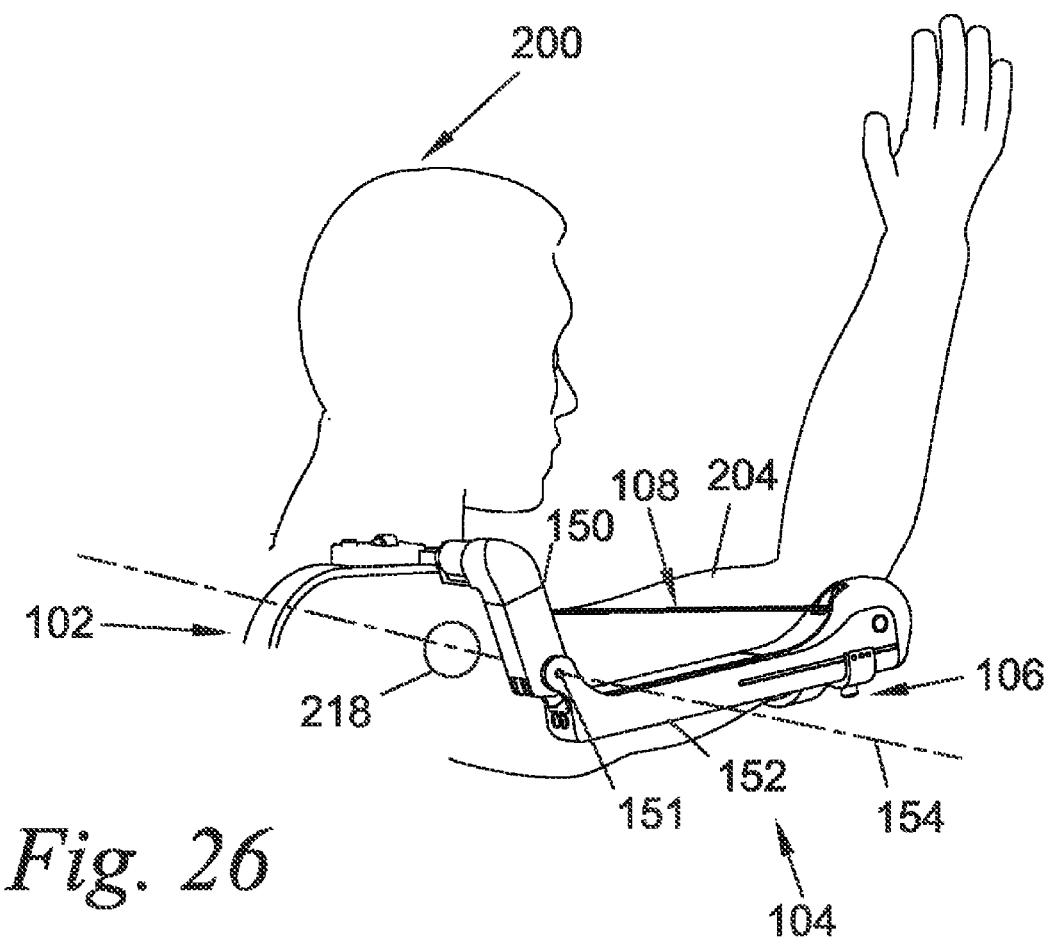
FIG. 26 is a rear perspective close up view of an assist device of the present invention showing a first rotational axis aligning with a user's glenohumeral joint.
Figure 27:
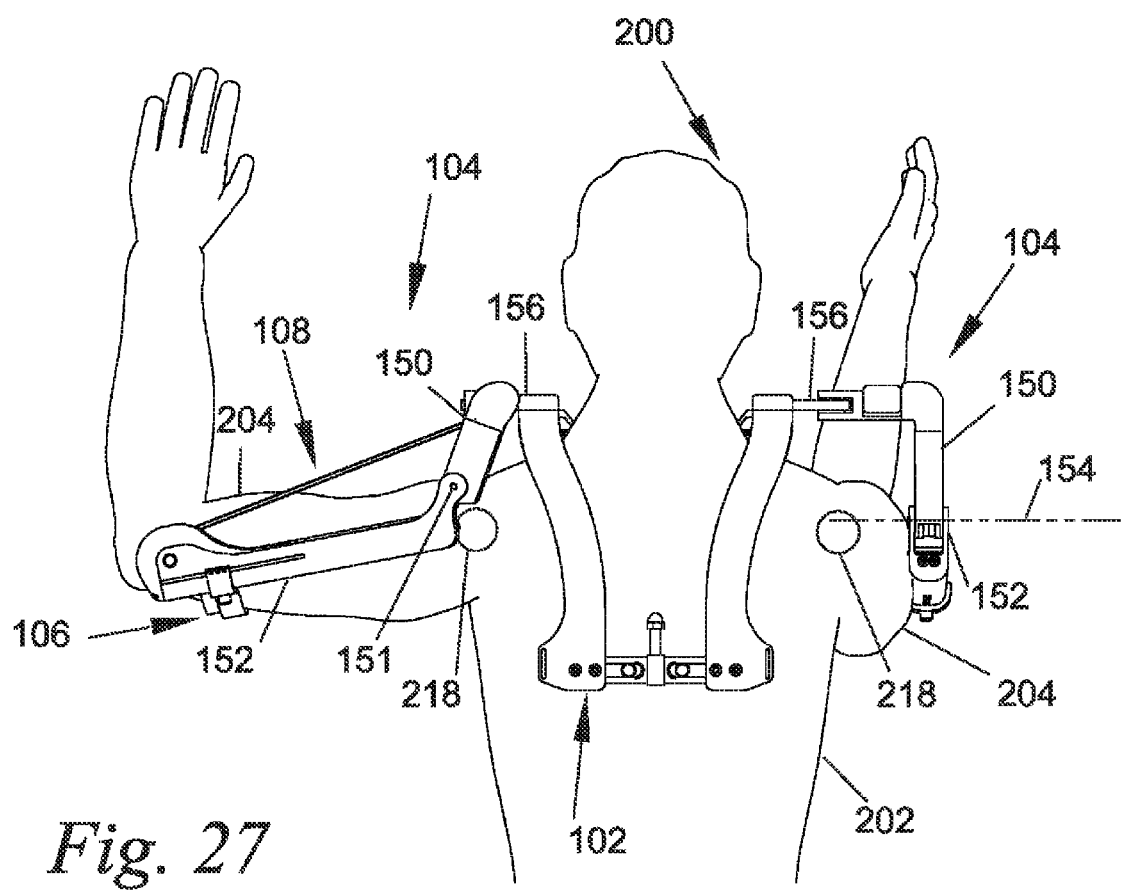
FIG. 27 is a rear view of an assist device of the present invention showing a first rotational axis aligning with a user's glenohumeral joint.

FIG. 26 depicts the close up view of arm link mechanism 104. In this embodiment first rotational axis 154 of first joint 151 approximately passes through person's glenohumeral joint 218. FIG. 27 depicts a back view of this embodiment wherein arm support exoskeleton 100 contains two arm link mechanisms 104.

Figure 28:
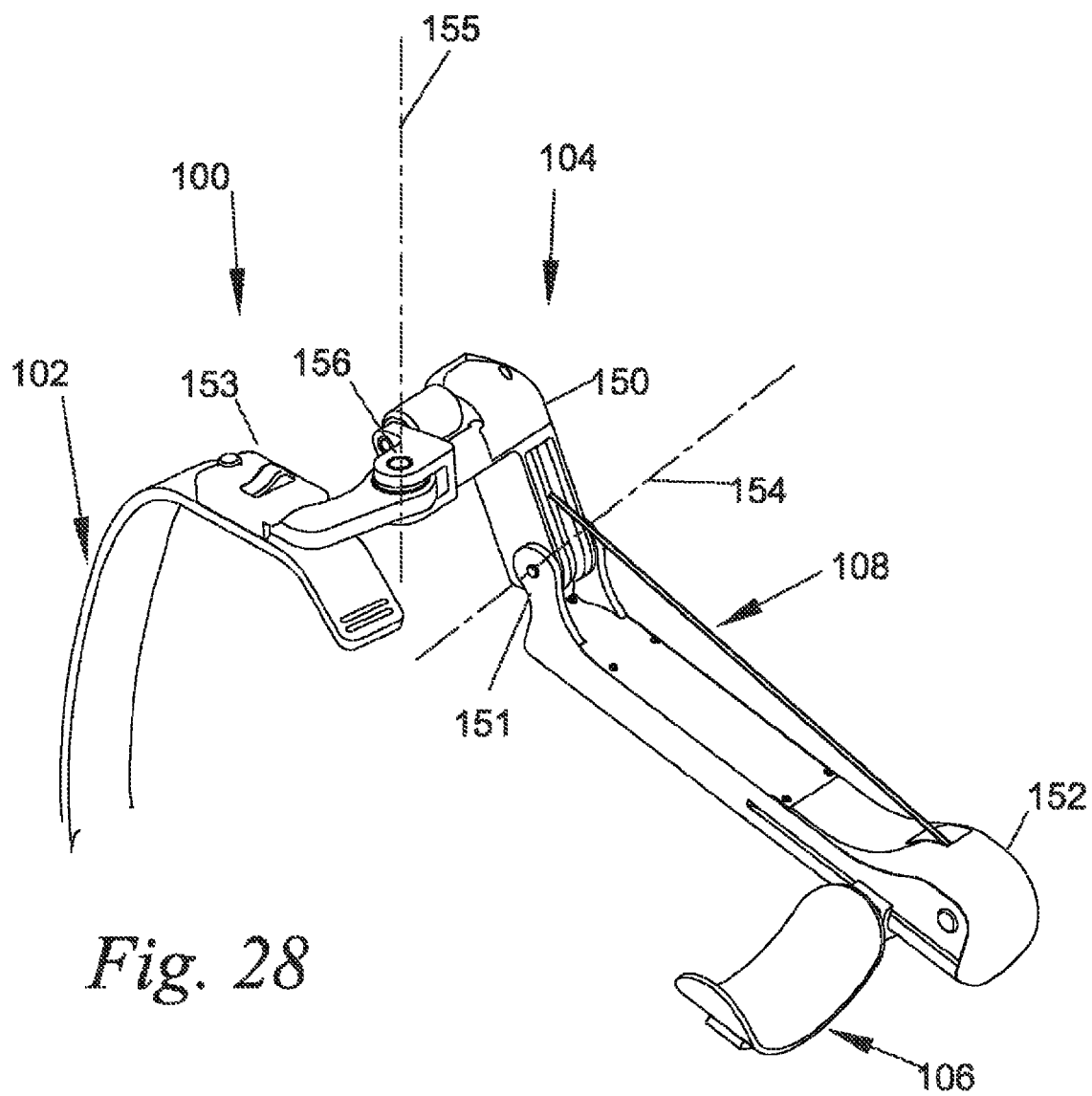
FIG. 28 is a perspective view of an arm link mechanism of the present invention including a second rotational axis.
Figure 29:
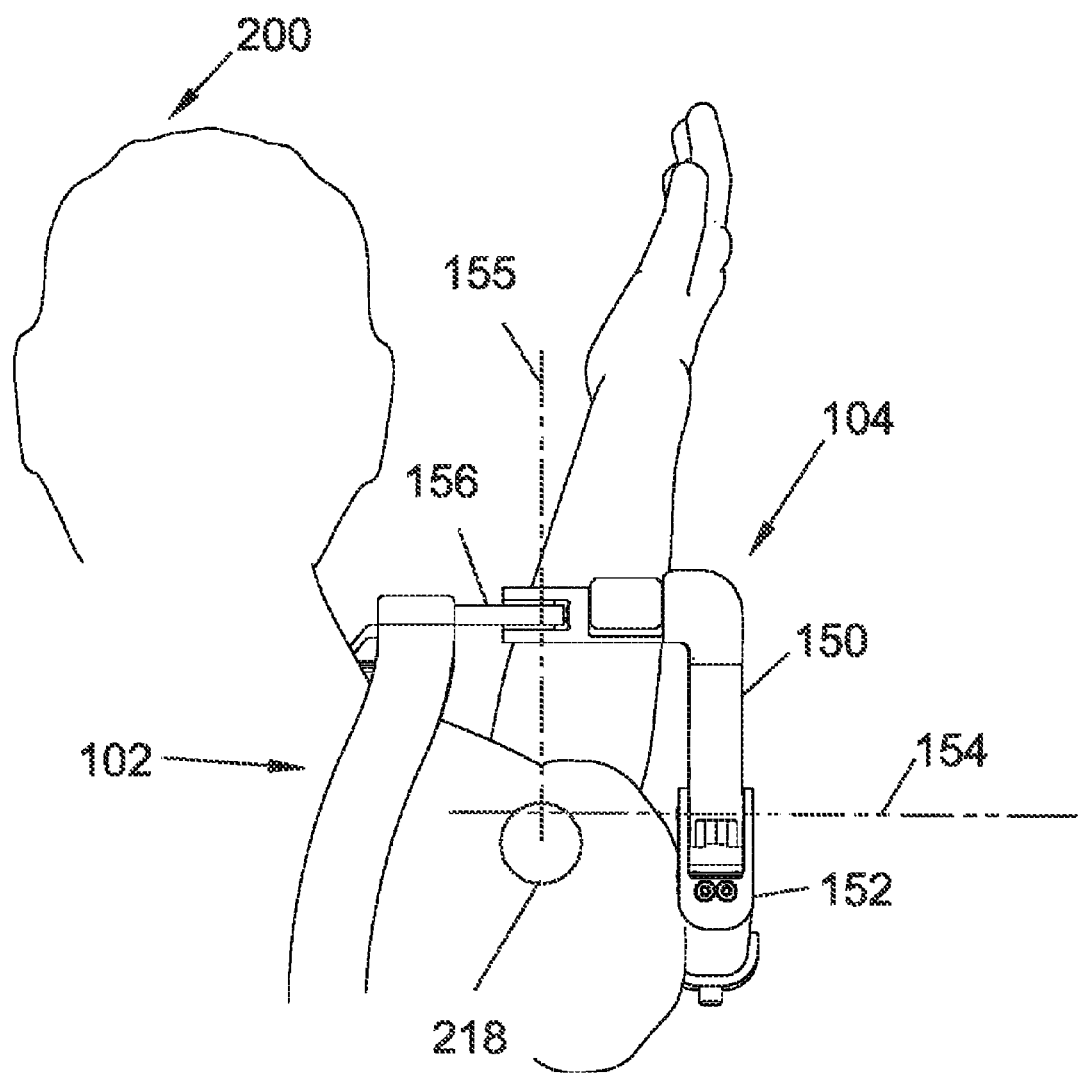
FIG. 29 is a rear close up view of the second rotational axis of FIG. 28 aligning with a user's glenohumeral joint.

FIG. 28 and FIG. 29 depict another embodiment of arm supporting exoskeleton 100 wherein arm link mechanism 104 comprises at least one horizontal rotation joint 156. Horizontal rotation joint 156 allows proximal link 150 to rotate relative to shoulder base 102 about a second rotational axis 155. Second rotational axis 155 is substantially orthogonal to first rotational axis 154. FIG. 29 shows a rear view of the arm link mechanism 104, wherein the second rotational axis 155 is shown to substantially pass through person's glenohumeral joint 218.

Figure 30:
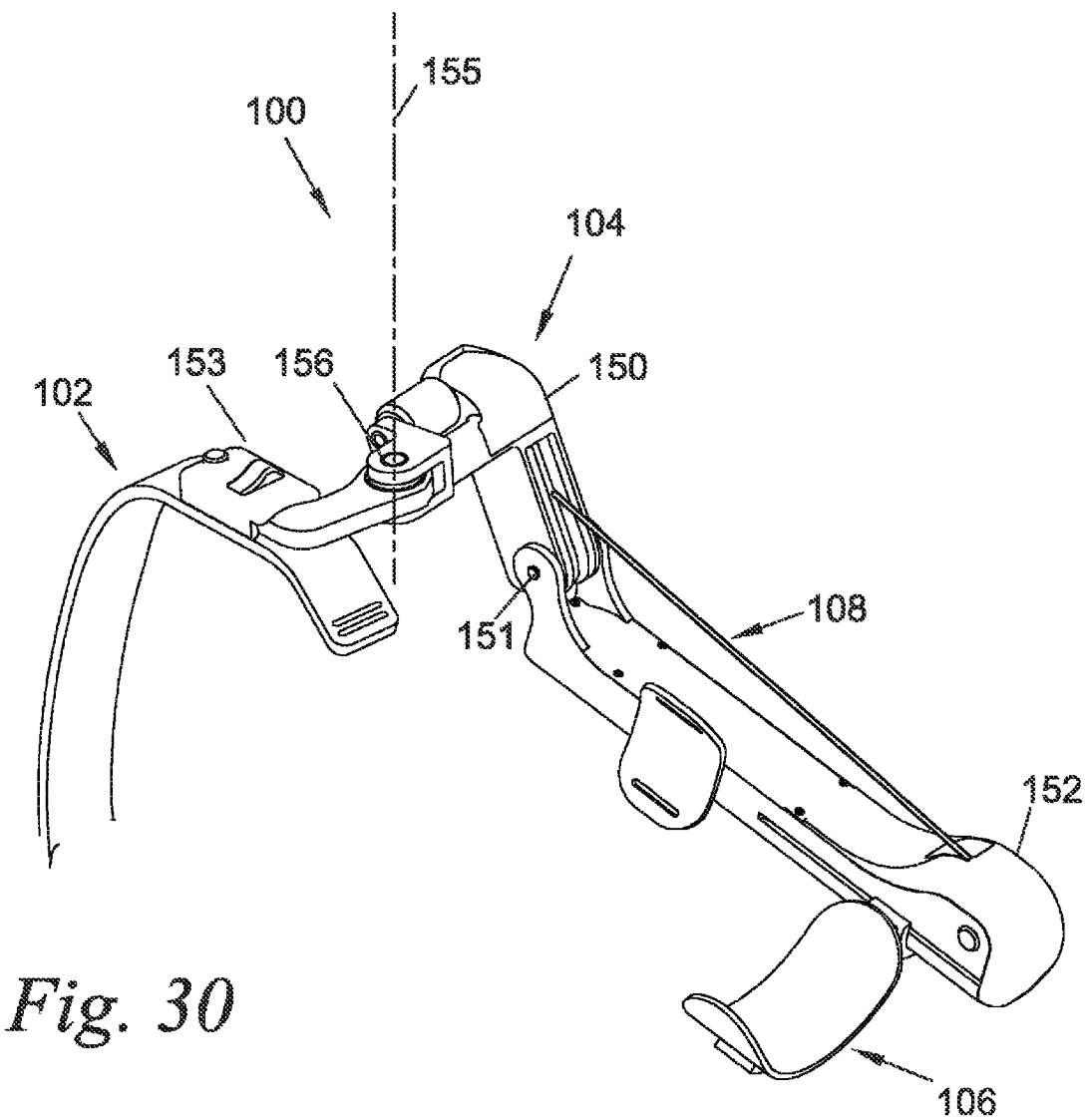
FIG. 30 is a perspective view of shoulder bracket connecting shoulder base to arm link mechanism.
Figure 31:
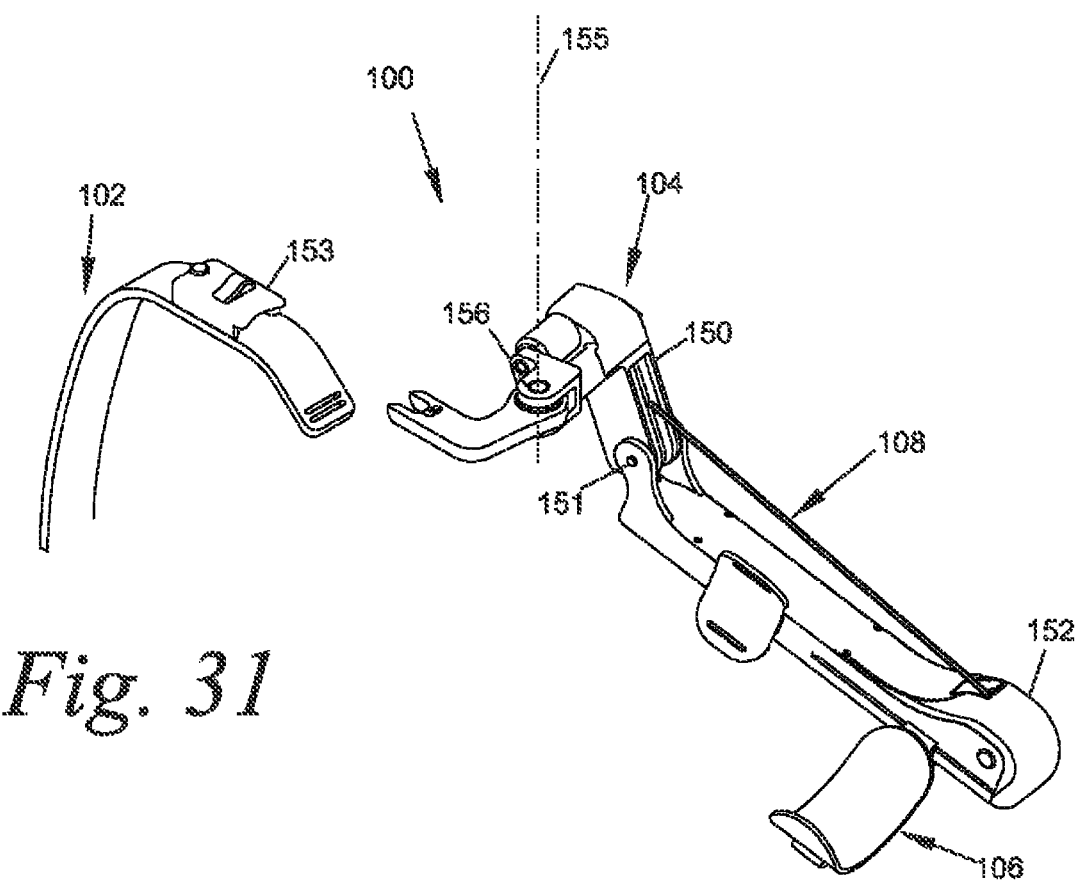
FIG. 31 is a perspective view of a shoulder bracket of the present invention showing an arm link mechanism removed from a shoulder base.

FIG. 30 and FIG. 31 depict an embodiment of arm support exoskeleton 100 that comprises at least one shoulder bracket 153 coupled to shoulder base 102. Shoulder bracket 153 facilitates a quick connect and disconnect coupling between arm link mechanism 104 and shoulder base 102. FIG. 30 depicts shoulder bracket 153 coupling arm link mechanism 104 to shoulder base 102. FIG. 31 shows shoulder bracket 153 allowing arm link mechanism 104 to be removed from shoulder base 102.

Figure 32:
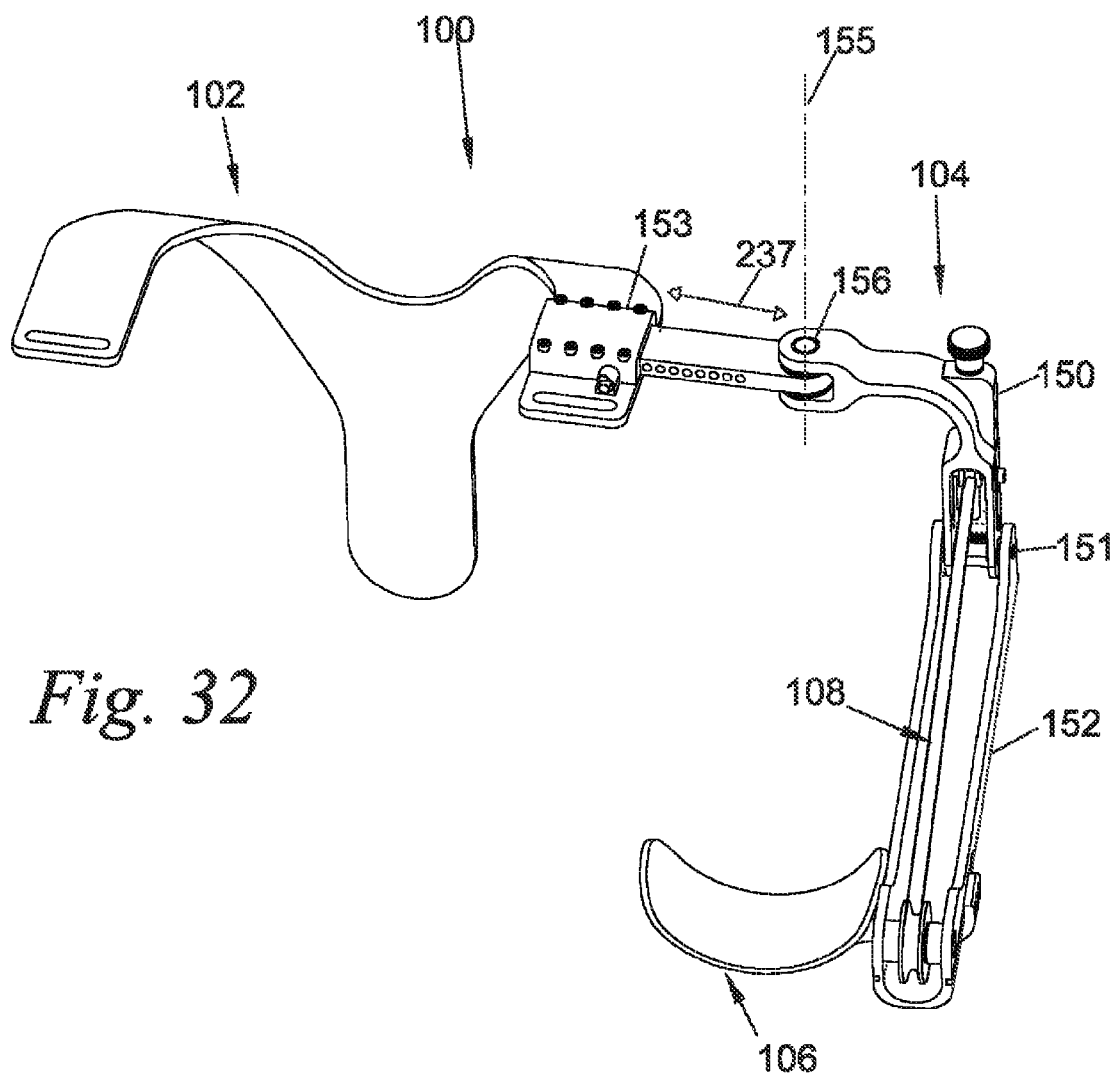
FIG. 32 is a perspective view of a shoulder bracket of the present invention allowing shoulder width adjustment of an arm supporting exoskeleton.

FIG. 32 depicts another embodiment of arm support exoskeleton 100 that comprises at least one shoulder bracket 153 coupled to shoulder base 102. Shoulder bracket 153 can couple shoulder base 102 to arm link mechanism 104 in multiple positions to provide desirable shoulder width adjustment 237 to accommodate person's shoulder width 236, referenced in FIG. 7. In another embodiment not depicted, shoulder bracket 153 can couple to arm link mechanism 104 in multiple positions to provide desirable shoulder depth adjustment 241 to accommodate person's shoulder depth 240.

Figure 33:
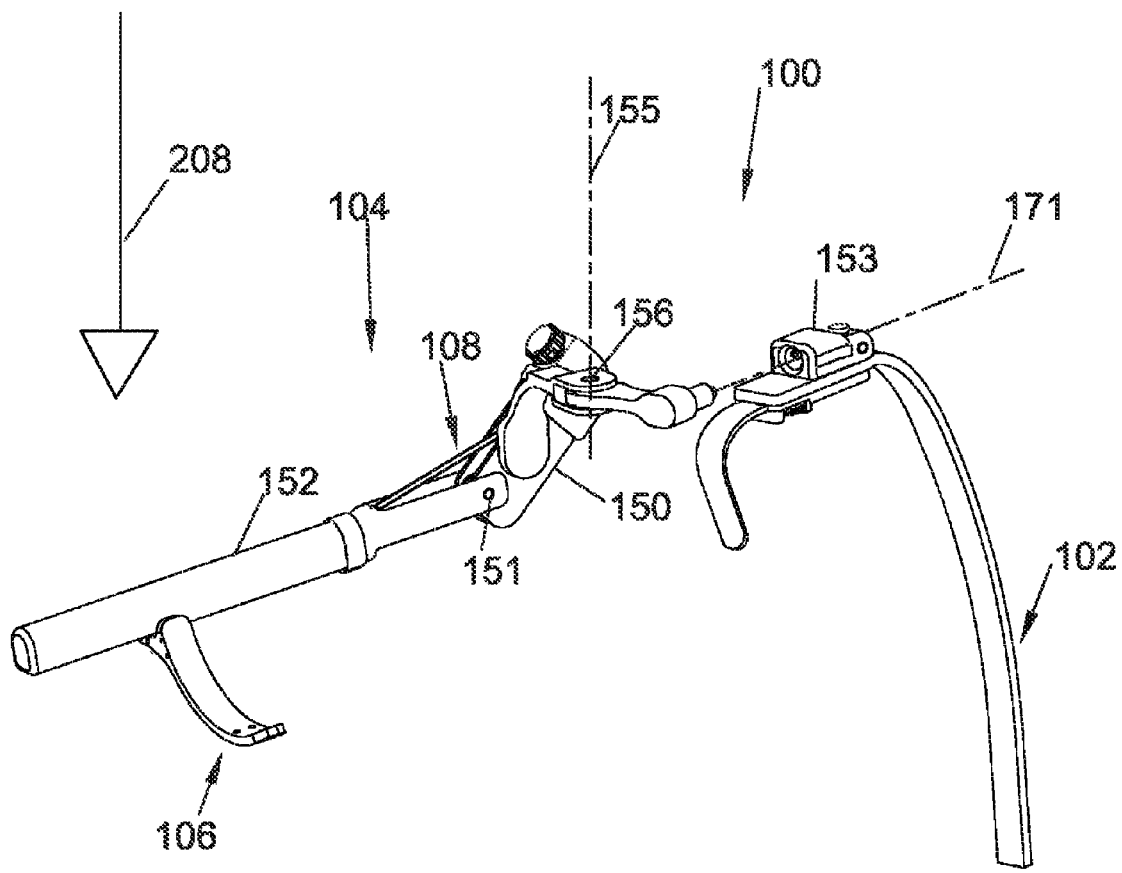
FIG. 33 is a perspective view of a shoulder bracket of the present invention, showing a scapular rotation axis.

FIG. 33 depicts another embodiment of arm supporting exoskeleton 100 wherein shoulder base 102 comprises at least one shoulder bracket 153. Shoulder bracket 153 is rotatably coupled to arm link mechanism 104 along a scapular rotation axis 171, wherein said scapular rotation axis 171 is substantially orthogonal to gravity line 208 when person 200 (not shown) is standing upright.

Figure 34:
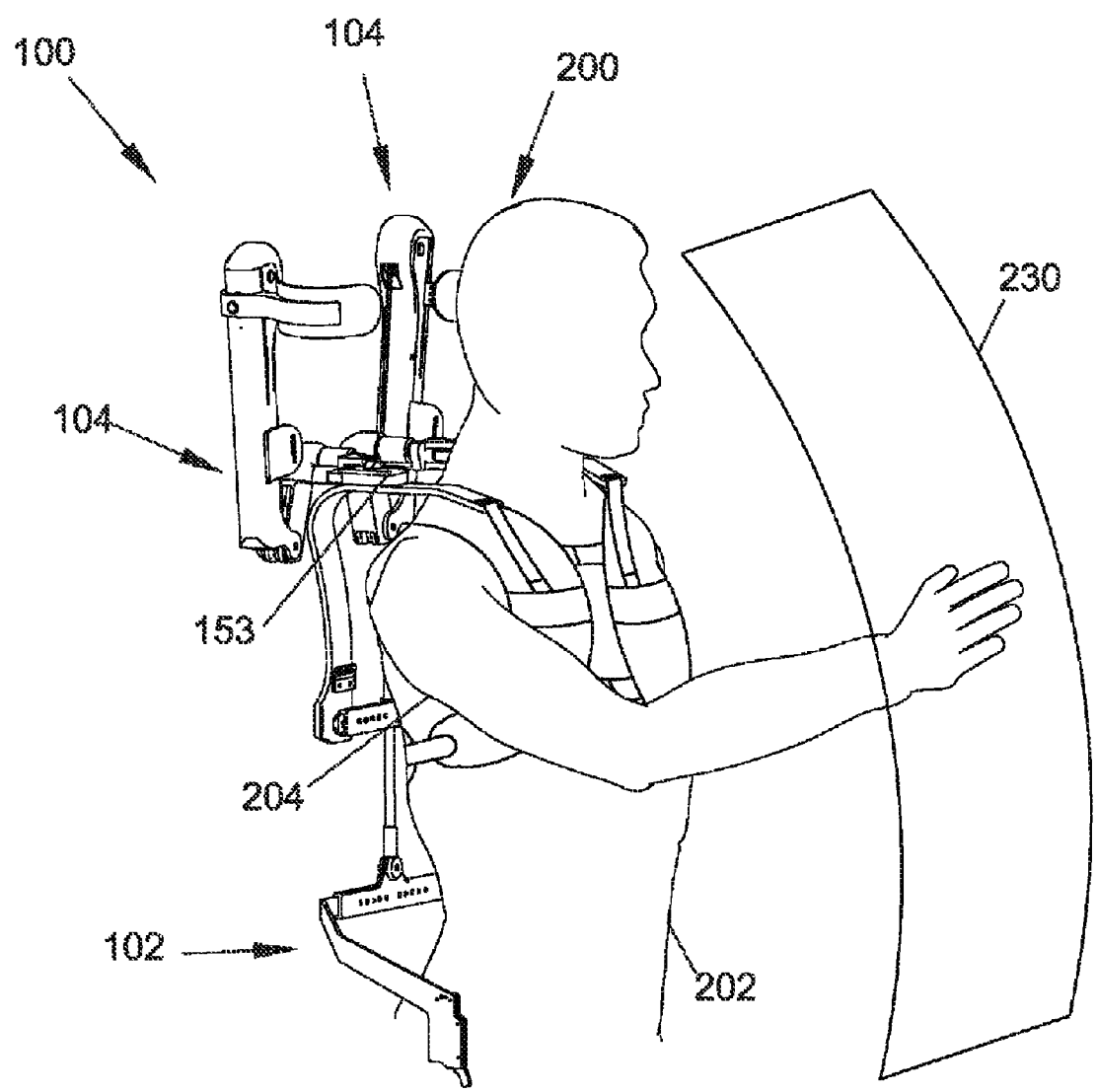
FIG. 34 is a front perspective view of a user with an arm support exoskeleton of the present invention in a stowed position.
Figure 35:
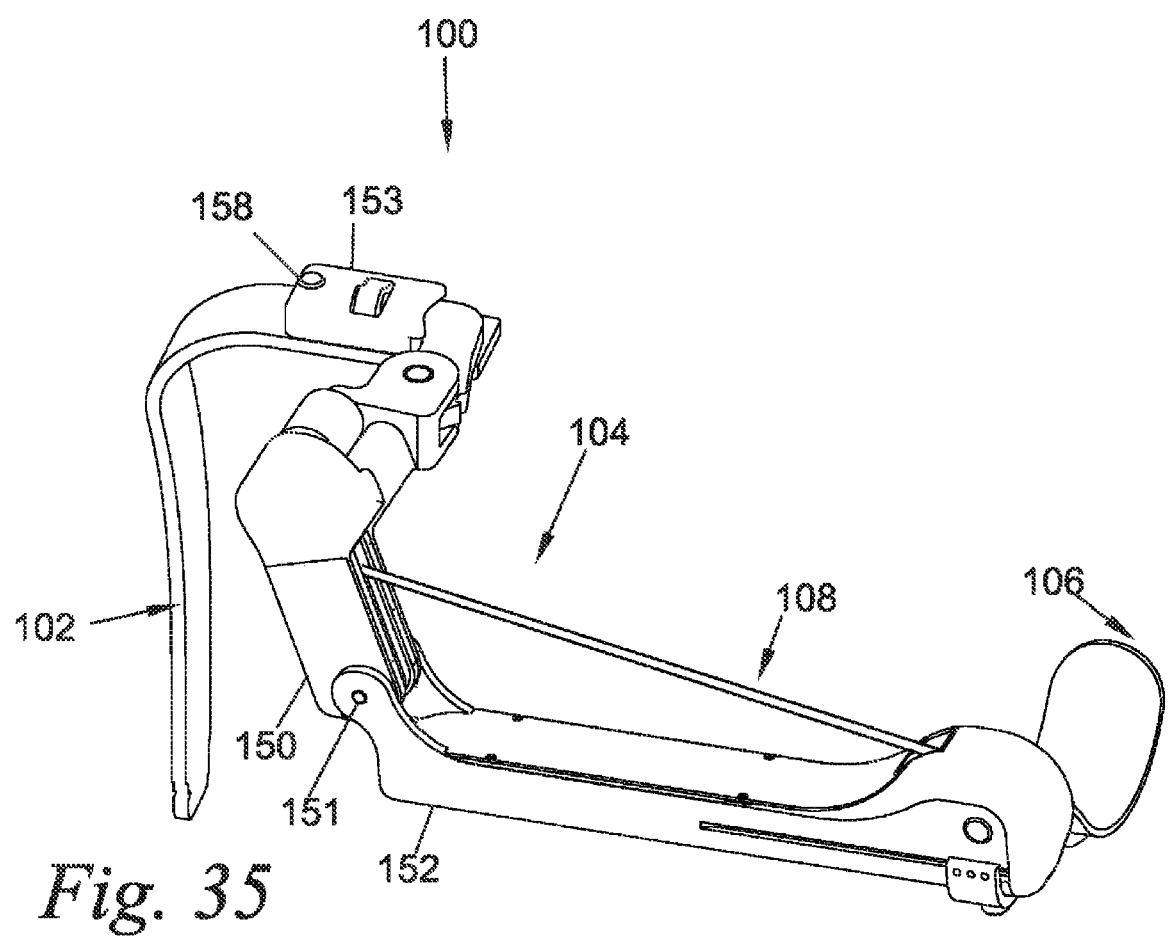
FIG. 35 is a perspective view of an arm supporting exoskeleton of the present invention in a working position.
Figure 36:
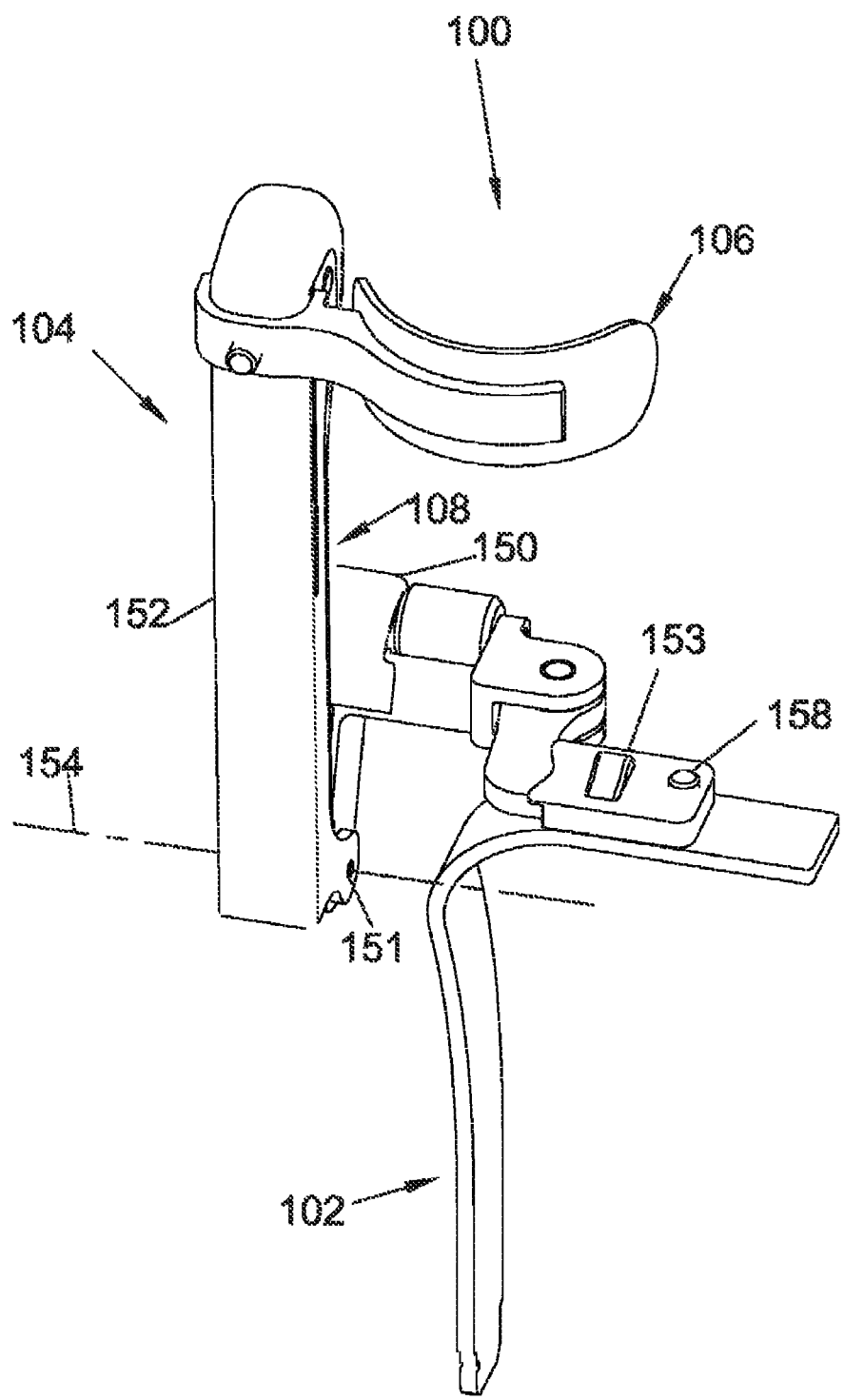
FIG. 36 is a perspective view of an arm supporting exoskeleton of the present invention in a stowed position.

FIG. 34 through FIG. 36 depict another embodiment of arm support exoskeleton 100, wherein shoulder base 102 is coupled to a shoulder bracket 153. Shoulder bracket 153 couples to arm link mechanism 104. Shoulder bracket 153 contains a stow joint 158 that allows shoulder bracket 153 to rotate relative to shoulder base 102 (stow joint 158 not depicted in FIG. 34). When shoulder bracket 153 rotates about stow joint 158 it may position arm link mechanism 104 substantially behind person 200. Shoulder bracket 153 can be held stationary about stow joint 158 to keep arm link mechanism 104 in the desired orientation. FIG. 34 shows person 200 wearing arm supporting exoskeleton 100 wherein arm link mechanism 104 is in a stowed position that is substantially out of person's workspace 230. The term "person's workspace" should be understood to mean the range of motion of person's upper arm 204 that may be utilized during common workplace tasks. FIG. 35 shows perspective view of shoulder bracket 153 in a working position. In the working position arm link mechanism 104 is positioned to support person's upper arm 204 (not shown). FIG. 36 shows a perspective of shoulder bracket 153 in a stowed position wherein arm link mechanism 104 is positioned substantially behind person 200 (not shown). In a stowed position a distal link 152 remains fully flexed relative to proximal link 150 due to torque generator 108 acting about first rotational axis 154. This serves to further secure arm link mechanism 104 out of person's workspace 230. It should be understood that other joints between arm link mechanism 104 and shoulder base 102 may be utilized to further secure arm link mechanism 104 out of person's workspace 230.

FIG. 37 through FIG. 41 depict embodiments of arm supporting exoskeleton 100 wherein arm coupler 106 further comprises a load bearing coupler 160 coupled to distal link 152 capable of imposing an upward supporting force 212 on person's upper arm 204 (shown in FIG. 1). In some embodiments load bearing coupler 160 comprises a distal link attachment 167 that attaches arm coupler 106 to distal link 152 and at least one arm cuff 168 that at partially encircles person's upper arm 204 (shown in FIG. 1).

Figure 37:
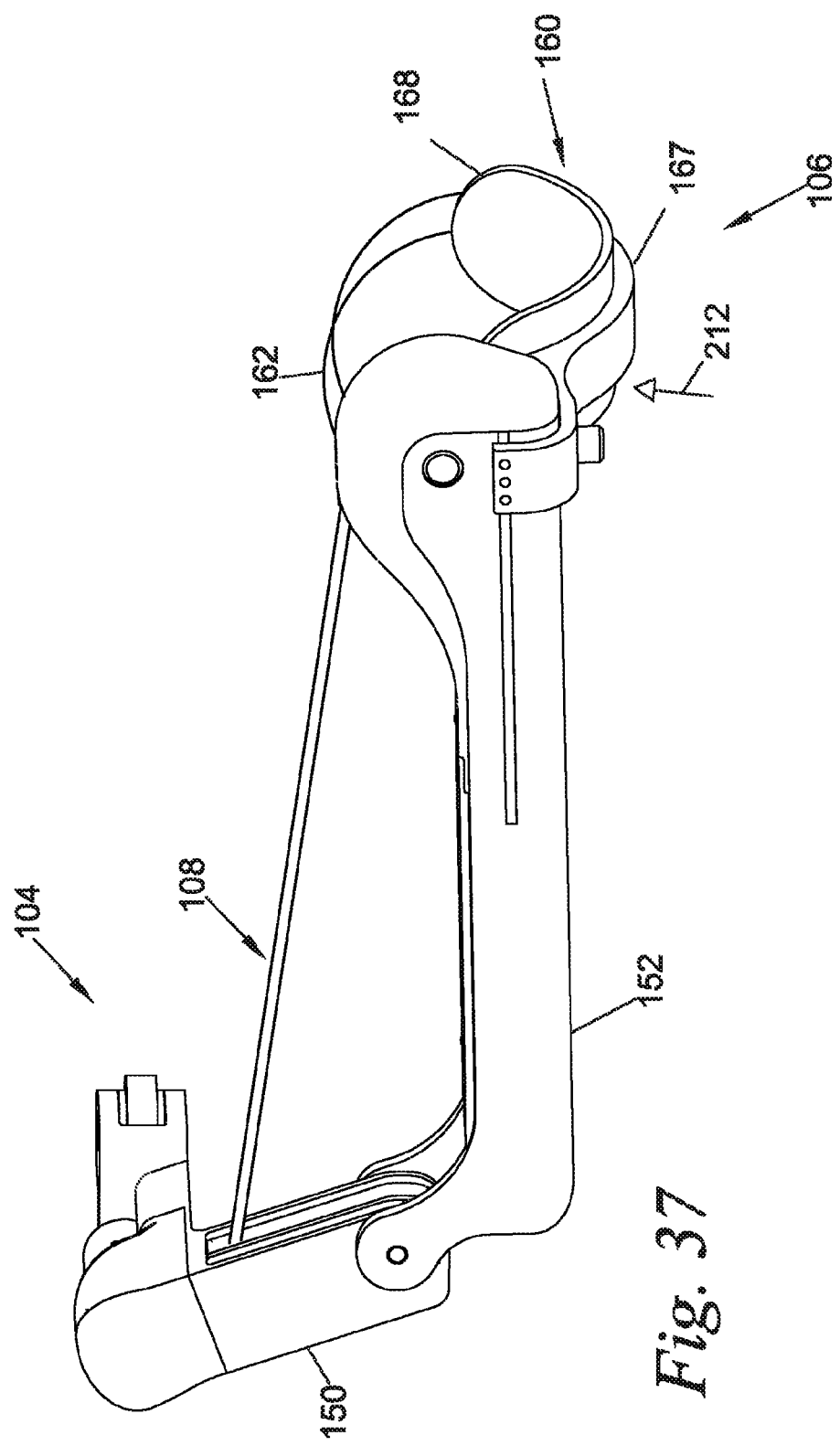
FIG. 37 is a perspective view of an arm link mechanism of the present invention containing an arm coupler.

FIG. 37 depicts an embodiment of arm support exoskeleton 100 wherein arm coupler 106 further comprises an arm coupling mechanism 162. Arm coupling mechanism 162 is capable of coupling arm coupler 106 to person's upper arm 204 (shown in FIG. 2). Arm coupling mechanism 162 may comprise an element or combination of elements selected from a group consisting of rigid, semi-rigid, or compliant materials preventing separation of said person's upper arm 204 (shown in FIG. 1) from arm coupler 106.

Figure 38:
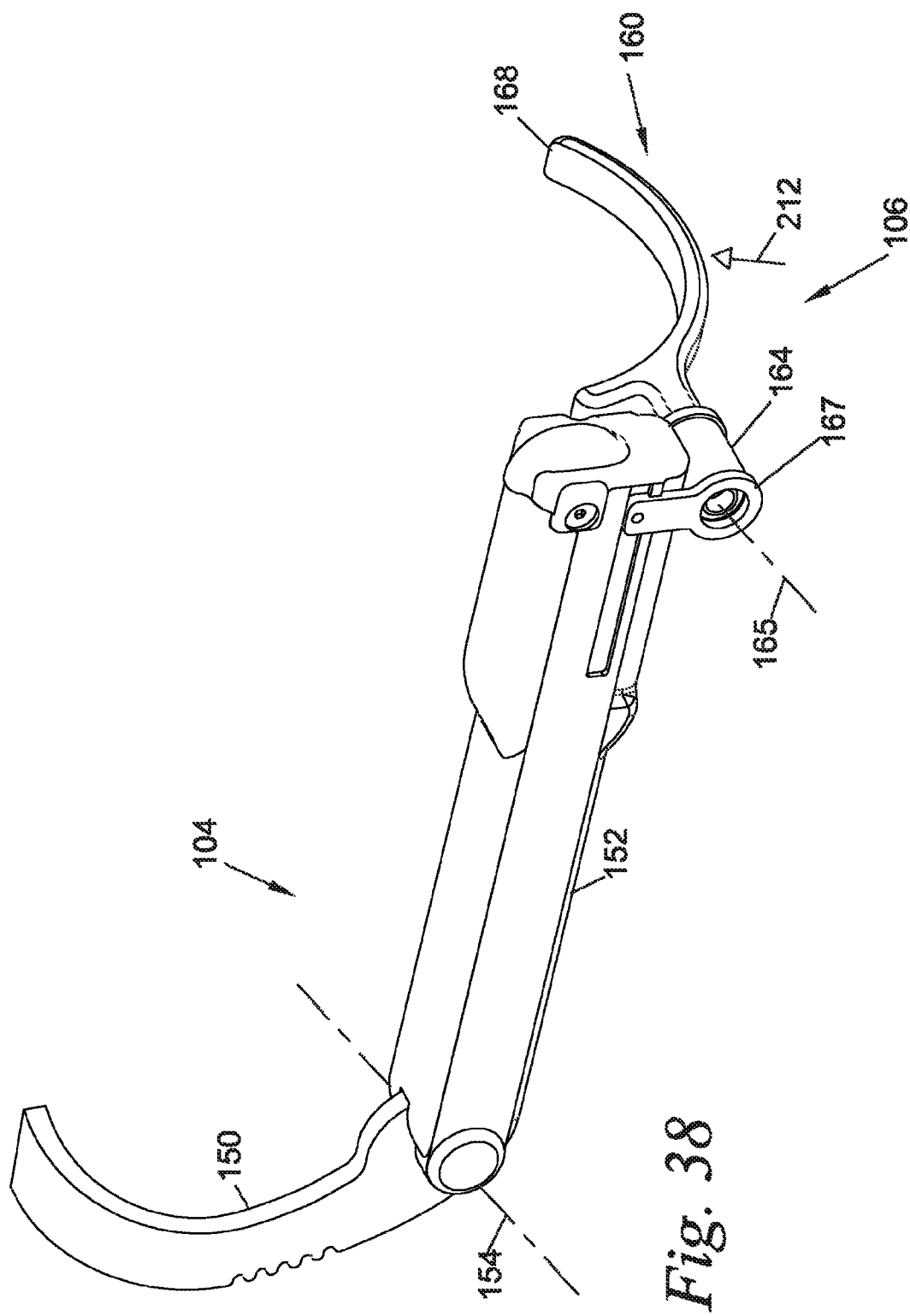
FIG. 38 is a perspective view of an arm link mechanism of the present invention wherein an arm coupler contains an arm rotation joint.

FIG. 38 depicts an embodiment of arm coupler 106 wherein load bearing coupler 160 contains an arm rotation joint 164. Arm rotation joint 164 allows arm cuff 168 to rotate with respect to distal link 152 along arm cuff rotation axis 165 substantially parallel to first rotational axis 154. Arm rotation joint 164 allows arm cuff 168 to provide maximum contact with person's upper arm 204 (shown in FIG. 1) or compensate for movement discrepancies between distal link 152 and person's upper arm 204.

Figure 39:
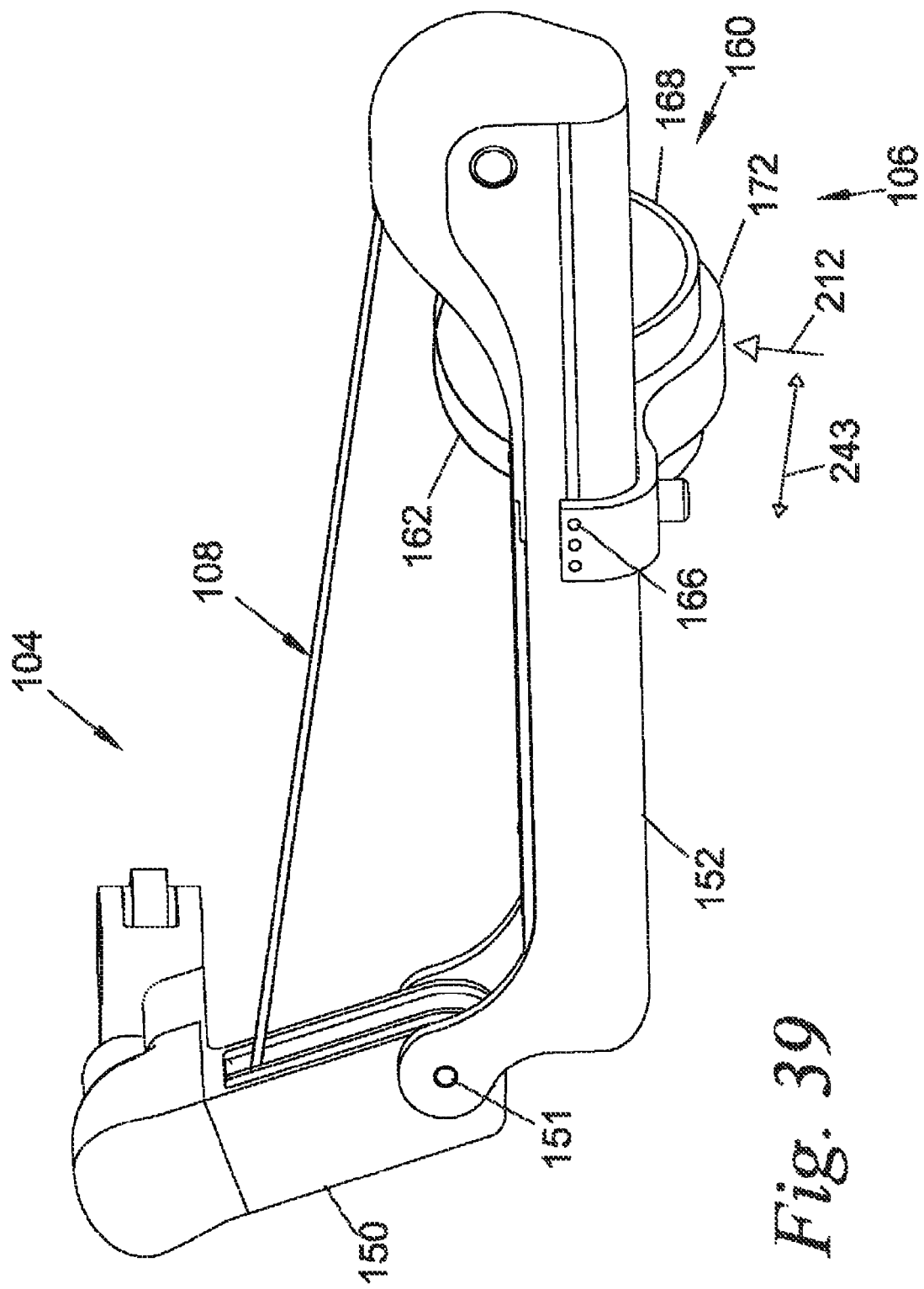
FIG. 39 is a perspective view of an arm link mechanism of the present invention wherein an arm coupler contains a translation joint.
Figure 40:
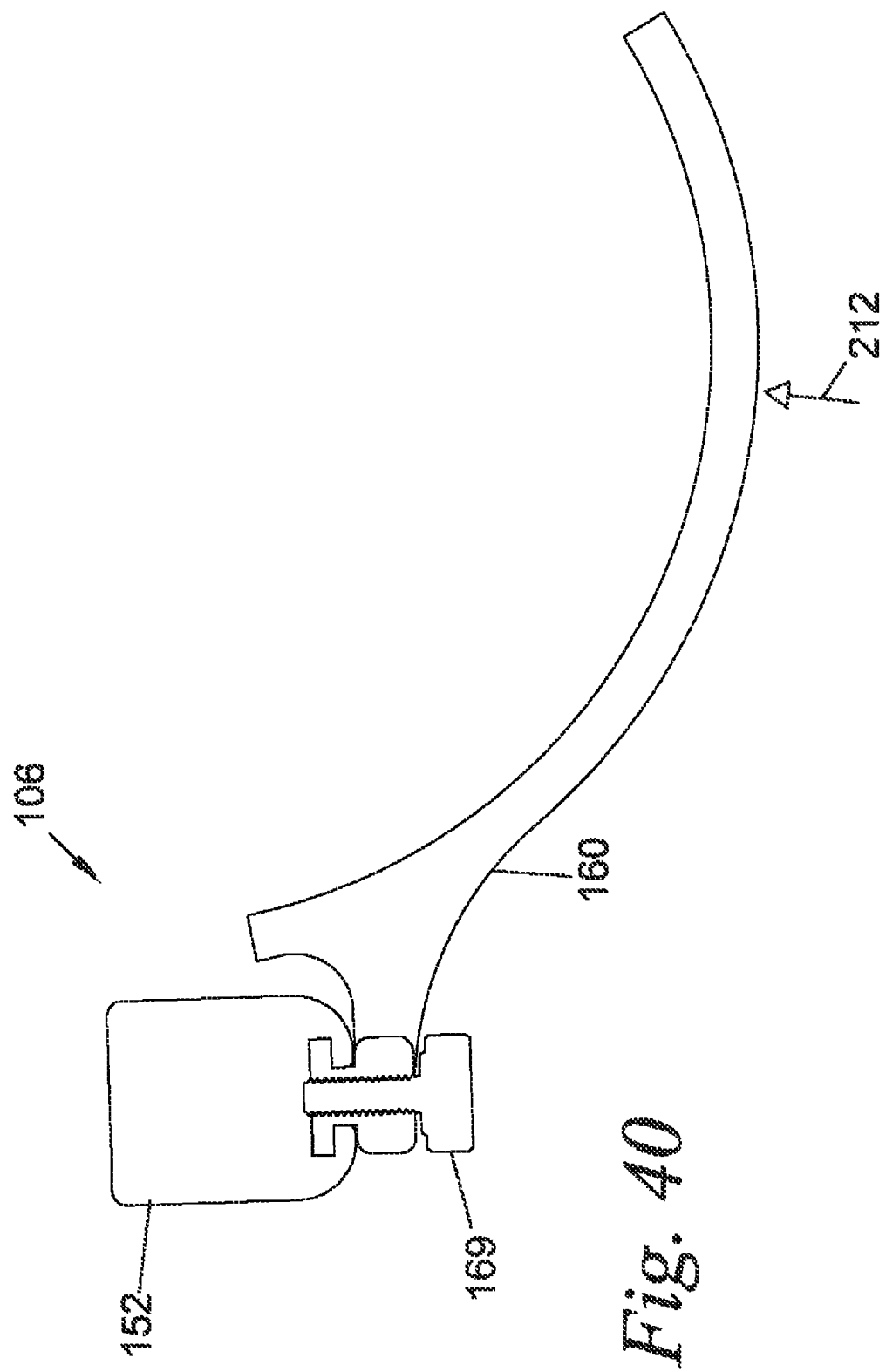
FIG. 40 is a section view of an arm coupler of the present invention containing a translation joint.

FIG. 39 depicts an embodiment of arm coupler 106 wherein arm coupler 106 locations can be adjusted with respect to distal link 152. In some embodiments of the invention, load bearing coupler 160 can translate with respect to distal link 152 at translation joint 166 to allow for arm length adjustment 243 of arm link mechanism 104 to fit person's upper arm length 242 (referenced in FIG. 7), or to compensate for any movement discrepancies between distal link 152 and person's upper arm 204 (depicted in FIG. 1). FIG. 40 depicts another embodiment of translation joint 166 wherein distal link 152 contains a t-slot mating with load bearing coupler 160. Load bearing coupler 160 contains a locking pin 169 that fixes the position of load bearing coupler 160 relative to distal link 152.

Figure 41:
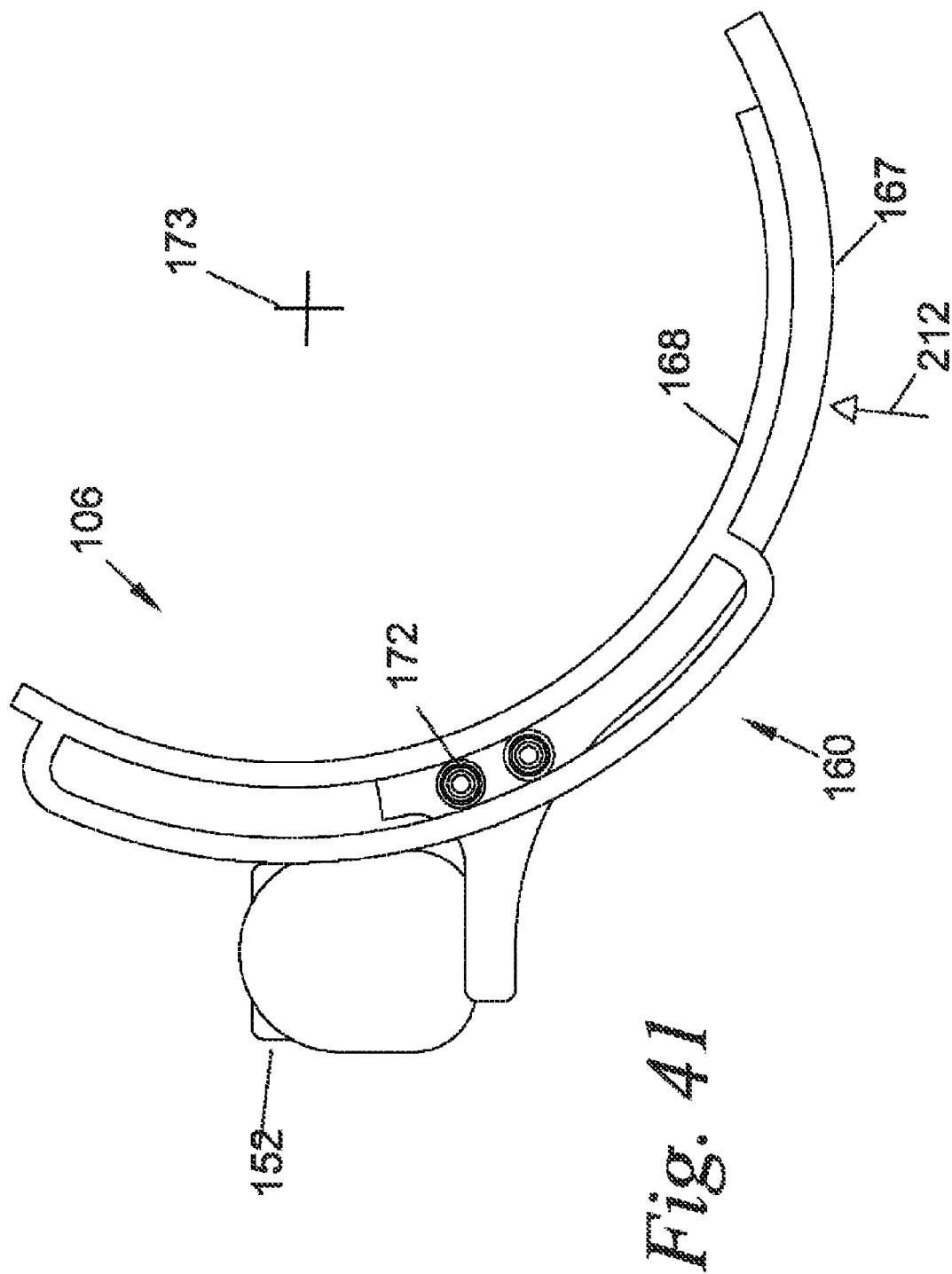
FIG. 41 is a front view of an arm coupler of the present invention containing an internal external rotation joint.

FIG. 41 depicts an embodiment of arm coupler 106 wherein load bearing coupler 160 allows for internal and external rotation of person's upper arm 204 (shown in FIG. 1) with an internal/external rotation joint 172. Internal/external rotation joint 172 is located between distal link attachment 167 and arm cuff 168. Internal/external rotation joint 172 rotates about internal external rotation axis 173. In another embodiment not depicted, sliding contact with person's upper arm 204 resting in arm cuff 168 allows for rotation about internal external rotation axis 173.

Figure 42:
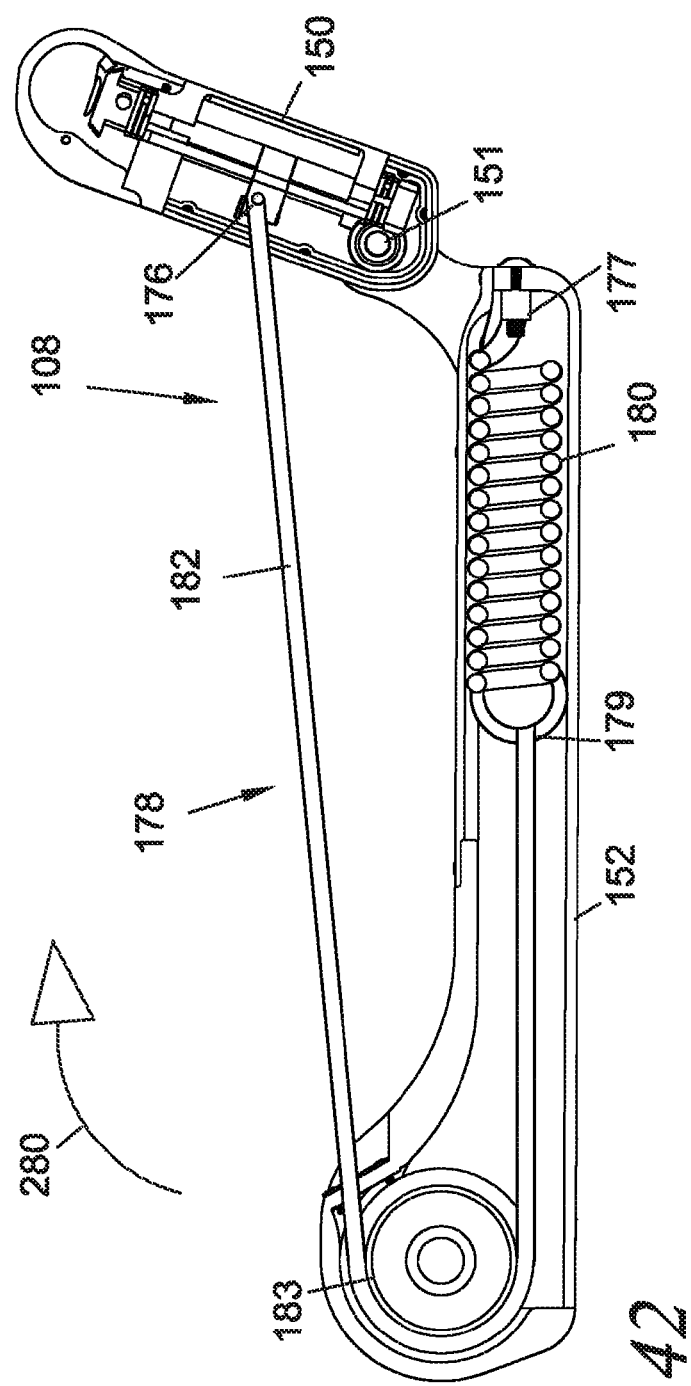
FIG. 42 is a side section view of a torque generator of the present invention with an extension spring.

FIG. 42 through FIG. 46 depict various embodiments of arm supporting exoskeleton 100 wherein torque generator 108 comprises a tensile force generator 178. Tensile force generator 178, as shown in FIG. 42 is coupled to proximal link 150 from its first tensile end 176 and distal link 152 from its second tensile end 177. The tensile force in tensile force generator 178 provides a torque 280 to flex distal link 152 relative to proximal link 150 about first rotational joint 151. In some embodiments of torque generator 108, tensile force generator 178 comprises a coil spring element 180. In some embodiments of torque generator 108 tensile force generator 178 comprises a line element 182 coupling coil spring element 180 to proximal link 150. Line element 182 comprises an element or combination of elements selected from a group consisting of wire rope, rope, cable, twine, strap, chain, or any combination thereof. In some embodiments of torque generator 108, line element 182 at least partially encircles a pulley 183 coupled to distal link 152 before line element 182 is coupled to proximal link 150. In some embodiments pulley 183 does not rotate relative to distal link 152. In some embodiments pulley 183 is a curved surface incorporated into distal link 152. FIG. 42 depicts an embodiment of torque generator 108 where coil spring element 180 is an extension spring. Coil spring element 180 is coupled to line element 182 at junction 179 and coupled to distal link 152 at second tensile end 177.

Figure 43:
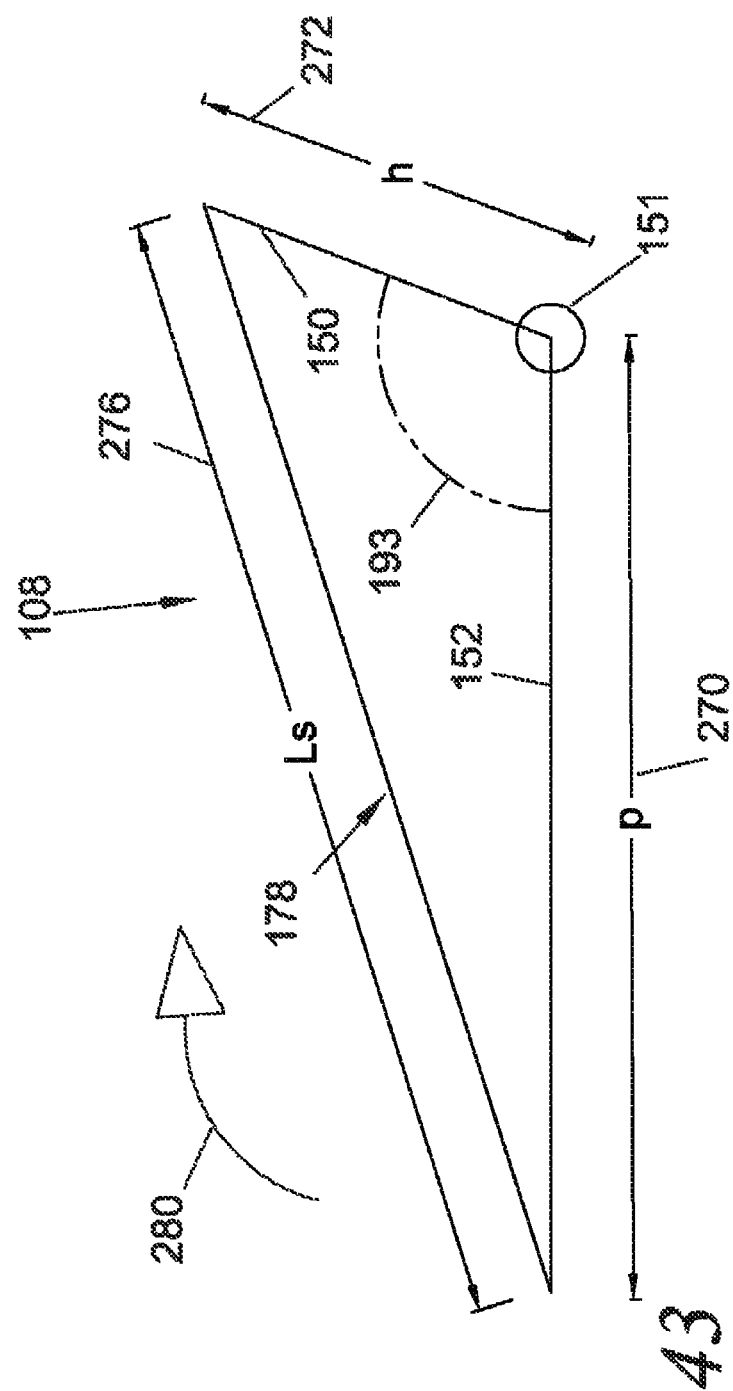
FIG. 43 is a schematic of a torque generator of the present invention.

FIG. 43 shows an approximate schematic of torque generator 108. Tensile force generator 178 is coupled to proximal link 150 at a first distance 272. Tensile force generator 178 acts about distal link at a second distance 270 ("p"). Tensile force generator effective length 276 is the distance between first distance 272 ("h") along proximal link 150 and second distance 270 along distal link 152. Tensile force generator original length is the tensile force generator effective length 276 ("Ls") corresponding to a zero value of first angle 193. Tensile force is a function of spring constant, spring preload, tensile force generator original length, and tensile force generator effective length 276 at a given value of first angle 193. Torque 280 causes distal link to flex relative to shoulder base 102.

Figure 44:
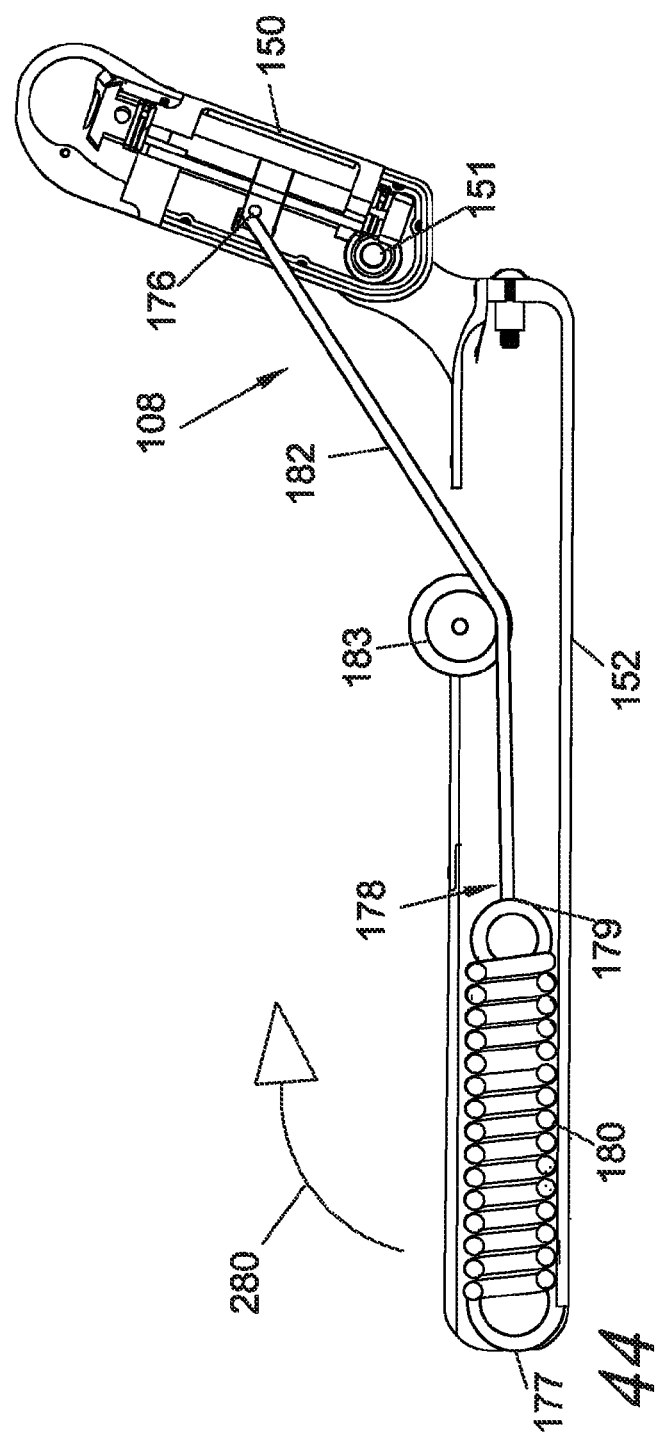
FIG. 44 is an alternative side section view of a torque generator of the present invention with an extension spring.
Figure 45:
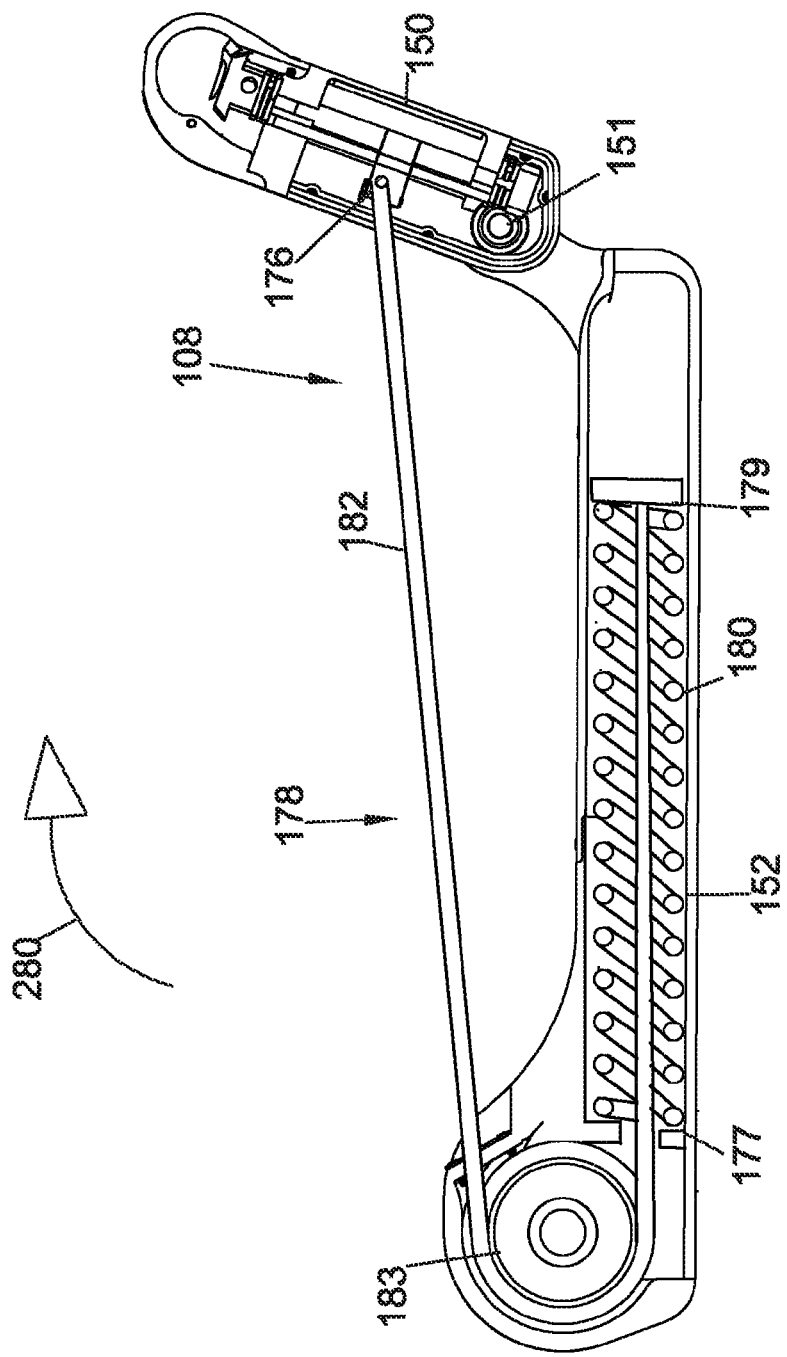
FIG. 45 is a side section view of a torque generator of the present invention with a compression spring.
Figure 46:
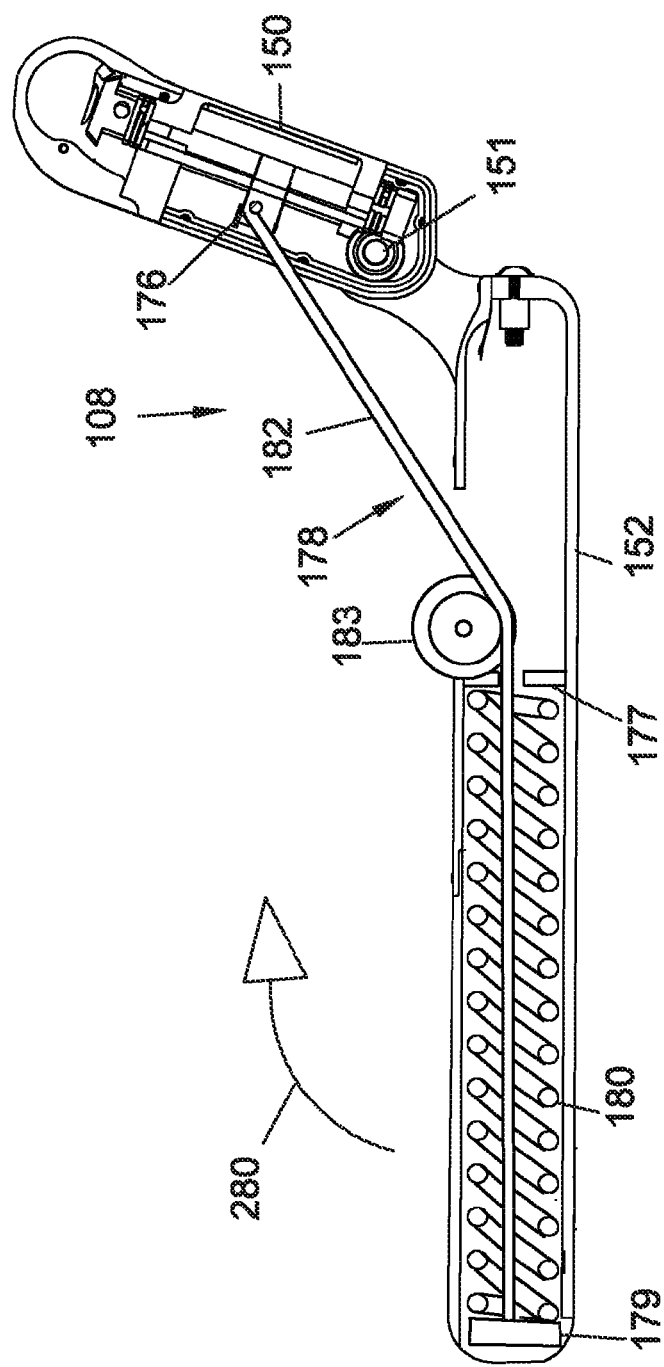
FIG. 46 is an alternative side section view of torque generator with compression spring.

FIG. 44 through FIG. 46 depicts various embodiments of torque generator 108 wherein tensile force generator 178 comprises a coil spring element 180 and line element 182. Line element 182 at least partially encircles a pulley 183 coupled to distal link 152. FIG. 44 depicts an embodiment of torque generator 108 where coil spring element 180 is an extension spring with a different orientation than shown in FIG. 42. Coil spring element 180 coupled to line element 182 at junction 179 and coupled to distal link 152 at second tensile end 177. In some embodiments line element 182 at least partially wraps around a pulley 183 attached to distal link 152 before attaching to proximal link 150. FIG. 45 depicts an embodiment of torque generator 108 where coil spring element 180 is a compression spring. Coil spring element 180 is coupled to line element 182 at junction 179 and coupled to distal link 152 at second tensile end 177. In some embodiments line element 182 at least partially wraps around a pulley 183 attached to distal link 152 before attaching to proximal link 150. FIG. 46 depicts an embodiment of torque generator 108 where coil spring element 180 is a compression spring with a different orientation than shown in FIG. 45. Coil spring element 180 is coupled to line element 182 at junction 179 and coupled to distal link 152 at second tensile end 177. In some embodiments line element 182 at least partially wraps around a pulley 183 attached to distal link 152 before attaching to proximal link 150. It is understood that in all embodiments, instead of coil spring element 180, a gas spring, air spring, elastomer, or any combination that exhibits similar behavior can be utilized.

Figure 47:
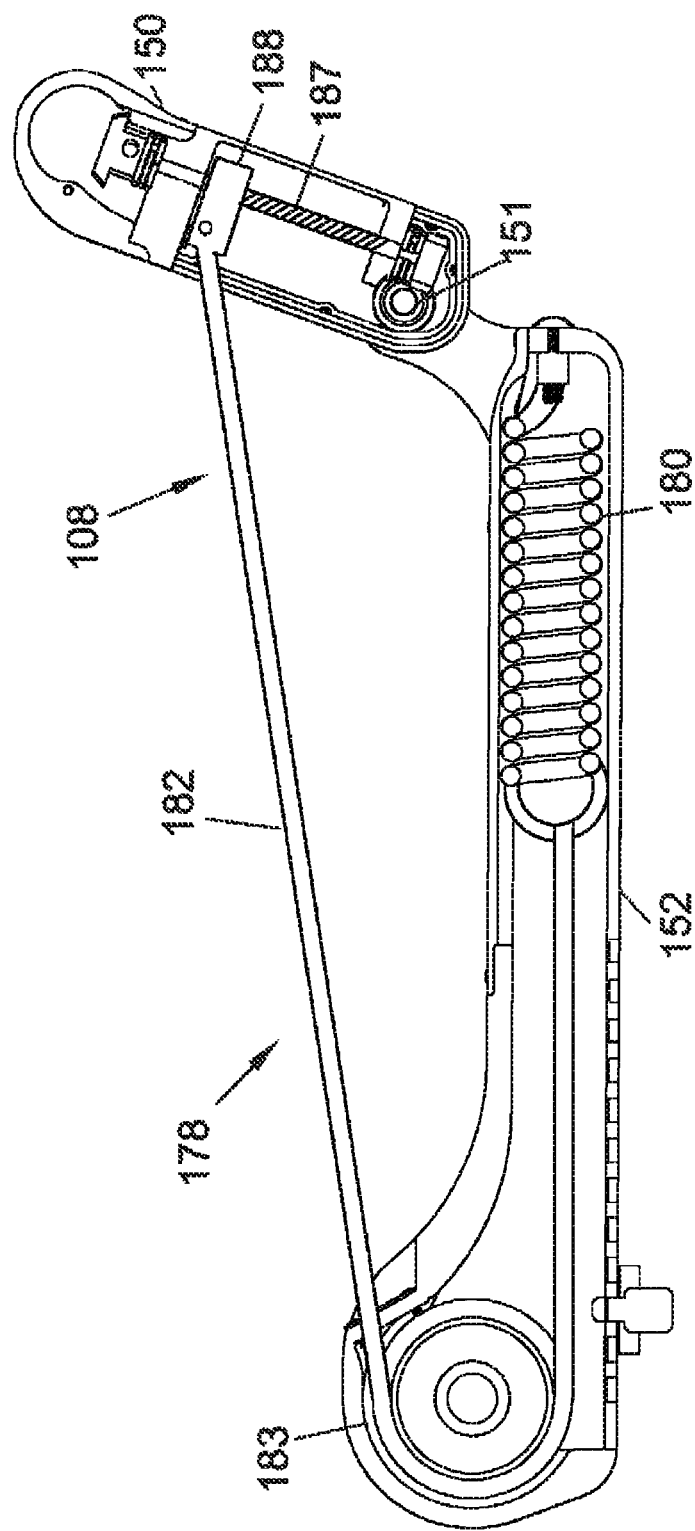
FIG. 47 is a side section view of a torque generator of the present invention with an upper bracket in a raised position.
Figure 48:
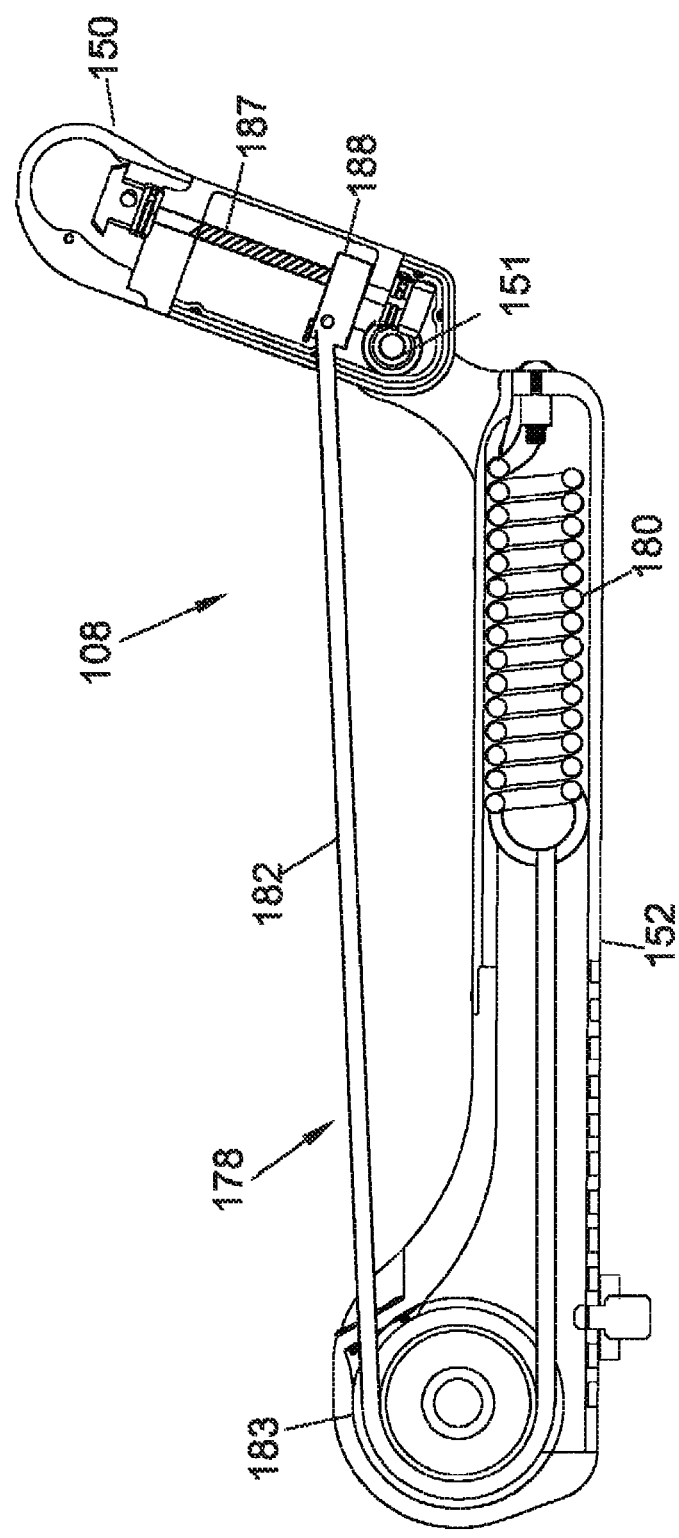
FIG. 48 is a side section view of a torque generator of the present invention with an upper bracket in a lowered position.
Figure 49:
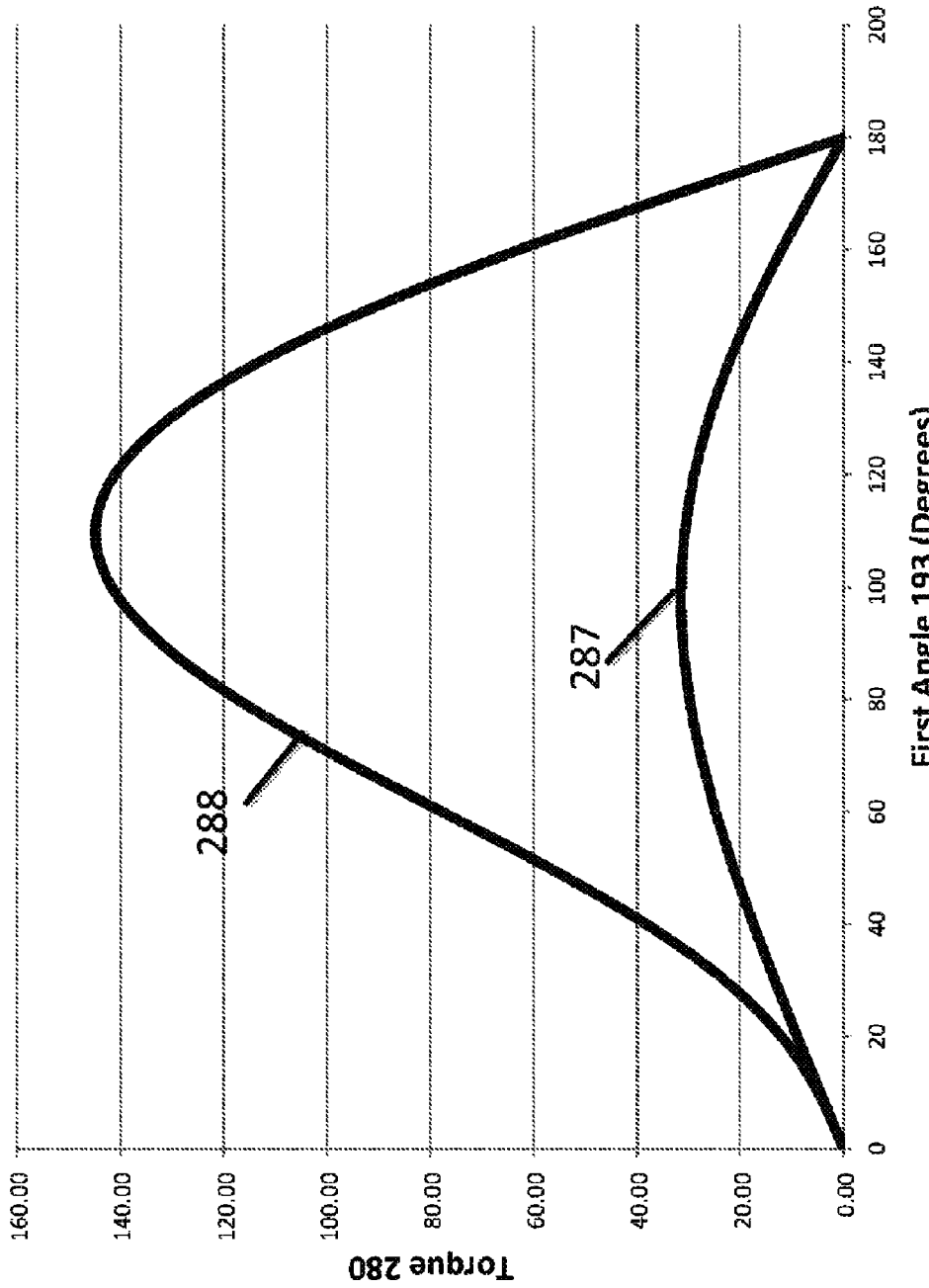
FIG. 49 is a plot of a torque generator torque profile for two positions of an upper bracket of the present invention.

FIG. 47 and FIG. 48 depict an embodiment of torque generator 108 wherein proximal link 150 comprises an upper bracket 188 coupled to tensile force generator 178. The location of upper bracket 188 can be adjusted along proximal link 150 to adjust torque 280 provided by tensile force generator 178. The location of upper bracket 188 corresponds to first distance 272 in the schematic of FIG. 43. In some embodiments, the location of upper bracket 188 is adjusted relative to proximal link 150 by upper bracket screw 187 where upper bracket 188 incorporates a threaded feature that mates with upper bracket screw 187. By turning upper bracket screw 187, the location of upper bracket 188 is adjusted along proximal link 150. In general, the farther upper bracket 188 is from first joint 151, the larger the amplitude of torque 280 will be. FIG. 47 depicts upper bracket 188 in an extended position relative to first joint 151, resulting in a large first distance 272 (see FIG. 43). FIG. 48 depicts upper bracket 188 in a retracted position relative to first joint 151, resulting in a small first distance 272 (see FIG. 42). FIG. 49 depicts two plots of torque 280 created by torque generator 108 as a function of first angle 193 for two positions of upper bracket 188 described in FIG. 47 and FIG. 48. The torque profile of configuration shown in FIG. 47 is represented by torque profile 288. The torque profile of configuration shown in FIG. 48 is represented by torque profile 287. It can be seen torque profile 288 has larger amplitude compared to torque profile 287.

Figure 50:
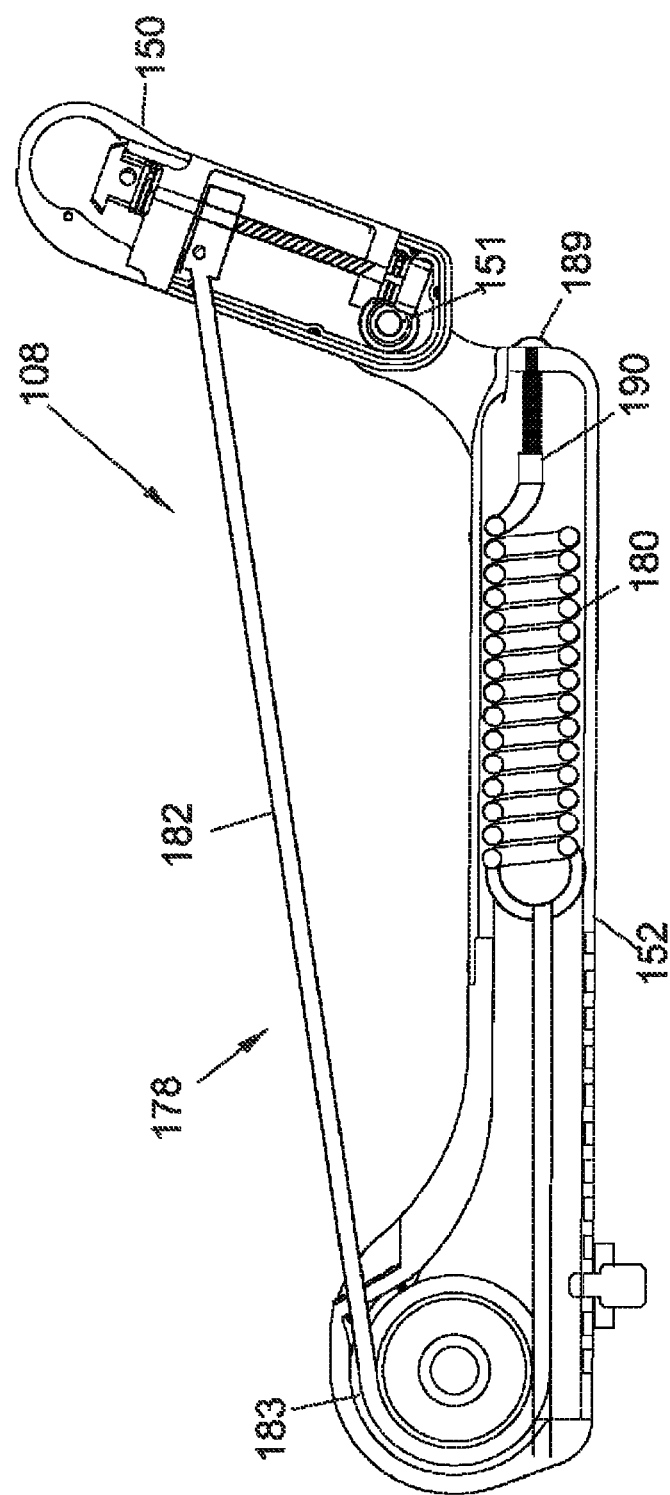
FIG. 50 is a side section view of a torque generator of the present invention with a lower bracket in an extended position.
Figure 51:
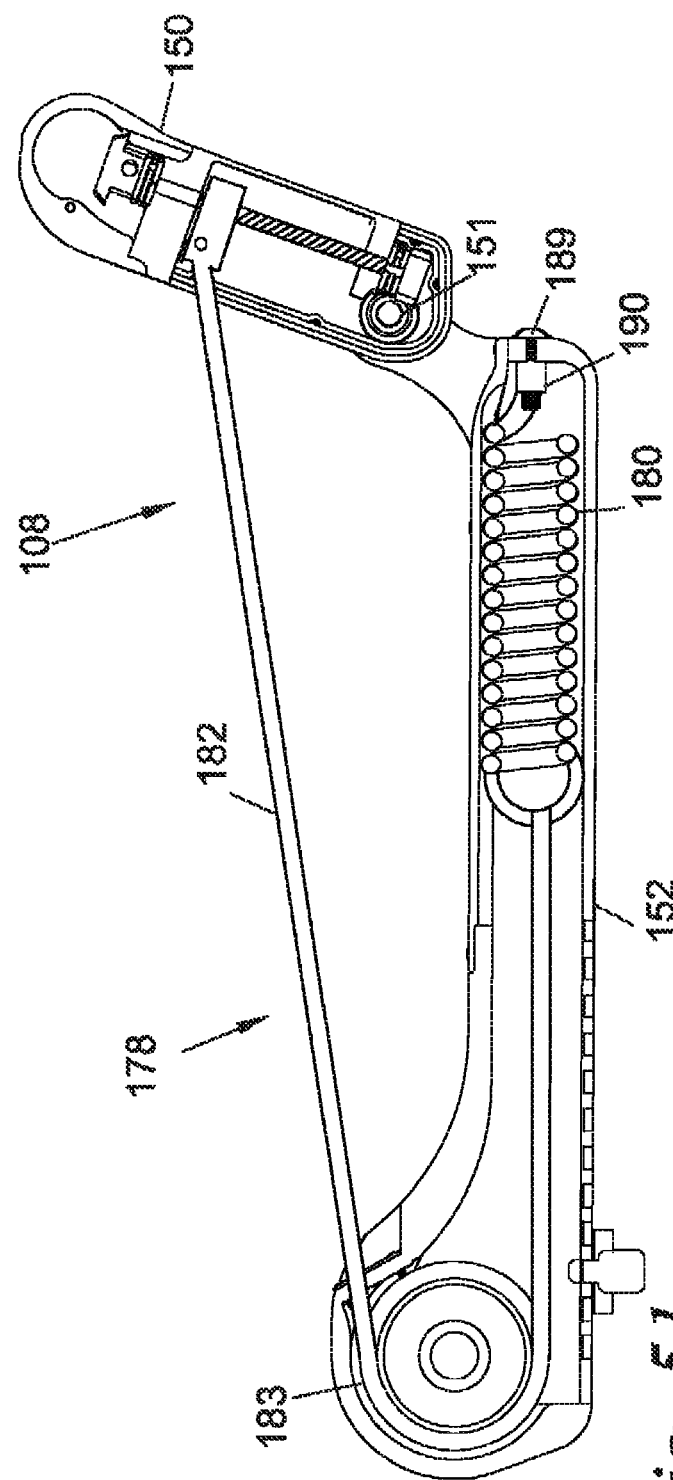
FIG. 51 is a side section view of a torque generator of the present invention with a lower bracket in a retracted position.
Figure 52:
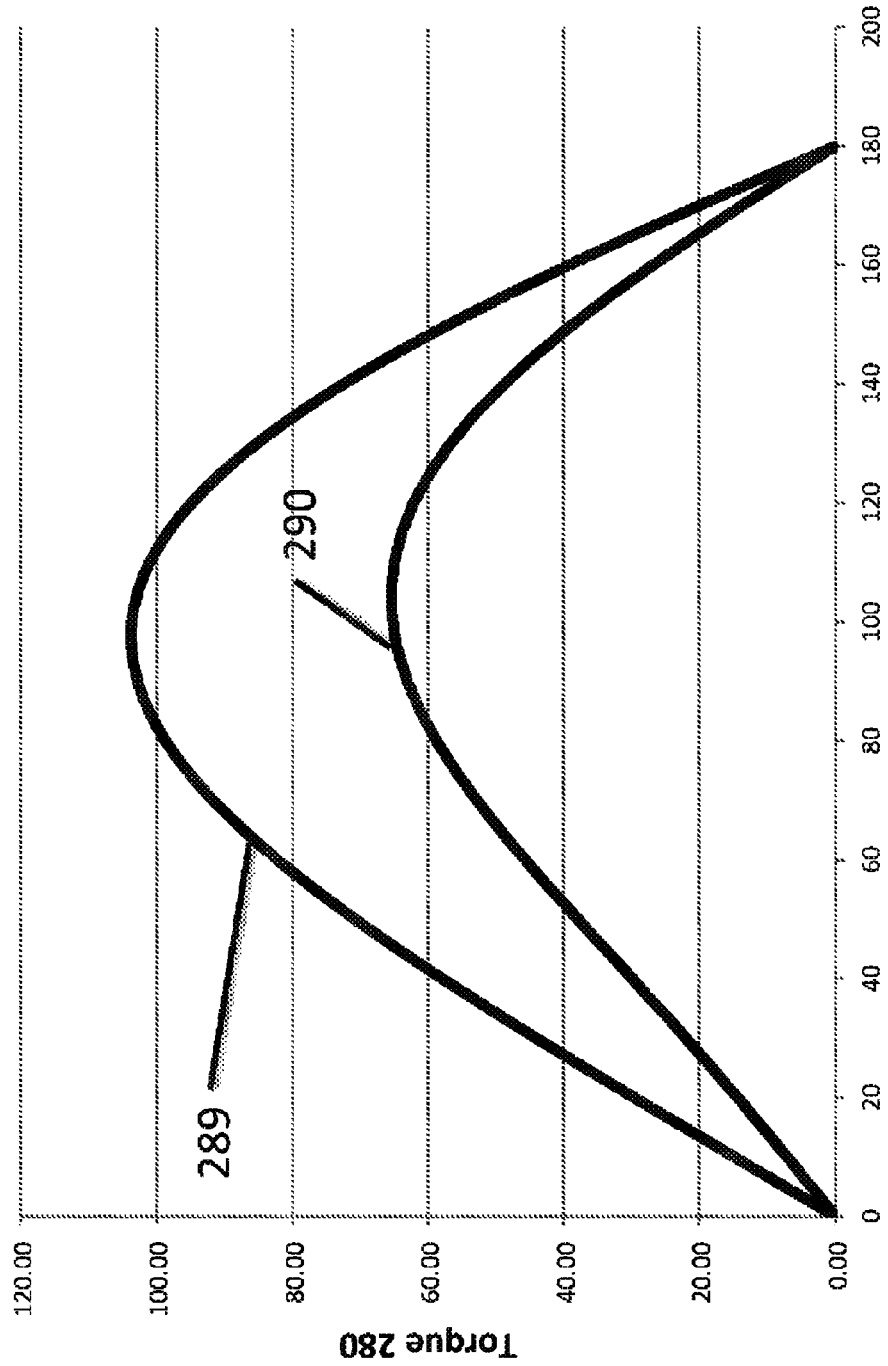
FIG. 52 is a plot of a torque generator torque profile for two positions of a lower bracket of the present invention.

FIG. 50 and FIG. 51 depict an embodiment of torque generator 108 wherein distal link 152 comprises a lower bracket 190 coupled to tensile force generator 178. The location of lower bracket 190 can be adjusted along distal link 152 to adjust torque 280 provided by tensile force generator 178. The location of lower bracket 190 corresponds to preload of tensile force generator 178. In some embodiments the location of lower bracket 190 is adjusted relative to distal link 152 by lower bracket screw 189 where lower bracket incorporates a threaded feature that mates with lower brackets screw 189. By turning lower bracket screw 189 the location of lower bracket 190 is adjusted along distal link 152. In general the farther lower bracket 190 is from first joint 151 the smaller the amount of preload will be. FIG. 50 depicts lower bracket 190 in a lengthened position relative to first joint 151, resulting in a small tensile force generator 178 preload. FIG. 51 depicts lower bracket 190 in a shortened position relative to first joint 151, resulting in a large tensile force generator 178 preload. FIG. 52 depicts two plots of torque 280 created by torque generator 108 as a function of first angle 193 for two positions of lower bracket 190 described in FIG. 50 and FIG. 51. The torque profile of configuration shown in FIG. 50 is represented by torque profile 290. The torque profile of configuration shown in FIG. 51 is represented by torque profile 289. Shortened lower bracket torque profile 289 has larger amplitude compared to lengthened lower bracket torque profile 290.

Figure 53:
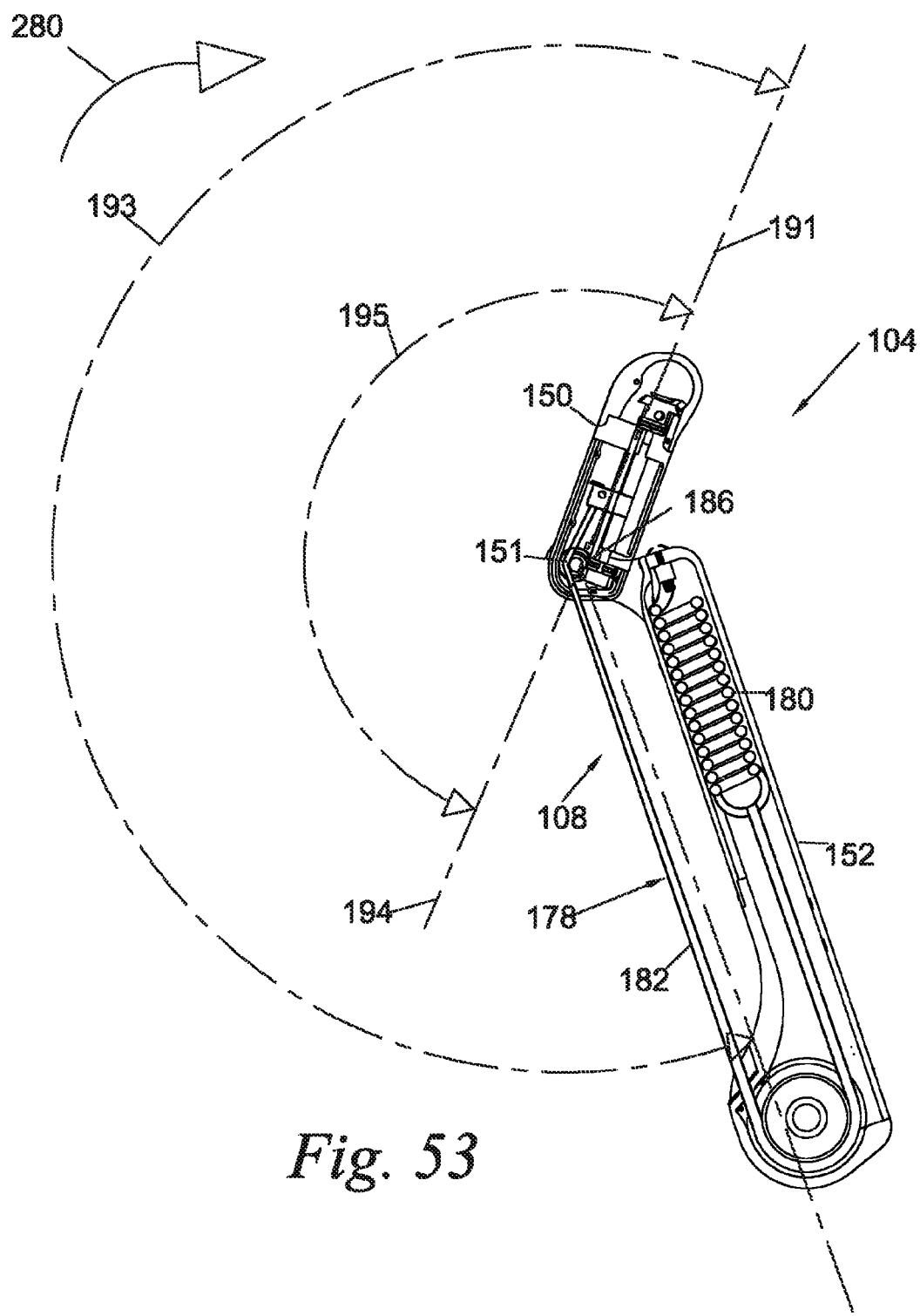
FIG. 53 is a side section view of torque generator with protrusion where first angle is larger than a toggle angle.
Figure 54:
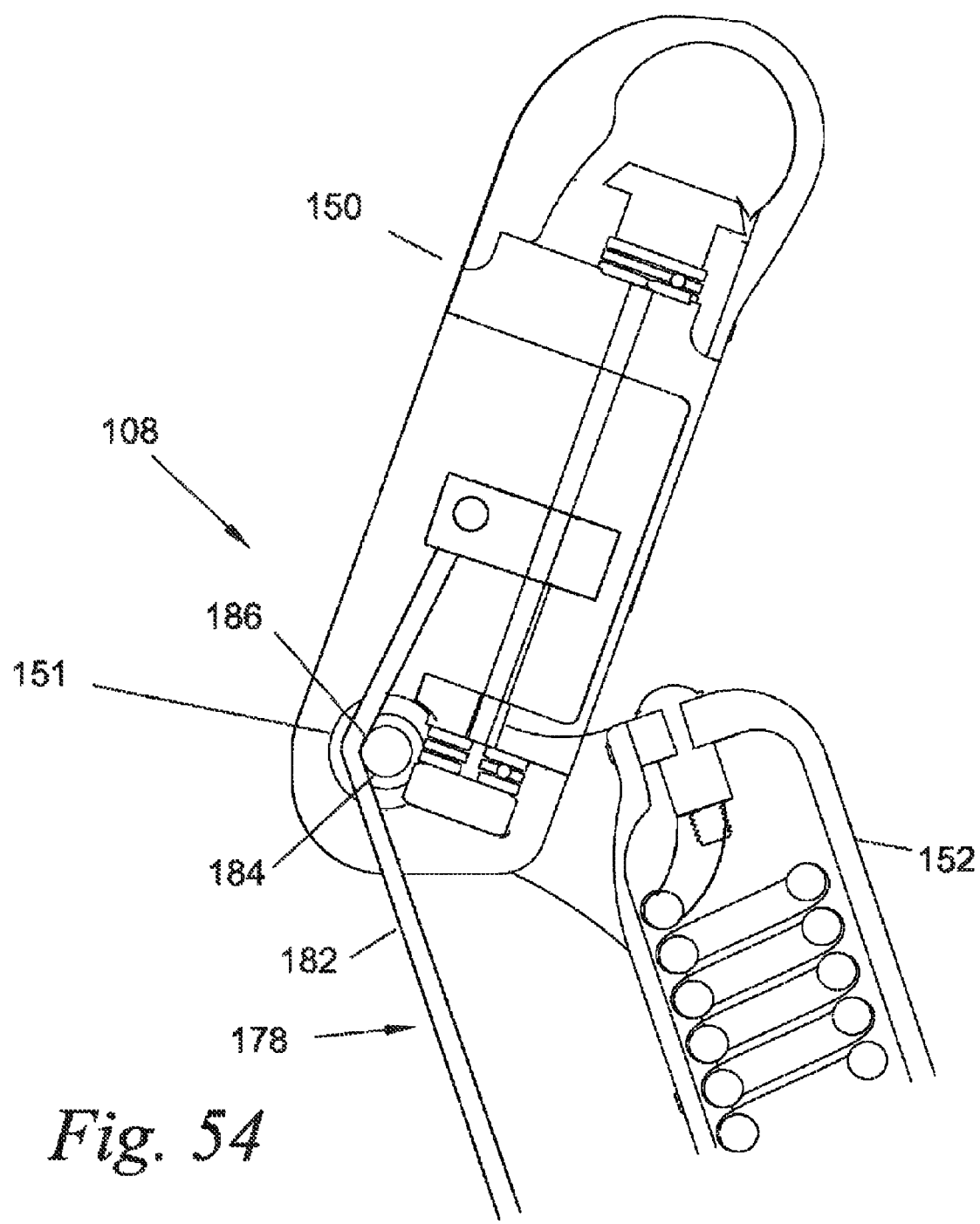
FIG. 54 is a close up side section view of a torque generator of the present invention including a protrusion comprising a joint pin.
Figure 55:
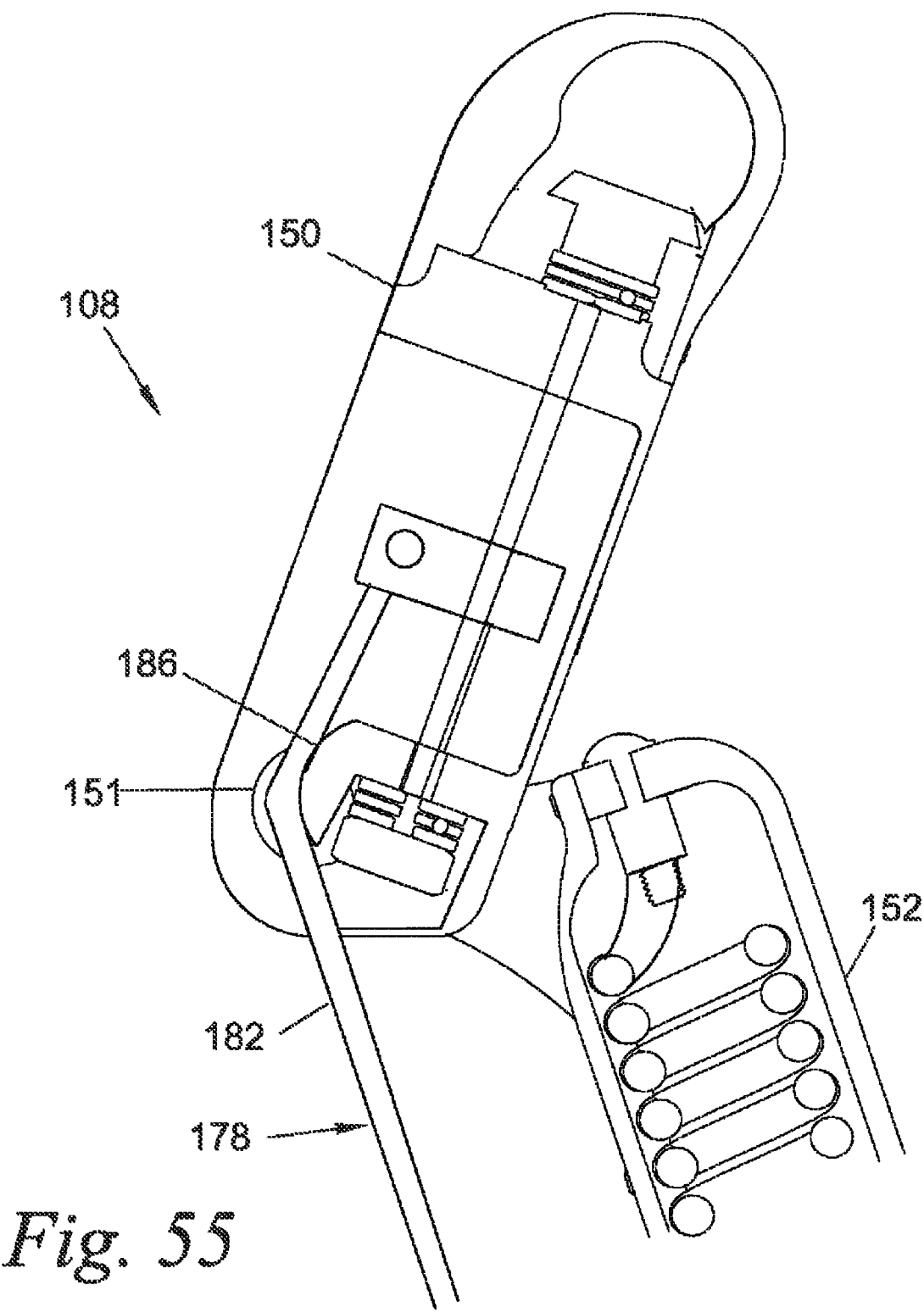
FIG. 55 is a close up side section view a torque generator of the present invention including a protrusion that is part of a proximal link.

FIG. 53 through FIG. 55 depicts an important characteristic of the invention where the torque 280 provided by tensile force generator 178 will automatically remain substantially small when first angle 193 is greater than or equal to toggle angle 195. That is, when a user moves their arm from a first position wherein first angle 193 is not greater than or equal to toggle angle 195, to a second position wherein first angle 193 is greater than or equal to toggle angle 195, tensile force generator 178 will automatically shift from a first torque mode wherein a first torque is provided by tensile force generator 178 (at the first position of the arm), to a second torque mode (at the second position of the arm) wherein a substantially small torque will be provided by tensile force generator 178. Likewise, when a user moves their arm back from the second position to the first position, the tensile force generator 179 will automatically shift from the second torque mode to the first torque mode.

FIG. 53 shows a configuration where first angle 193 is larger than 180 degrees, and arm link mechanism 104 comprises a protrusion 186 located substantially at first joint 151. When first angle 193 becomes equal to or greater than toggle angle 195, protrusion 186 constrains tensile force generator 178 (line element 182 of force generator 178 as shown in FIG. 53) in a position substantially centered about first joint 151. By constraining tensile force generator 178, protrusion 186 prevents tensile force generator 178 from passing over first joint 151. Torque 280 remains substantially zero since the force of the constrained tensile force generator 178 is substantially centered about first joint 151. A first angle 193 greater than toggle angle 195 corresponds to situations where person 200 intends to rest his/her upper arm 204 at his/her sides, or pick a tool from his/her tool belt. In these situations a substantially small torque 280 is desired to allow free motion of person's upper arm 204 or to allow person's upper arm 204 to rest without the impedance of an applied torque 280. This creates a greater overall comfort of person 200 during non-working postures. FIG. 54 depicts an embodiment of the invention wherein protrusion 186 is formed by a first joint pin 184 forming first joint 151. FIG. 55 depicts an embodiment of the invention wherein protrusion 186 is a part of proximal link 150.

Figure 56:
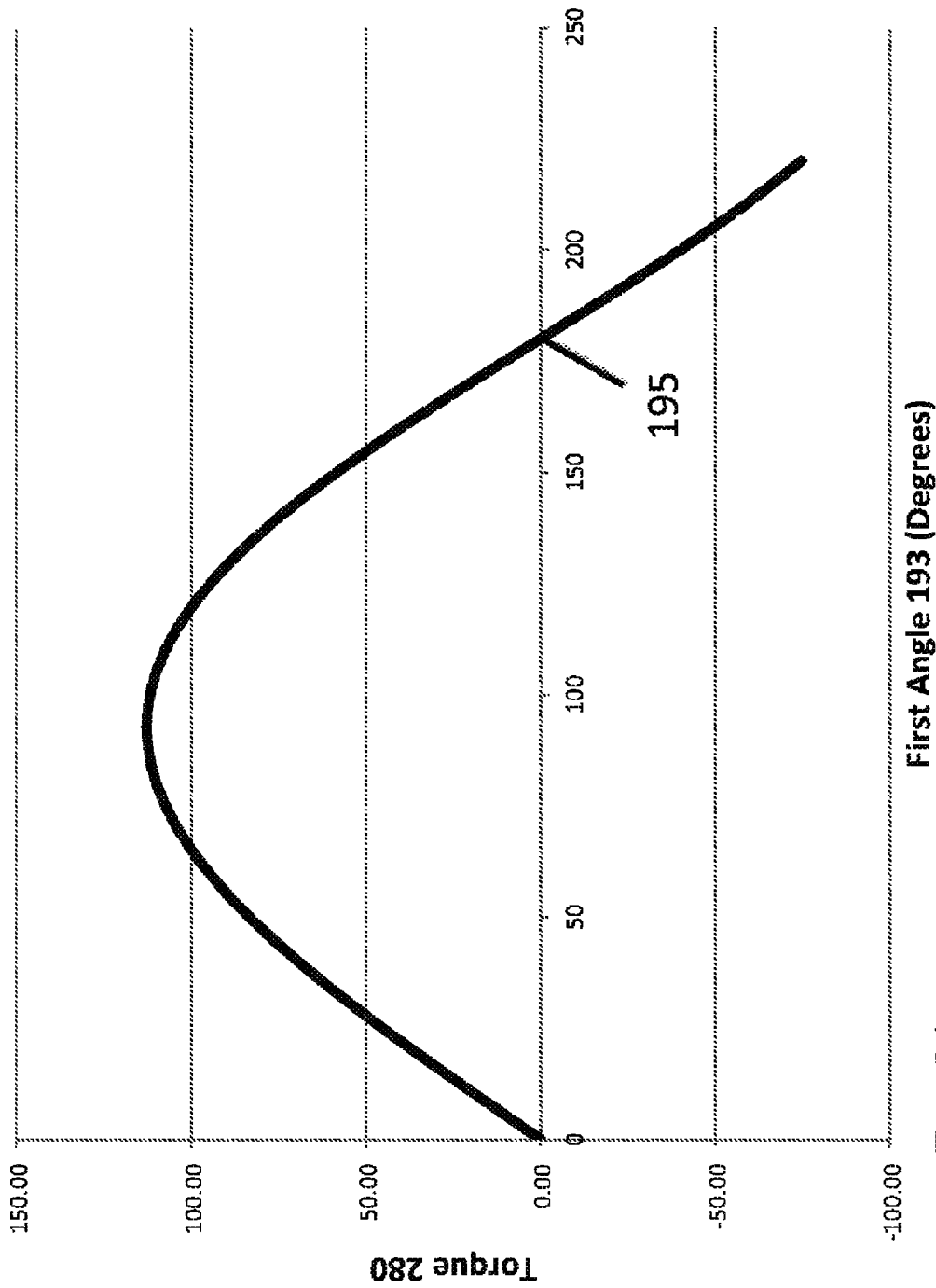
FIG. 56 is a plot of a torque generator torque profile without protrusion.
Figure 57:
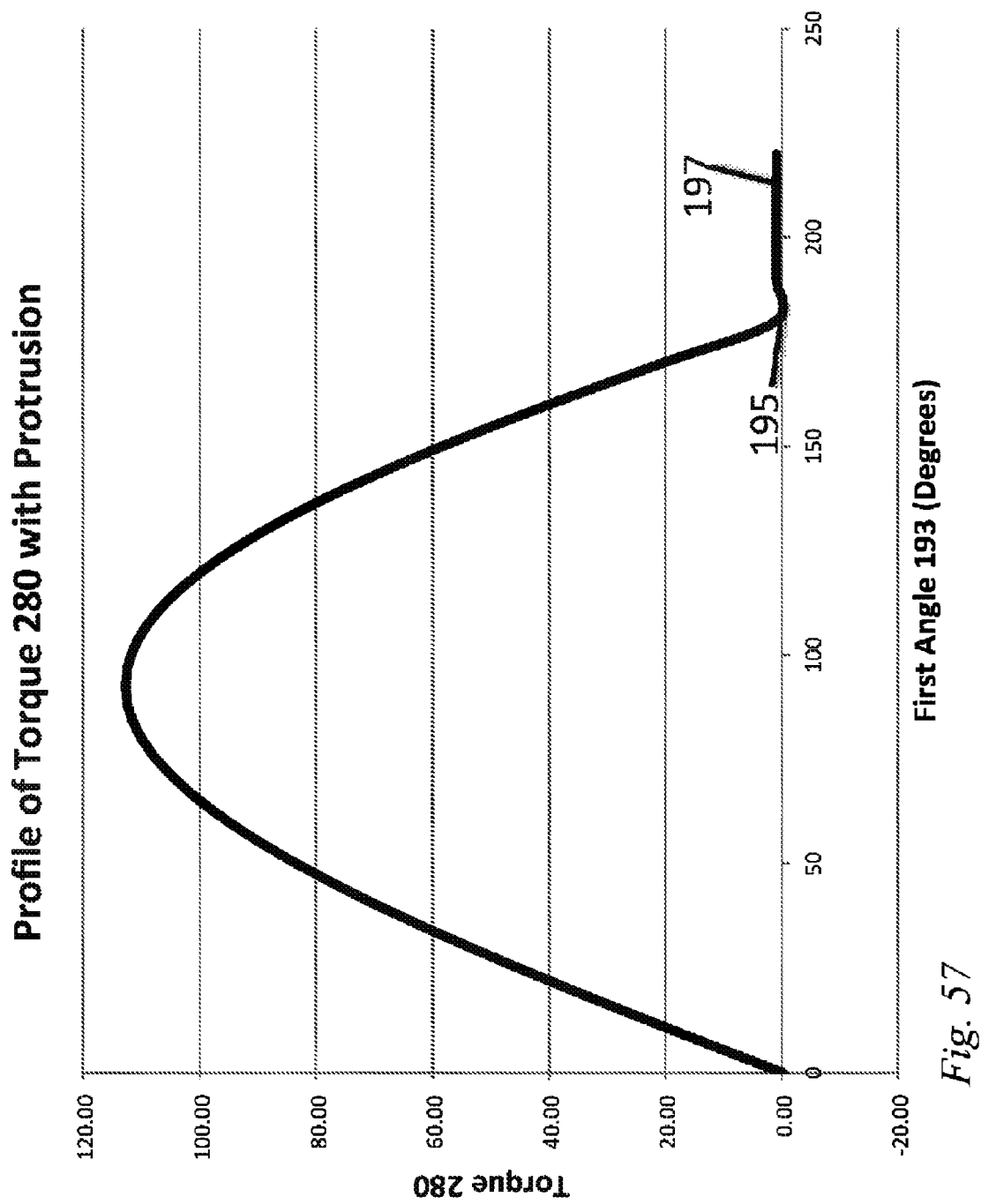
FIG. 57 is a plot of a torque generator torque profile with protrusion.

FIG. 56 depicts a graph of torque 280 created by torque generator 108 as a function of first angle 193 without protrusion 186. At toggle angle 195, torque 280 becomes negative. Negative values of torque 280 may impede movement of person's upper arm 204 or decrease comfort of person 200. FIG. 57 depicts a graph of torque 280 created by torque generator 108 as a function of first angle 193 when protrusion 186 is created. When first angle 193 becomes equal to or greater than toggle angle 195, protrusion 186 constrains tensile force generator 178, ensuring that the torque 280 remains substantially small (as described in FIG. 53). After toggle angle 195, torque 280 becomes substantially zero, creating a neutral zone 197 for the remainder of first angle 193. Neutral zone 197 allows person's upper arm 204 to move with a substantially zero applied torque 280 within first angle 193 greater than toggle angle 195. Neutral zone 197 allows person 200 to comfortable rest his/her upper arms in a neutral position or to preform secondary tasks such as reaching into pockets or a tool belt.

Figure 58:
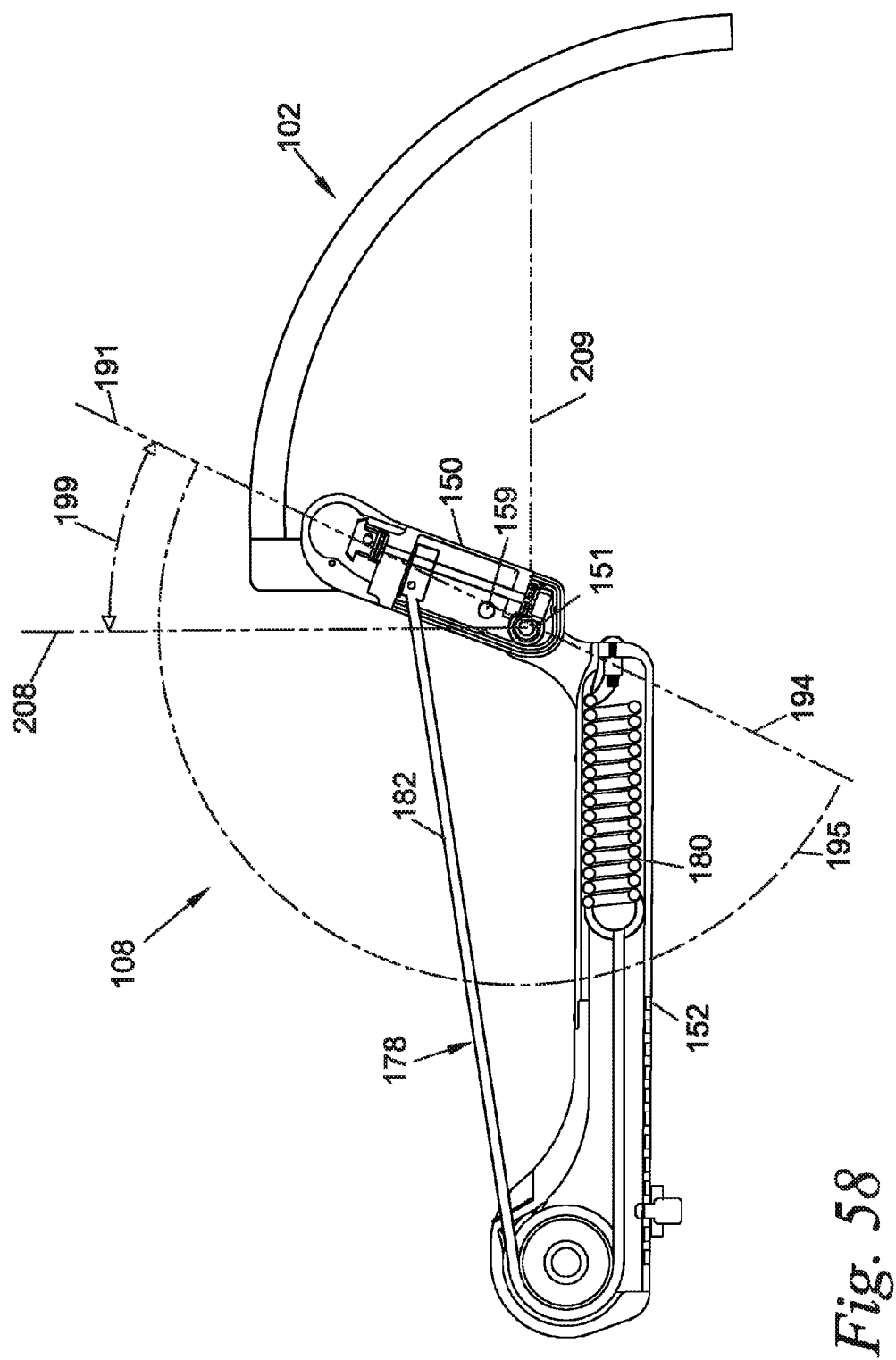
FIG. 58 is a side section view of a torque generator of the present invention including an offset adjustment joint.
Figure 59:
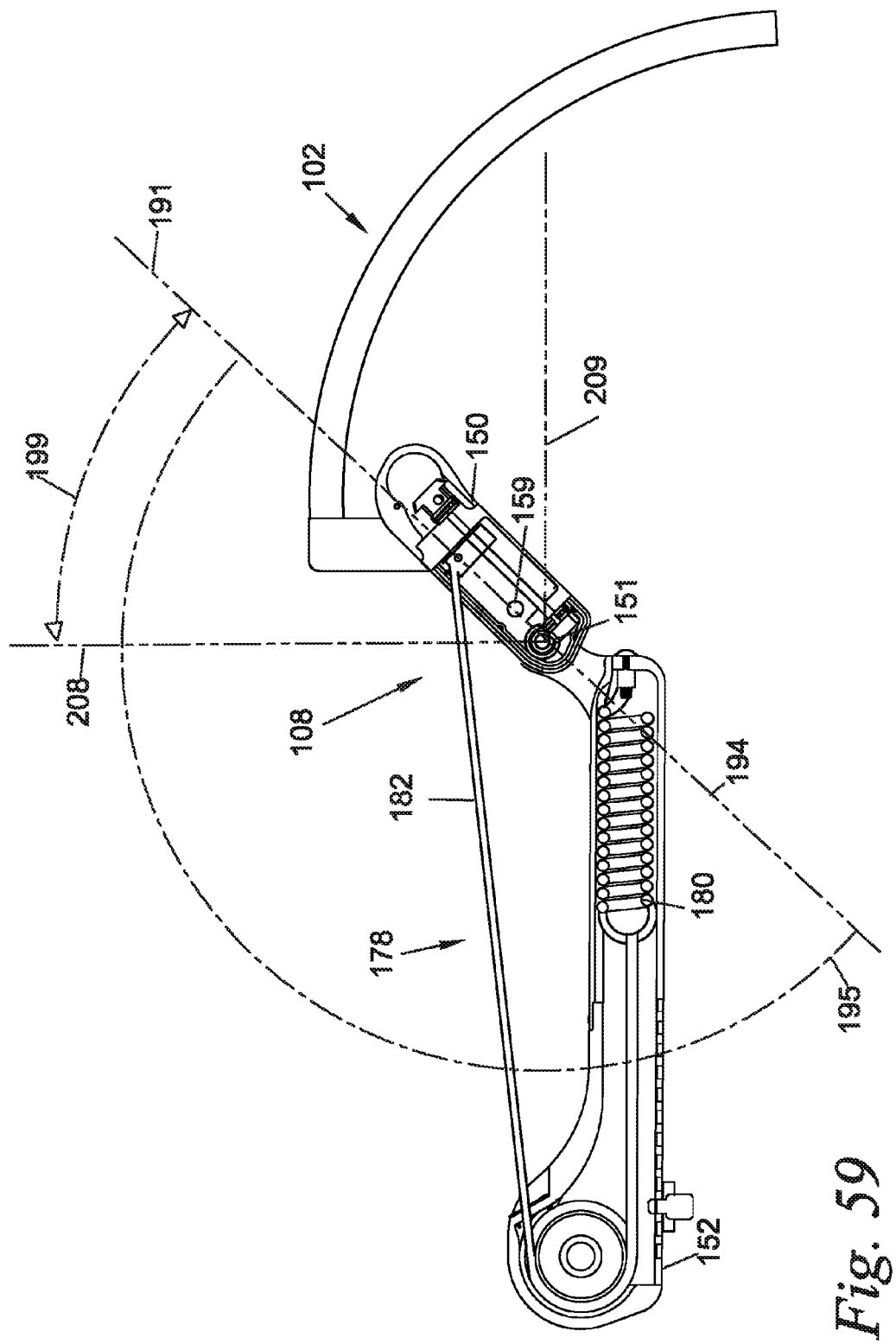
FIG. 59 is a side section view of a torque generator of the present invention showing an offset position increased.
Figure 60:
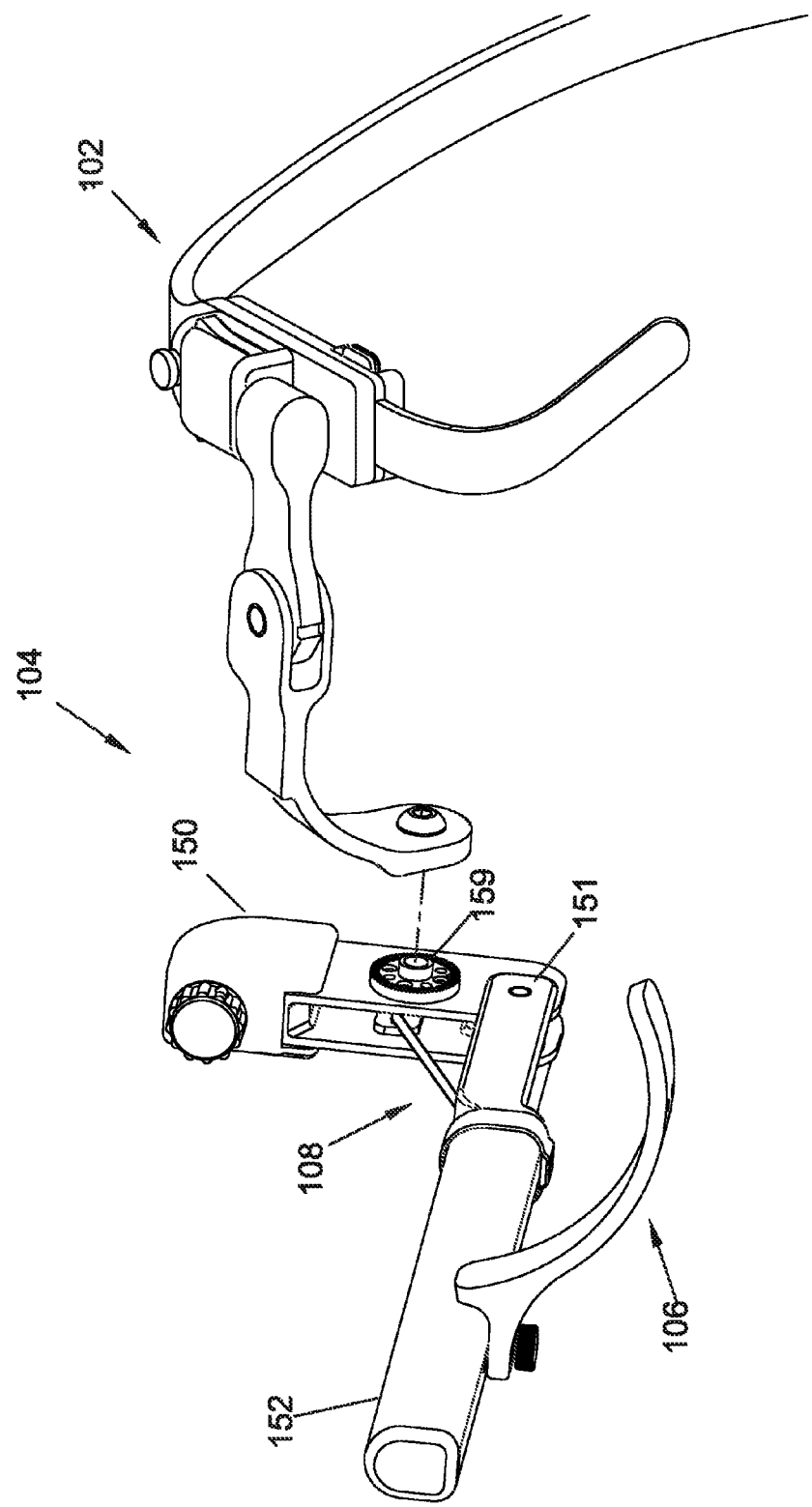
FIG. 60 is an exploded perspective view of arm link mechanism showing offset adjustment joint.

FIG. 58 and FIG. 59 depict an embodiment of arm supporting exoskeleton 100 wherein the orientation of proximal link 150 can be adjusted and held in place relative to shoulder base 102. Proximal link offset position 191 is defined as the orientation of proximal link 150 relative to gravity line 208 fixed to shoulder base 102 when person 200 is standing upright. Proximal link offset position 191 is adjusted at offset adjustment joint 159, which rotates substantially in the plane of first joint 151. Toggle position 194 represents the position of distal link 152 when first joint angle 193 has become equal to toggle angle 195. By adjusting proximal link offset position 191, toggle position 194 is adjusted relative to shoulder base 102. Offset angle 199 represents the angle between proximal link offset position 191 and gravity line 208 when person 200 is standing upright. FIG. 58 shows an embodiment of the invention wherein offset angle 199 is relatively small. FIG. 59 shows an embodiment of the invention wherein offset angle 199 is increased. FIG. 60 shows an exploded embodiment of arm link mechanism 104 comprising offset adjustment joint 159. Offset adjustment joint 159 allows proximal link 150 to rotate relative to shoulder base 102. Offset adjustment joint 159 can further lock the rotation of proximal link 150 relative to shoulder base 102 at a particular position.

Figure 61:
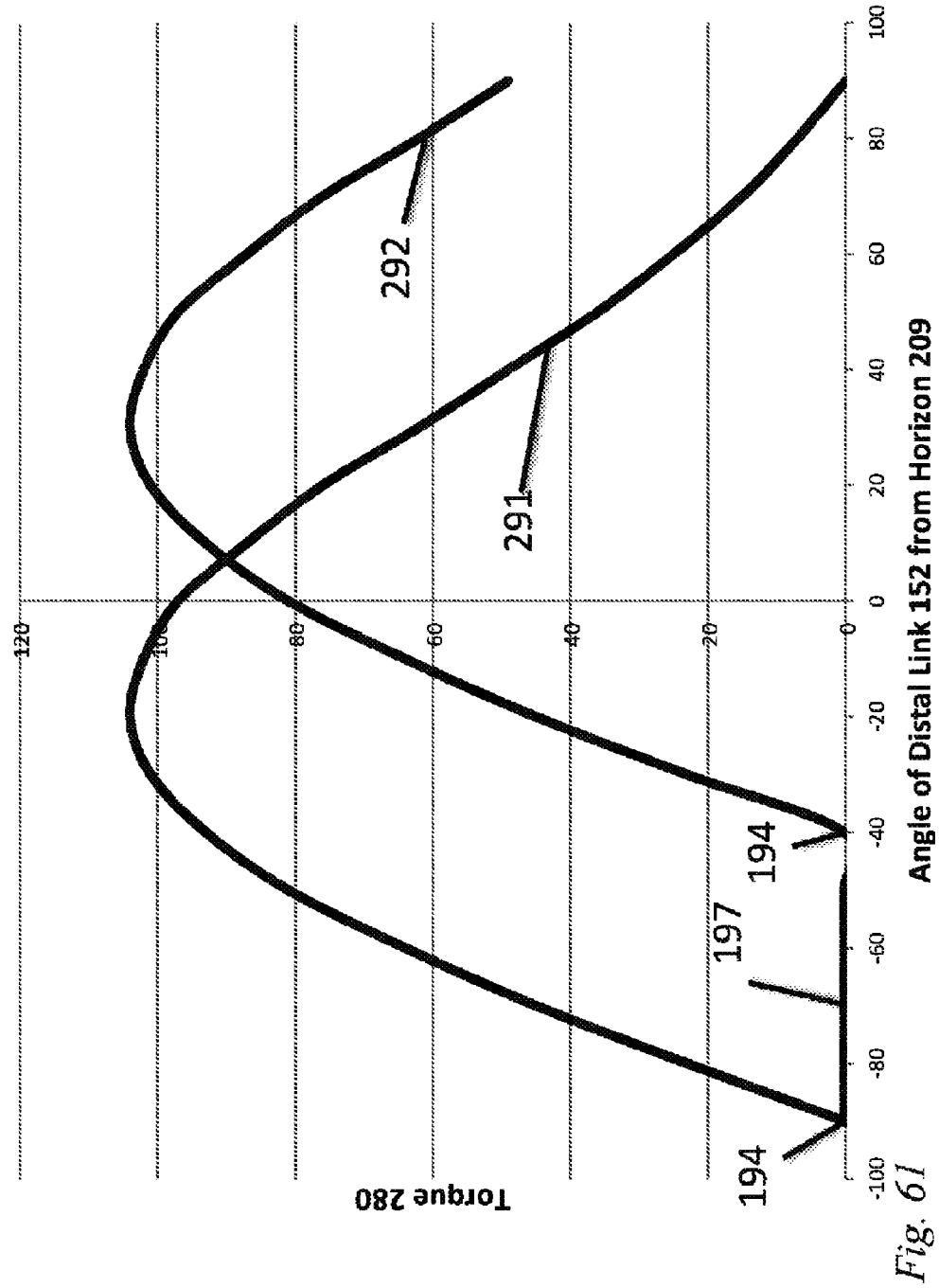
FIG. 61 is a plot of a torque generator torque profile for two values of an offset adjustment angle.

FIG. 61 depicts a graph of torque 280 created by torque generator 108 as a function of angle of distal link 152 from horizontal line 209. Torque profile 291 corresponds to a configuration when offset angle 199 is zero. Torque profile 292 corresponds to a configuration when offset angle 199 is fifty degrees meaning the upward torque will not push the person's arm upwardly unless the angle of proximal link 152 is raised relative to 40 degrees below horizon line 209. It can be observed from this graph that one can move the toggle position by adjusting offset angle 199. Torque generator offset angle 199 may be adjusted in order to position toggle position 194 at a specific angle relative to horizon line 209. Torque generator offset angle 199 may also be adjusted in order to create a torque profile with a specific peak position at a desired angle relative to horizon line 209. When protrusion 186 is present a neutral zone 197 is formed for both curves for angles of proximal link 152 past toggle position 194. When offset angle 199 is increased, a larger range of neutral zone 197 is created relative to the range of motion of person's upper arm 204.

Figure 62:
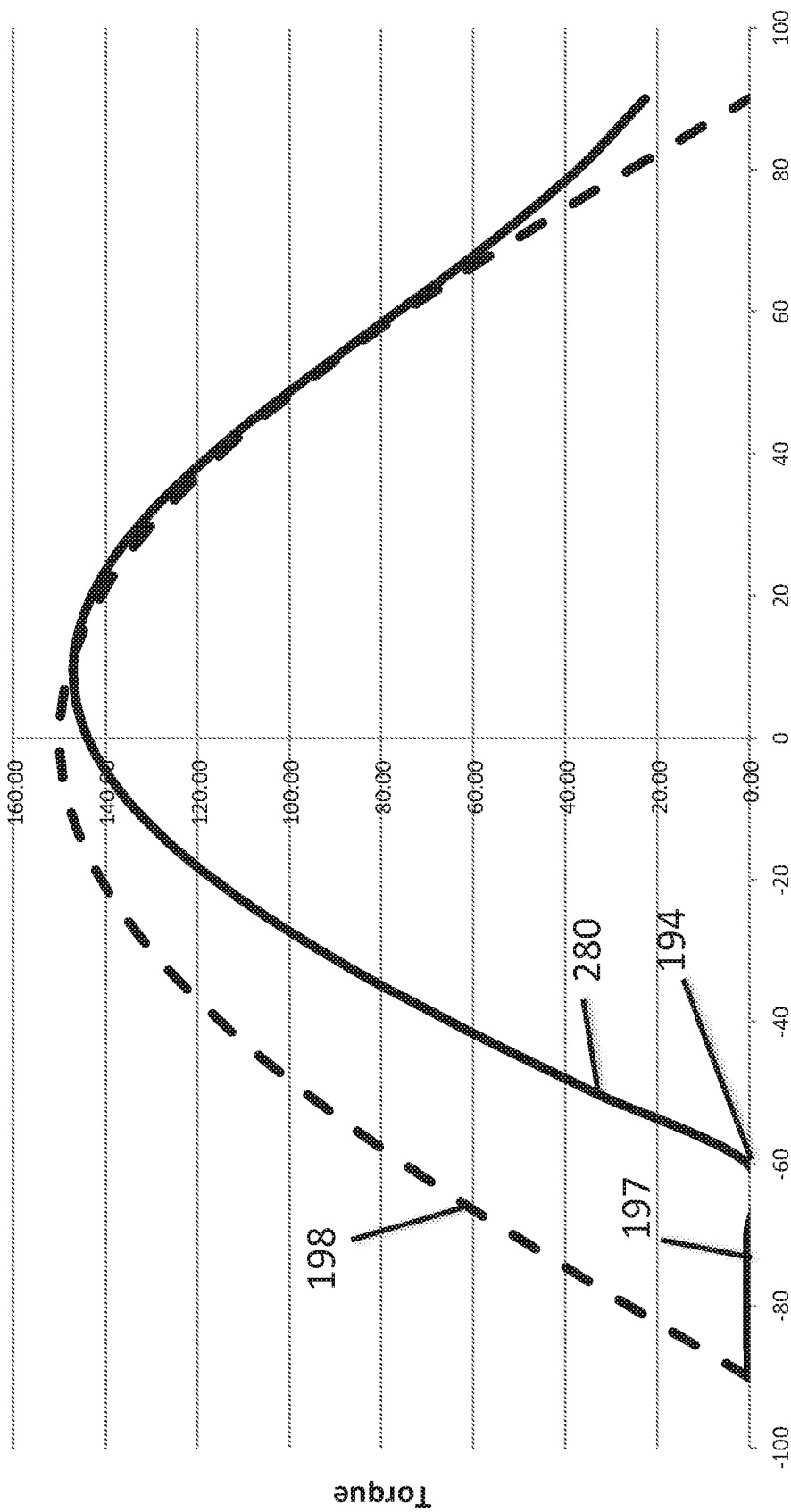
FIG. 62 is an example of a desired torque generator support torque profile compared to an arm weight torque profile.

In some embodiments, lower bracket 190, upper bracket 188, and proximal link offset position 191 can all be adjusted to create a desired support profile for torque 280. Arm weight torque profile 198 is defined as a torque to counter the weight of person's upper arm 204, forearm 206, hand 207, and a tool 308. FIG. 62 depicts the profile of torque 280 where it matches arm weight torque profile 198 in angles substantially above horizon 209 and approximately cancels the arm weight torque profile 198. Overhead welding is a good example of an activity of a user that may require such torque. When the absolute angle of the distal link 152 is below −60 degrees from horizon 209, the profile of torque 280 enters neutral zone 197 where torque is substantially zero. This profile of torque 280 may be created with a lower bracket 190 position or upper bracket position 188 that creates a torque 280 with a reduced peak amplitude compared to arm weight torque profile. Offset angle 199 may then be adjusted to shift support profile of torque 280 so that it closely matches arm weight torque profile 198 for the desired range of motion. When matched to arm weight torque profile 198 a support torque 280 of reduced amplitude corresponds to a smaller range of angles in which torque 280 matches arm weight torque profile 198 and a larger neutral zone 197.

Figure 63:
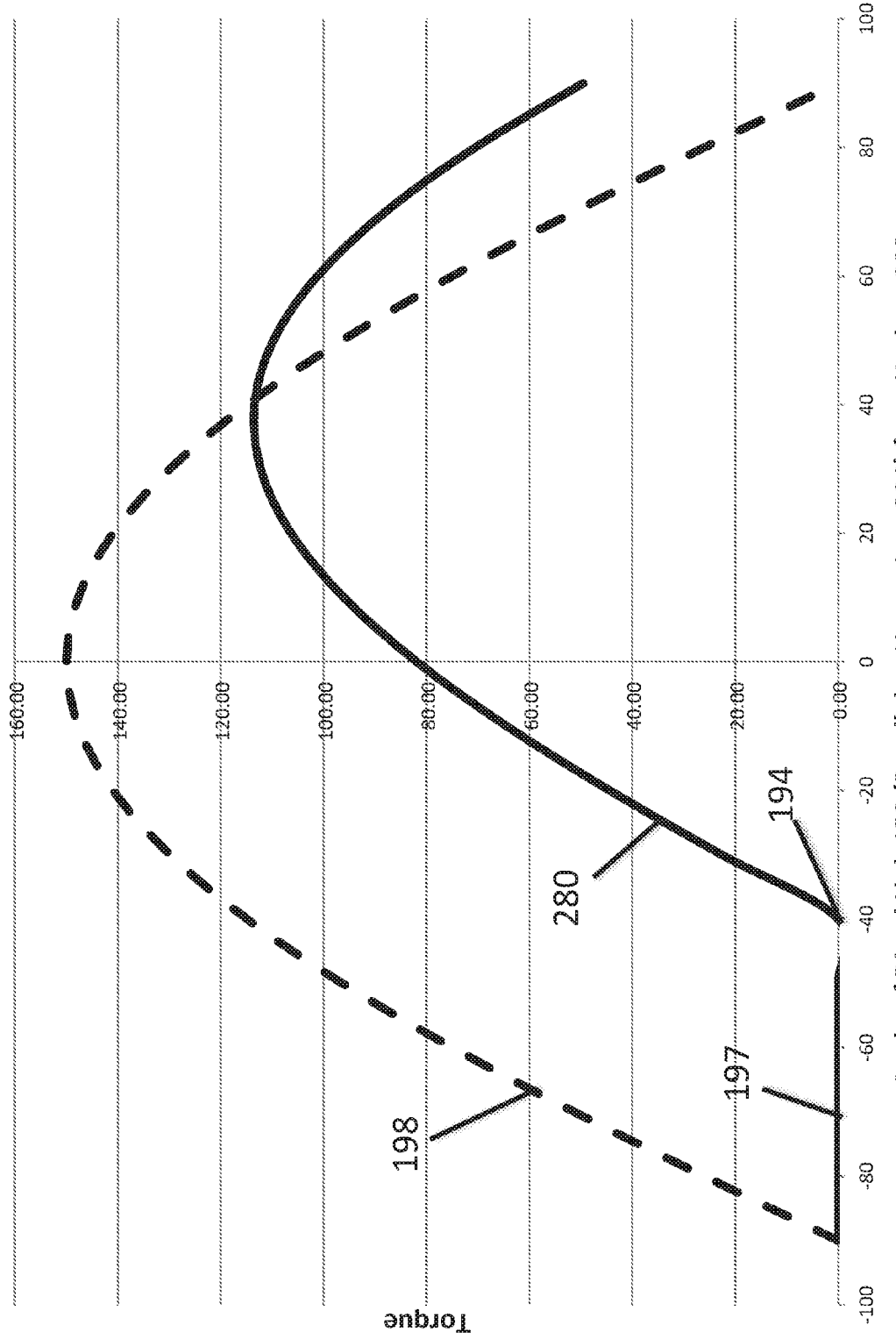
FIG. 63 is an alternative example of a desired torque generator support torque profile compared to an arm weight torque profile.

FIG. 63 depicts another support profile of torque 280 with values larger than the arm weight torque profile 198 at some angles above horizon 209. This is useful when person 200 needs to apply an upward force greater than the combined weight of upper arm 204, forearm 206, hand 207, and tool 308. Drilling into a ceiling is a good example of a user activity that may require such torque. When the absolute angle of the distal link 152 is below −40 degrees from horizon 209, the profile of torque 280 enters neutral zone 197 where torque is substantially zero. This profile of torque 280 may be created with a lower bracket 190 position or upper bracket position 188 that creates a torque 280 with any peak amplitude compared to arm weight torque profile 198. Offset angle 199 may then be adjusted to shift profile of torque 280 so that it exceeds arm weight torque profile 198 for the desired range of motion. When adjusted to arm weight torque profile 198, a support torque 280 of reduced amplitude corresponds to a smaller range of angles in which torque 280 exceeds arm weight torque profile 198 and a larger neutral zone 197.

Figure 64:
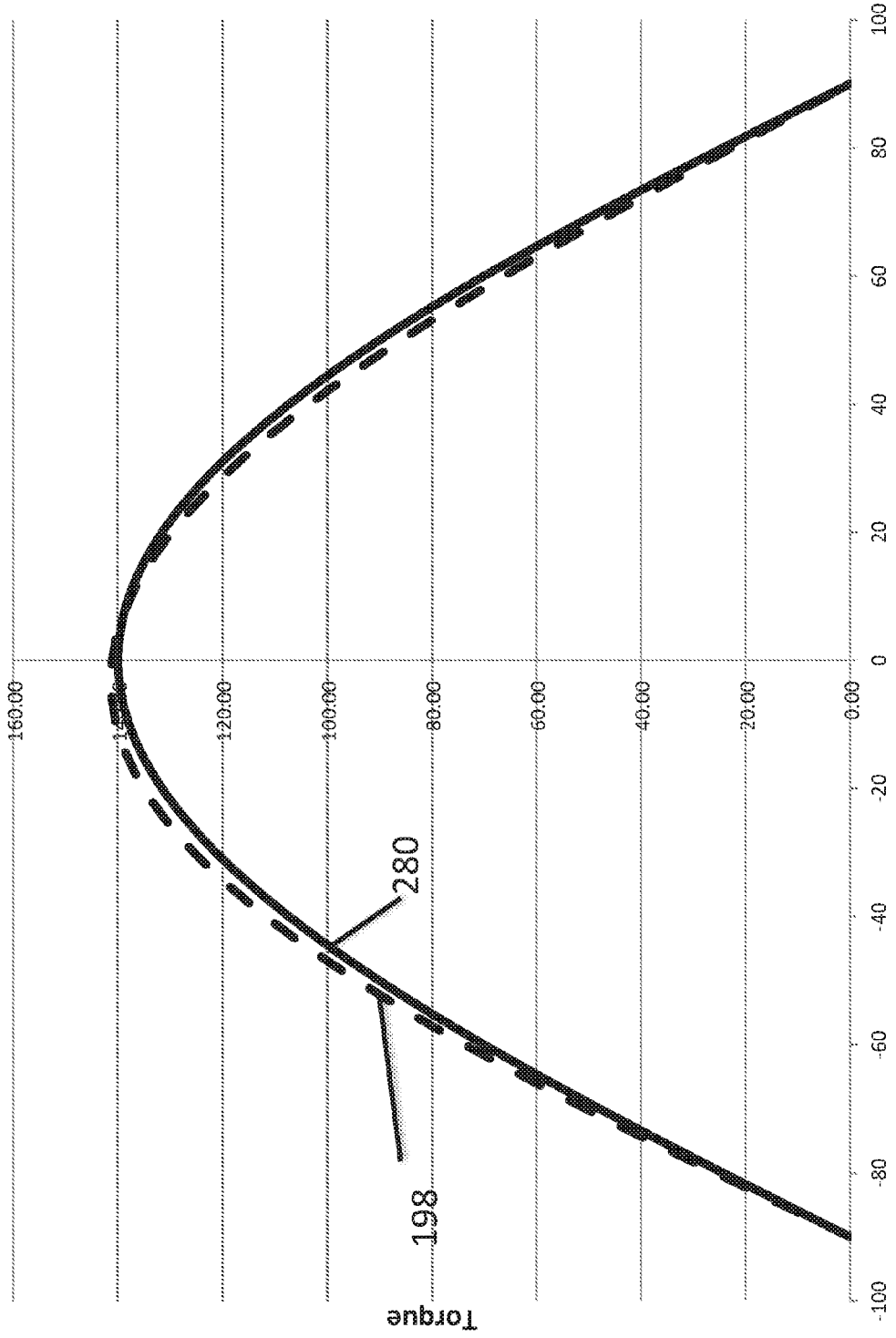
FIG. 64 is an alternative example of a desired torque generator support torque profile compared to an arm weight torque profile.

FIG. 64 depicts another possible support profile of torque 280 with values substantially equal to the arm weight torque profile 198 at all angles. Manipulating a tool throughout the entire range of motion is an example of a user activity that may require such torque. This profile of torque 280 may be created with a lower bracket 190 position or upper bracket position 188 that creates a torque 280 with equal peak amplitude compared to arm weight torque profile 198. Offset angle 199 may then be adjusted to align profile of torque 280 peak with the peak of arm weight torque profile 198. Below −90 degrees of deviation from horizon 209 torque 280 enters neutral zone 197 (not shown) where torque 280 is substantially zero. Even with the full forward range of motion supported, neutral zone 197 provides substantially zero torque when person's arm 204 extends negatively behind persons trunk 202, such as when a user's hand is reaching for a back pocket.

FIG. 65 depicts an embodiment wherein load bearing structure 112 comprises a back frame 130 located substantially behind person 200 and a lower extremity exoskeleton 304 coupled to back frame 130 and also coupled to person's legs 228. Back frame 130 is coupled to arm link mechanism 104 and supports at least a portion of reaction forces 214 and reaction torques 215 from arm link mechanism 104. Back frame 130 transfers at least a portion of reaction forces 214 and reaction torques 215 to lower extremity exoskeleton 304. Lower extremity exoskeleton 304 transfers at least a portion of reaction forces 214 and reaction torques 215 to ground 310, resulting in ground reaction forces 311. U.S. Pat. Nos. 8,894,592, 8,070,700, 8,945,028, 8,057,410, 7,947,004 describe some examples of lower extremity exoskeletons that can be coupled to arm supporting exoskeletons 100 in accordance with aspects of the invention.

Figure 66:
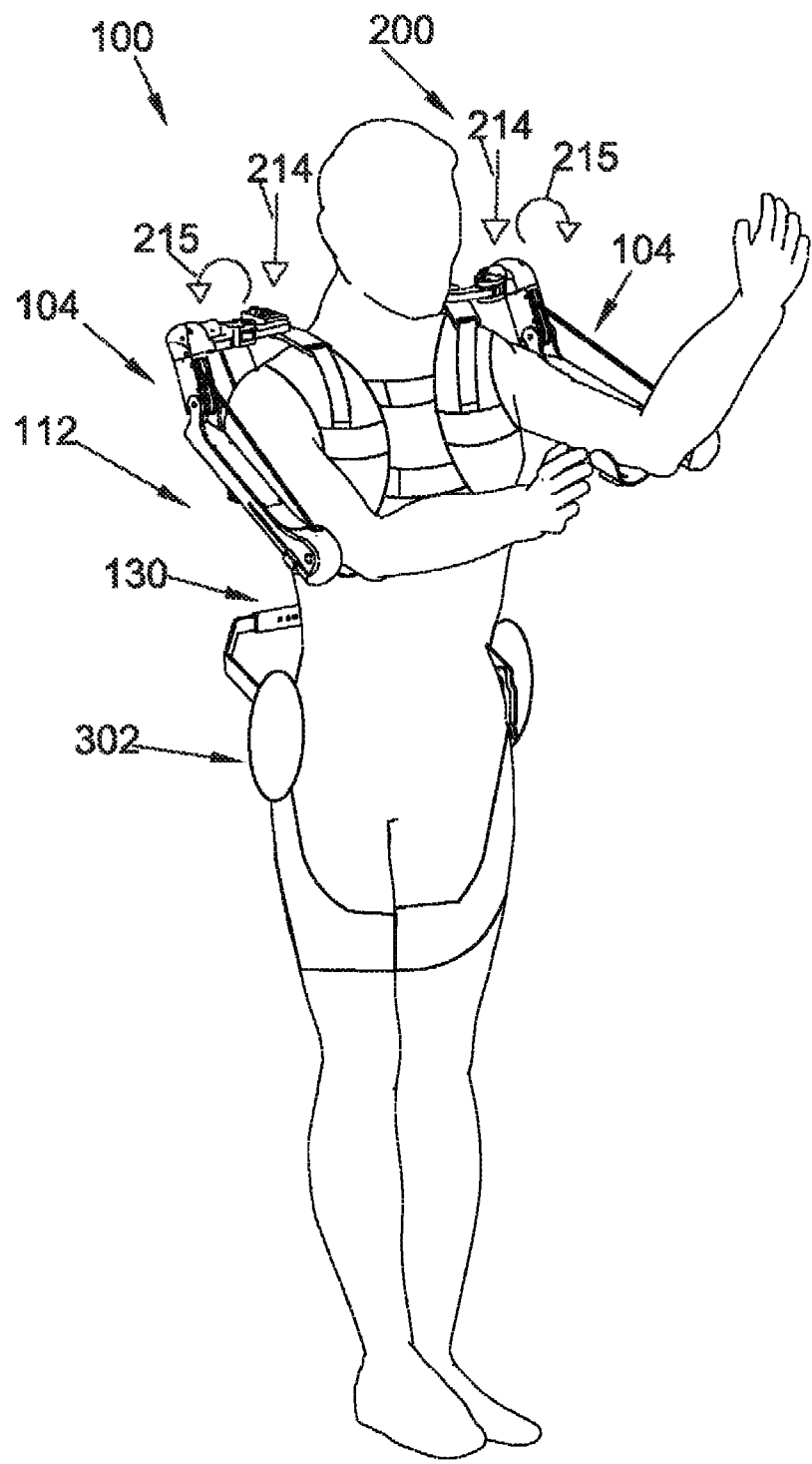
FIG. 66 is a front perspective view of a back frame of the present invention coupled to a trunk exoskeleton.

FIG. 66 depicts an embodiment wherein load bearing structure 112 comprises a back frame 130 located substantially behind person 200 and a trunk supporting exoskeleton 302 coupled to back frame 130. U.S. patents and patent application publication nos. 2015/0230964, 2014/0378882, U.S. Pat. Nos. 9,308,112 and 9,022,956 describe some examples of trunk supporting exoskeletons that can be coupled to arm supporting exoskeletons 100 in accordance with aspects of the present invention.

What is claimed is:

1. An arm supporting exoskeleton configured to be coupled to a person, the arm supporting exoskeleton comprising:
   a shoulder base configured to be coupled to a trunk of the person; and
   an arm link mechanism configured to be coupled to said shoulder base, the arm link mechanism comprising:
      a proximal link; and
      a distal link configured to rotate relative to the proximal link about a rotating joint and along a first rotational axis;
      at least one arm-coupler attached to the distal link and adapted to couple an upper arm of the person to said distal link;
   a tensile force generator coupled to said proximal link at a first end of the tensile force generator and coupled to said distal link at a second end of the tensile force generator,
      wherein the tensile force generator is configured to provide a torque to flex said distal link relative to said proximal link; and
   a protrusion located substantially at said rotating joint, wherein:
      when said distal link extends past a toggle angle, said protrusion constrains said tensile force generator, and the torque provided by said tensile force generator remains at or below a torque of a second torque mode; and
      when said protrusion does not constrain said tensile force generator, said torque generated by the tensile force generator between said proximal link and said distal link is at or above a torque of a first torque mode and flexes said distal link relative to said proximal link, thereby reducing human shoulder forces and torques required to raise said upper arm of the person.

2. An arm supporting exoskeleton configured to be coupled to a person, the arm supporting exoskeleton comprising:
   a shoulder base configured to be coupled to a trunk of the person; and
   an arm link mechanism configured to be coupled to said shoulder base, the arm link mechanism comprising:
      a proximal link; and
      a distal link configured to rotate relative to the proximal link about a rotating joint and along a first rotational axis;
      at least one arm-coupler attached to the distal link and adapted to couple an upper arm of the person to said distal link; and
   a tensile force generator coupled to said proximal link at a first end of the tensile force generator and coupled to said distal link at a second end of the tensile force generator;
   a protrusion located substantially at said rotating joint and configured to constrain the tensile force generator,
      wherein the tensile force generator is configured to provide a torque to flex said distal link relative to said proximal link, wherein:
         when an angle between said proximal link and said distal link is smaller than a toggle angle, said torque generated by the tensile force generator between said proximal link and said distal link is above a first amount and flexes said distal link relative to said proximal link, thereby reducing human shoulder forces and torques required to raise the upper arm of the person, and to impose reaction forces and torques on said shoulder base; and
         when said angle between said proximal link and said distal link is larger than said toggle angle, said torque generated by the tensile force generator between said proximal link and said distal link is below a second amount allowing said person to freely move said upper arm.

3. An arm supporting exoskeleton configured to be coupled to a person, the arm supporting exoskeleton comprising:
   a shoulder base configured to be coupled to a trunk of the person;
   an arm link mechanism configured to be coupled to said shoulder base, the arm link mechanism comprising:
      a proximal link; and
      a distal link configured to rotate relative to the proximal link around a first rotational axis;
      at least one arm-coupler attached to the distal link and adapted to couple an upper arm of the person to said distal link;

at least one torque generator coupled to said proximal link and said distal link and configured to generate a torque between said proximal link and said distal link;

a protrusion located substantially at a rotating joint of the first rotational axis and configured to constrain the at least one torque generator, wherein:

when an angle between said proximal link and said distal link is smaller than a toggle angle, said torque generated by the at least one torque generator between said proximal link and said distal link is above a first amount and flexes said distal link relative to said proximal link, thereby reducing human shoulder forces and torques required to raise the upper arm of the person, and to impose reaction forces and torques on said shoulder base; and when said angle between said proximal link and said distal link is larger than said toggle angle, said torque generated by the at least one torque generator between said proximal link and said distal link is below a second amount allowing said person to freely move said upper arm.

4. The arm supporting exoskeleton of claim 3, wherein said shoulder base comprises:

a load bearing structure coupled to said arm link mechanism and configured to support said reaction forces and torques on said shoulder base; and a coupling mechanism configured to couple said load bearing structure to the trunk of the person such that the shoulder base moves in unison with the trunk of the person.

5. The arm supporting exoskeleton of claim 4, wherein said load bearing structure comprises:

a back frame configured to locate substantially behind a back of the person,
the back frame coupled to said arm link mechanism and configured to support at least a portion of said reaction forces and torques on said shoulder base from said arm link mechanism; and at least one hip loading belt coupled to said back frame, wherein said hip loading belt is configured to transfer at least a portion of said reaction forces and torques from said back frame to hips of the person.

6. The arm supporting exoskeleton of claim 4, wherein said load bearing structure comprises:

a back frame configured to locate substantially behind a back of the person,
the back frame coupled to said arm link mechanism and configured to support at least a portion of said reaction forces and torques from said arm link mechanism; and a lower extremity exoskeleton configured to be coupled to said back frame and to legs of the person,
wherein said lower extremity exoskeletons is configured to transfer at least a portion of said reaction forces and torques from said back frame to a support surface on which the person is standing.

7. The arm supporting exoskeleton of claim 5, wherein said back frame comprises:

an upper frame coupled to said arm link mechanism;
a lower frame coupled to said hip loading belt; and
a spine frame,
wherein said spine frame is coupled to said upper frame on an upper end of the spine frame and is rotatably coupled to said lower frame on a lower end of the spine frame, allowing for rotation of said upper frame relative to said lower frame in a frontal plane of the person.

8. The arm supporting exoskeleton of claim 5, wherein said back frame comprises:

an upper frame coupled to said arm link mechanism;
a lower frame coupled to said hip loading belt; and
a spine frame, wherein said spine frame is coupled to said lower frame on a lower end of the spine frame, and is rotatably coupled to said upper frame on an upper end of the spine frame, allowing for rotation of said upper frame relative to said lower frame along a major axis of said spine frame.

9. The arm supporting exoskeleton of claim 8, wherein said lower frame comprises:

a lower middle bar; and
first and second lower corner bars,
wherein each of the first and second lower corner bars is adapted to be coupled to said lower middle bar at various locations on said lower middle bar to provide selective hip width adjustment for said lower frame.

10. The arm supporting exoskeleton of claim 8, wherein said lower frame further comprises first and second lower side brackets,
wherein each of said first and second lower side brackets is adapted to be coupled to a body of said lower frame at various locations on said lower frame to provide selective hip depth adjustment for said lower frame.

11. The arm supporting exoskeleton of claim 8, wherein said upper frame comprises:

an upper middle bar; and
first and second upper corner bars,
wherein each of the first and second upper corner bars is adapted to be coupled to said upper middle bar at various locations on said upper middle bar to provide selective shoulder width adjustment for said upper frame.

12. The arm supporting exoskeleton of claim 8, wherein said upper frame further comprises first and second upper side brackets,
wherein each of said first and second upper side brackets is adapted to be coupled to a body of said upper frame at various locations on said upper frame to provide selective shoulder depth adjustment for said upper frame.

13. The arm supporting exoskeleton of claim 5, wherein said back frame further comprises a hammock structure spanning a curve in said back frame and configured to evenly distribute at least a portion of said reaction forces to shoulders of the person.

14. The arm supporting exoskeleton of claim 7, wherein said coupling mechanism comprises:

a chest strap configured to at least partially encircle a chest of the person and to couple to said upper frame at locations substantially behind said person; and
first and second anchor straps coupling said chest strap to said upper frame and configured to extend over respective shoulders of the person,
wherein coupling said chest strap and said anchor strap to said upper frame allows said upper frame to move in unison with the chest and shoulders of the person.

15. The arm supporting exoskeleton of claim 4, wherein said coupling mechanism comprises an element selected from a group consisting of a belt, a vest, a chest strap, anchor strap, shoulder straps, sternum strap, suspender strap, and combinations thereof.

16. The arm supporting exoskeleton of claim 4, where said coupling mechanism is adaptable to be coupled to a safety harness worn by said person from a number of safety harness attachment points without modification of said safety harness.

17. The arm supporting exoskeleton of claim 3, wherein said torque generator comprises:
a tensile force generator coupled to said proximal link at a first end of the tensile force generator and coupled to said distal link at a second end of the tensile force generator, wherein tensile force in said tensile force generator provides the torque to flex said distal link relative to said proximal link.

18. The arm supporting exoskeleton of claim 17, wherein said tensile force generator comprises a coil spring element.

19. The arm supporting exoskeleton of claim 18, wherein said tensile force generator comprises a line element coupling said coil spring element to said proximal link.

20. The arm supporting exoskeleton of claim 19, wherein said line element at least partially encircles a pulley coupled to said distal link before the line element is coupled to said proximal link.

21. The arm supporting exoskeleton of claim 17, wherein when said distal link extends past said toggle angle, and wherein said protrusion constrains said tensile force generator such that the torque provided by said tensile force generator will remain substantially small.

22. The arm supporting exoskeleton of claim 17, wherein orientation of said proximal link can be adjusted and held in place relative to said shoulder base along an axis substantially parallel to said first rotational axis, thereby allowing adjustment of position of said toggle angle relative to said shoulder base.

23. The arm supporting exoskeleton of claim 17, wherein said proximal link comprises an upper bracket coupled to said tensile force generator, wherein a location of said upper bracket can be adjusted along said proximal link to adjust the torque provided by said tensile force generator.

24. The arm supporting exoskeleton of claim 17, wherein said distal link comprises a lower bracket coupled to said tensile force generator, wherein a location of said lower bracket can be adjusted along said distal link to adjust a preload force of said tensile force generator.

25. The arm supporting exoskeleton of claim 3, wherein said arm link mechanism contains at least one horizontal rotation joint that allows said proximal link to rotate relative to said shoulder base about a second rotational axis substantially orthogonal to said first rotational axis passing approximately through a glenohumeral joint of the person.

26. The arm supporting exoskeleton of claim 3, wherein said shoulder base comprises at least one shoulder bracket that allows for quick connect and disconnect coupling of said arm link mechanism to said shoulder base.

27. The arm supporting exoskeleton of claim 3, wherein said shoulder base comprises at least one shoulder bracket that couples said arm link mechanism to said shoulder base in such a manner that a position of said arm link mechanism can be adjusted relative to said shoulder base.

28. The arm supporting exoskeleton of claim 3, wherein said arm link mechanism contains at least one rotation joint that allows said proximal link to rotate relative to said shoulder base along at least one scapular rotation axis substantially orthogonal to a gravity line.

29. The arm supporting exoskeleton of claim 3, wherein said shoulder base comprises at least one shoulder bracket rotatably coupled to said shoulder base and coupled to said arm link mechanism, wherein said shoulder bracket rotates along a stow axis and can be held stationary allowing arm link mechanism to be stored behind said person substantially out of a person's active workspace.

30. An arm supporting exoskeleton configured to be coupled to a person, the arm supporting exoskeleton comprising:
a back frame configured to locate substantially behind a back of the person;
a lower extremity exoskeleton configured to be coupled to said back frame and to legs of the person;
a coupling mechanism configured to couple said back frame to a trunk of the person such that said back frame moves in unison with the trunk of the person;
at least one arm link mechanism configured to be coupled to said back frame comprising:
a proximal link; and
a distal link configured to rotate relative to the proximal link around a first rotational axis;
at least one arm-coupler attached to the distal link and adapted to couple an upper arm of the person to said distal link;
at least one torque generator coupled to said proximal link and said distal link and configured to generate a torque between said proximal link and said distal link;
a protrusion located substantially at a rotating joint of the first rotational axis and configured to constrain the at least one torque generator, wherein:
when an angle between said proximal link and said distal link is smaller than a toggle angle, said torque generated by the at least one torque generator between said proximal link and said distal link is above a first amount and flexes said distal link relative to said proximal link, thereby reducing human shoulder forces and torques required to raise the upper arm of the person, and to impose reaction forces and torques on a shoulder base; and
when said angle between said proximal link and said distal link is larger than said toggle angle, said torque generated by the at least one torque generator between said proximal link and said distal link is below a second amount allowing said person to freely move said upper arm.

* * * * *